US008933959B2

(12) United States Patent
Brown Elliott et al.

(10) Patent No.: US 8,933,959 B2
(45) Date of Patent: Jan. 13, 2015

(54) SUBPIXEL LAYOUTS AND SUBPIXEL RENDERING METHODS FOR DIRECTIONAL DISPLAYS AND SYSTEMS

(75) Inventors: Candice Hellen Brown Elliott, Santa Rosa, CA (US); Thomas Lloyd Credelle, Morgan Hill, CA (US); Matthew Osborne Schlegel, Palo Alto, CA (US)

(73) Assignee: Samsung Display Co., Ltd. (KR)

( * ) Notice: Subject to any disclaimer, the term of this patent is extended or adjusted under 35 U.S.C. 154(b) by 1101 days.

(21) Appl. No.: 12/526,766

(22) PCT Filed: Feb. 8, 2008

(86) PCT No.: PCT/US2008/053450
§ 371 (c)(1),
(2), (4) Date: Jan. 25, 2010

(87) PCT Pub. No.: WO2008/100826
PCT Pub. Date: Aug. 21, 2008

(65) Prior Publication Data
US 2010/0118045 A1    May 13, 2010

Related U.S. Application Data

(60) Provisional application No. 60/889,724, filed on Feb. 13, 2007.

(51) Int. Cl.
*G09G 5/00*   (2006.01)
*G02B 27/22*   (2006.01)
(Continued)

(52) U.S. Cl.
CPC .......... *G02B 27/2214* (2013.01); *G09G 3/003* (2013.01); *G09G 3/20* (2013.01);
(Continued)

(58) Field of Classification Search
USPC .................. 345/589, 604, 613; 348/E13.028, 348/E13.033, E13.036
See application file for complete search history.

(56) References Cited

U.S. PATENT DOCUMENTS 7,483,095 B2 *  1/2009  Roth et al. ..................... 349/106
7,697,012 B2 *  4/2010  Lee et al. ...................... 345/613
(Continued)

FOREIGN PATENT DOCUMENTS

CN        1639765       7/2005
EP        0829743 A2    3/1998
(Continued)

OTHER PUBLICATIONS

Lai, C. et al. "Brightness Improvement of Color Display Systems Using White Sub-pixel Structure and Fuzzy Mapping Alhorithm." In: IEEE International Conference on Systems, Man and Cybernetics, New York: IEEE, Oct. 2006, pp. 972-977.
(Continued)

*Primary Examiner* — Xiao Wu
*Assistant Examiner* — Todd Buttram
(74) *Attorney, Agent, or Firm* — Innovation Counsel LLP

(57) ABSTRACT

Display devices and systems are configured with display panels substantially comprising one of several embodiments of three primary color or multi-primary color subpixel repeating groups that are particularly suitable for directional display devices which produce at least two images simultaneously, such as autostereoscopic three-dimensional display devices or multi-view devices. Input image data indicating an image is rendered to a device configured with one of the illustrated subpixel repeating groups using a subpixel rendering operation.

49 Claims, 37 Drawing Sheets

(51) Int. Cl.
*G09G 3/00* (2006.01)
*G09G 3/20* (2006.01)
*H04N 13/04* (2006.01)

(52) U.S. Cl.
CPC ...... *H04N 13/0402* (2013.01); *H04N 13/0422* (2013.01); *H04N 13/0445* (2013.01); *H04N 13/0452* (2013.01); *G02F 2201/52* (2013.01); *G09G 2300/0443* (2013.01)
USPC .... 345/613; 345/589; 345/604; 348/E13.028; 348/E13.033; 348/E13.036

(56) References Cited

U.S. PATENT DOCUMENTS

| | | | |
|---|---|---|---|
| 2002/0149598 A1* | 10/2002 | Greier et al. | 345/589 |
| 2004/0051724 A1* | 3/2004 | Elliott et al. | 345/694 |
| 2004/0196297 A1 | 10/2004 | Elliott et al. | |
| 2004/0234163 A1* | 11/2004 | Lee et al. | 382/298 |
| 2004/0239757 A1* | 12/2004 | Alden | 348/51 |
| 2005/0083352 A1* | 4/2005 | Higgins | 345/690 |
| 2005/0169551 A1* | 8/2005 | Messing et al. | 382/260 |
| 2005/0225563 A1 | 10/2005 | Brown Elliott et al. | |
| 2006/0181533 A1* | 8/2006 | Dowling et al. | 345/467 |
| 2006/0244761 A1 | 11/2006 | Berestov et al. | |
| 2008/0186325 A1* | 8/2008 | Higgins et al. | 345/592 |
| 2009/0058873 A1* | 3/2009 | Brown Elliott et al. | 345/589 |

FOREIGN PATENT DOCUMENTS

| | | |
|---|---|---|
| GB | 2403863 A | 1/2005 |
| GB | 2403864 A | 1/2005 |
| JP | 2001-211465 | 3/2001 |
| JP | 2004-206089 | 7/2004 |
| JP | 2005-078076 | 3/2005 |
| JP | 2006-519410 A | 8/2006 |
| JP | 2006-521573 | 9/2006 |
| WO | 2004/095370 | 11/2004 |
| WO | 2005/006777 A2 | 1/2005 |
| WO | 2005/057532 A2 | 6/2005 |
| WO | 2005/101366 | 10/2005 |
| WO | 2005/122122 A1 | 12/2005 |
| WO | 2006/019025 A1 | 2/2006 |
| WO | 2006/127555 | 11/2006 |

OTHER PUBLICATIONS

Lee, B. et al. "TFT-LCD with RGBW Color system.", SID Symposium Digest. May 2003, vol. 34, Issue 1, pp. 12-1215. See entire document.
Extended European Search Report corresponding to EP 08729416.1, Feb. 29, 2012, 7 pages.
EP14151685 Search Report dated May 15, 2014, 6pp.

* cited by examiner

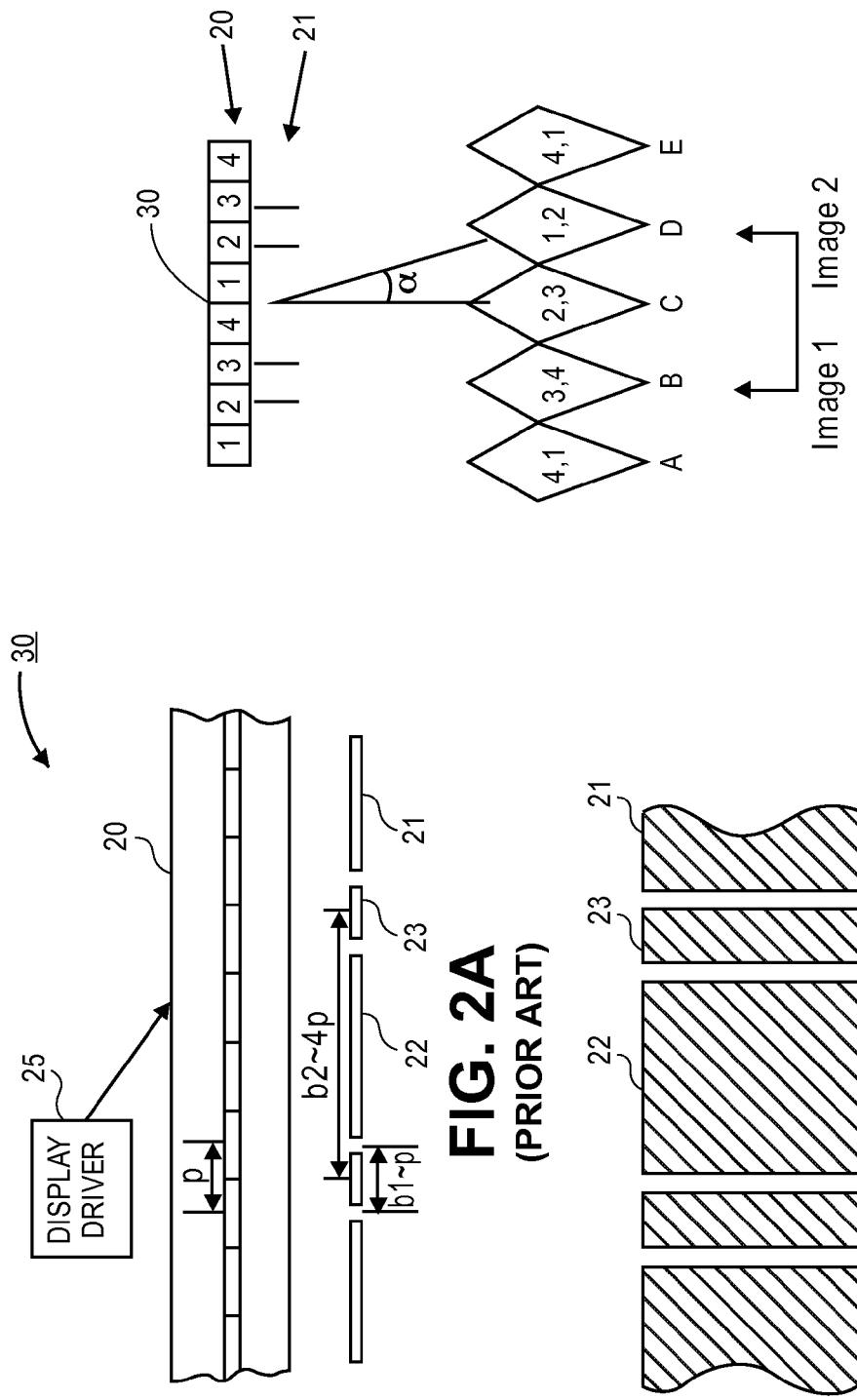

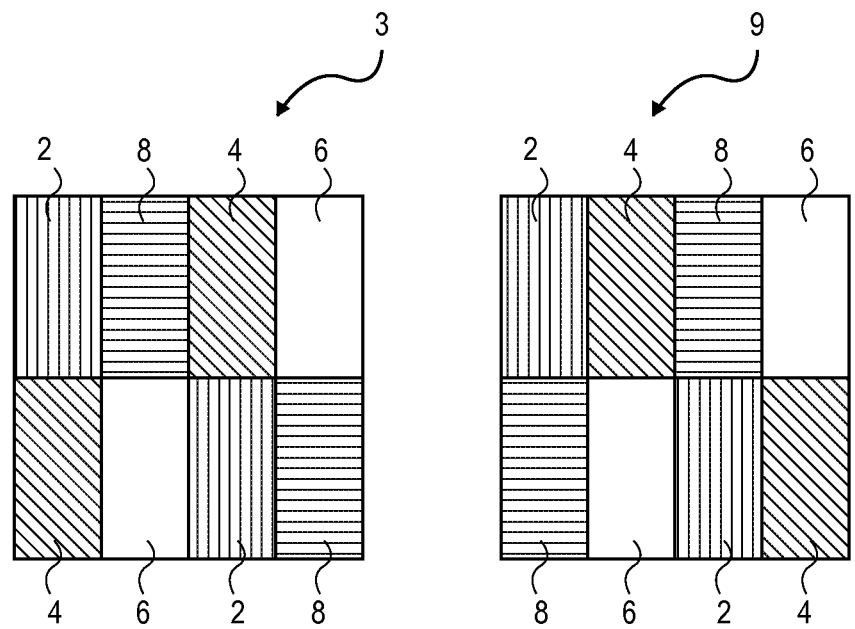
FIG. 9A  FIG. 9B
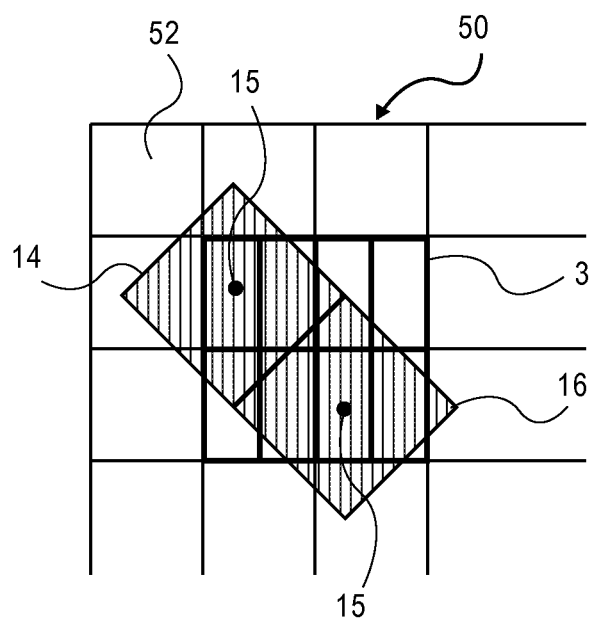
FIG. 10

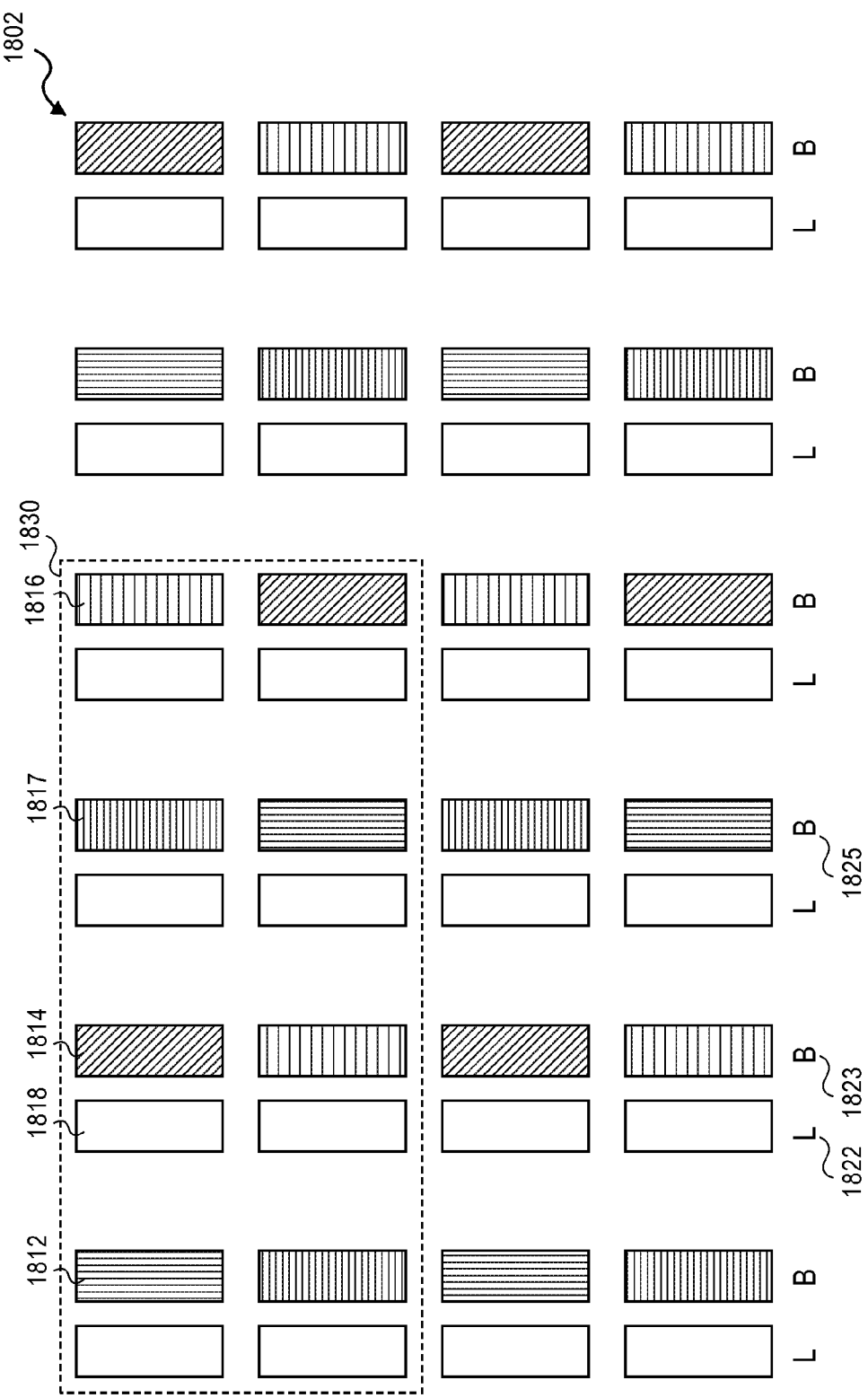

the figures referred to therein, of U.S. Pat. No. 7,058,252 are incorporated herein by reference for all that they teach. In general, an autostereoscopic system comprises a display panel and an optical steering element or mechanism for directing the light from at least two separate images. The optical steering mechanism may also be referred to as an optical director, parallax optic, or parallax barrier. The optical steering mechanism sends the light from a left image to a limited region in front of the display panel, referred to as a first viewing window. When the observer places their left eye at the position of the first viewing window, then the observer sees the appropriate image across the whole of the display panel. Similarly, the optical steering mechanism sends the light intended for the right image to a separate second viewing window. When the observer places their right eye in the second viewing window, the right eye image will be seen across the whole of the display. Generally, the light from either image may be considered to have been optically steered (i.e. directed) into a respective directional distribution. The viewing window plane of the display represents the distance from the display at which the lateral viewing freedom is greatest.

SUBPIXEL LAYOUTS AND SUBPIXEL RENDERING METHODS FOR DIRECTIONAL DISPLAYS AND SYSTEMS

CROSS REFERENCE TO RELATED APPLICATION

This application claims the benefit of U.S. Provisional Application 60/889,724 entitled SUBPIXEL LAYOUTS AND SUBPIXEL RENDERING METHODS FOR DIRECTIONAL DISPLAYS AND SYSTEMS, filed on Feb. 13, 2007, which is hereby incorporated by reference herein in it's entirety

FIELD OF INVENTION

The subject matter of the present application is related to spatial light modulators, and in particular to subpixel layouts for a spatial light modulator that is used in a directional display apparatus or system, such as a three-dimensional (3D) autostereoscopic display apparatus, or a multi-view display.

BACKGROUND

A display apparatus that is capable of producing at least two different images simultaneously is referred to herein as a directional display apparatus. A directional display produces at least two different images, each of which is viewed from a different viewing position. In one type of directional display device, the two images are intended to be viewed as distinct separate images. Such a display may also be referred to as "a multi-viewer display," "multi-view display" or "multi-user display" which may be configured so that different observers see different images. This allows for multiple simultaneous uses of the display. A multi-view display may also be configured for use by a single observer.

A directional display may also be configured to produce at least two separate images that are intended to be fused into a single image by the observer. Normal human vision is stereoscopic such that each eye sees a slightly different image of the world. The human brain fuses the two images (referred to as the stereo pair) to give the sensation of depth in images observed in the real world. In a three dimensional display apparatus, a separate image is provided to each eye, and the brain of the observer fuses the stereo pair of images to give the appearance of depth in the fused image.

A three dimensional display apparatus is typically classified as being either stereoscopic or autostereoscopic. In a 3D stereoscopic display apparatus, some kind of viewing aid is worn by the user to substantially separate the views sent to the left and right eyes. For example, the viewing aid may be color filters in which the images are color coded (e.g. red and green), polarizing glasses in which the images are encoded in orthogonal polarization states, or shutter glasses in which the views are encoded as a temporal sequence of images in synchronization with the opening of the shutters of the glasses. In contrast, a 3D autostereoscopic display apparatus operates without the need for the observer to wear a viewing aid. In autostereoscopic displays, each of the views can be seen from a limited region in space.

Overview of Directional Display Devices

U.S. Pat. No. 7,058,252, entitled "Optical Switching Apparatus" and issued to Woodgate et al., provides a comprehensive discussion of the technical features and issues related to directional displays, and in particular autostereoscopic 3D displays. The subject matter at columns 1 through 8, as well as the figures referred to therein, of U.S. Pat. No. 7,058,252 are FIG. 1 herein illustrates an exemplary flat panel autostereoscopic display 10 as shown in FIG. 5 of U.S. Pat. No. 7,058,252. Display 10 comprises a backlight, an array of electronically adjustable pixels (known as a spatial light modulator, SLM) arranged in columns and rows and a parallax barrier attached to the front of the display which acts as the optical steering mechanism. The term "spatial light modulator" includes both light valve devices such as liquid crystal displays and emissive devices such as electroluminescent displays and LED displays. A backlight 60 produces a light output 62 which is incident on an LCD input polarizer 64. The light is transmitted through a TFT LCD substrate 66 and is incident on a repeating array of pixels arranged in columns and rows in an LCD pixel plane 67. The red pixels 68,71,74, green pixels 69,72,75 and blue pixels 70,73 each comprise an individually controllable liquid crystal layer and are separated by regions of an opaque mask called a black mask 76. Each pixel comprises a transmissive region, or pixel aperture 78. Light passing through the pixel is modulated in phase by the liquid crystal material in the LCD pixel plane 74 and in color by a color filter positioned on an LCD color filter substrate 80.

The light then passes through an output polarizer 82 after which is placed a parallax barrier 84 and a parallax barrier substrate 86. In FIG. 1, the parallax barrier 84 comprises an array of vertically extended transmissive regions separated by vertically extended opaque regions and serves to direct light from alternate pixel columns 69,71,73,75 to the right eye as shown by the ray 88 for light from pixel 69 and from the intermediate columns 68,70,72,74 to the left eye as shown by the ray 90 (this overall light direction pattern forming another example of a directional distribution of light). The observer sees the light from the underlying pixel illuminating the aperture of the barrier, 92. Other types of optical directors or parallax optics may be used in 3D displays, such as a lenticular screen and birefringent lenses.

With continued reference to FIG. 1, the repeating array of pixels arranged in columns and rows in LCD pixel plane 67 are separated by gaps, (generally defined by the black mask in a liquid crystal display, LCD) with the parallax barrier being an array of vertically extended slits of pitch close to twice the pitch of the pixel columns. The parallax barrier limits the range of angles from which light from each pixel column can be seen, thus creating the viewing windows at a region in front of the display.

In order to steer the light from each pixel to the viewing window, the pitch of the parallax barrier is slightly smaller than twice the pitch of the pixel array. This condition is known as "viewpoint correction". In the type of display illustrated in FIG. 1, the resolution of each of the stereo pair images is half the horizontal resolution of the base LCD, and two views are created. Thus, the light from the odd columns of pixels 68,70, 72,74 can be seen from the left viewing window, and the light from the even columns of pixels 69,71,73,75 can be seen from the right viewing window. If the left eye image data is placed on the odd columns of the display and the right eye image data on the even columns then the observer in the correct "orthoscopic" position should fuse the two images to see an autostereoscopic 3D image across the whole of the display.

U.S. Pat. No. 7,154,653 entitled "Parallax Barrier and Multiple View Display" and issued to Kean et al., discloses various embodiments of parallax barriers for use in both multi-user and 3D displays. The background discussion of U.S. Pat. No. 7,154,653 and the figures referenced therein from columns 1 through column 5, which are hereby incorporated herein by reference, discuss the characteristics of parallax optics that may be varied or modified in order to control the size of, and the angle between, viewing windows, or viewing regions, to which the multiple images (e.g., left eye and right eye) produced by the display are directed. The function of the parallax optic is to restrict the light transmitted through the pixels to certain output angles, thereby defining the angle of view of the pixels behind a specific part of the parallax optic structure (e.g., a slit or lenslet or lenticule.) For flat panel autostereoscopic displays, the formation of the viewing regions is typically due to a combination of the pixel structure of the display unit and the light-directing optical element, or parallax optic.

U.S. Pat. No. 7,154,653 discloses the display 30 shown in FIG. 2A herein. Display 30 is a two view directional display which may be used as an autostercoscopic 3D display or as a display for providing two unrelated views to one or more observers. The display comprises a spatial light modulator in the form of a liquid crystal display (LCD) 20. LCD 20 is pixellated, which is defined herein to indicate a display that substantially comprises a subpixel repeating group of at least two primary color subpixels. LCD 20 operates in transmissive mode so as to modulate light passing through the subpixels from a backlight (not shown). However, U.S. Pat. No. 7,154, 653 notes that other types of display may be used to modulate light in transmissive or reflective modes or to generate light within the display device itself (in the case of a front parallax barrier arrangement). Display 30 also comprises a parallax barrier 21 disposed in front of LCD 20, i.e. between the LCD 20 and the viewer or viewers. Barrier 21, illustrated in more detail in FIG. 2B herein, provides regions 22 and 23 which are substantially opaque to light from the LCD 20 and slits therebetween which are substantially transmissive to light from the LCD 20. The regions 22 and 23 have a finite width and all of the slits have the same maximum light transmission. The columns of subpixels of LCD 20 are formed with a substantially uniform pitch p in a direction perpendicular to the longitudinal axes of the columns, the direction of which is generally horizontal during normal use of the display. The slits of barrier 21 are arranged non-periodically, extend parallel to the longitudinal axis of the subpixel columns, and are arranged in evenly spaced groups of slits with the slits in each group being evenly spaced. FIG. 2A also shows details of an illustrated embodiment of parallax barrier 21 with respect to the size and arrangement of the slits.

With continued reference to FIG. 2A, display 30 is driven by display driver 25 such that image data for the two views which are to be displayed are interlaced as vertical stripes. The display driver 25 may be arranged to receive images for display and to interlace the data so as to ensure that the individual pixel columns display the correct vertical slices of the images. The display driver 25 may form part of the display or may be embodied partly or wholly within other apparatus, such as a computer, microprocessor or the like. The images may be captured "real" images or may be computer-generated. The images may form a stereoscopic pair for autostereoscopic 3D use of the display or may be stereoscopically unrelated images. The slits of barrier 21 are aligned with or adjacent to the middle lines of the columns of pixels. Display driver 25 supplies vertical image slices to a group of four columns of pixels nearest each group of slits. The slits of the barrier 21 cooperate with the pixellation of the LCD 20 so as to define or create five viewing regions. In each of the viewing regions, each group of slits restricts visibility of the columns of pixels such that two adjacent pixel columns only are visible to a viewer viewing the display from the viewing region.

With reference to FIG. 2C, display driver 25 supplies the pixel image data to the LCD 20 such that first and second image slices are provided from one of the images and third and fourth image slices are provided from the other of the images. Thus, the first and second images forming the first and second views are visible in the viewing regions D and B, respectively. When providing autostereoscopic viewing, provided the left and right eyes of the observer are in the viewing regions B and D, respectively, a stereoscopic pair of images can be viewed correctly to provide the 3D effect. Conversely, a viewer whose eyes are in the viewing region D can see one of the images but not the other whereas a viewer whose eyes are in the region B can see the other image but not the first image. The viewing regions to either side of the regions B and D which are actually used contain 50% of each image, reducing the contribution to crosstalk from neighboring viewing regions. Display 30 makes use of 50% of the available light and each image is displayed by 50% of the subpixels so that the horizontal resolution is 50% of the LCD resolution.

U.S. Pat. No. 7,058,252 referenced above also describes a type of display that is capable of operating in both 3D and two-dimensional (2D) modes. This type of display is referred to therein as a "2D 3D switchable display" and U.S. Pat. No. 7,058,252 discusses several examples of such displays, one of which is illustrated in FIGS. 3A and 3B herein. FIG. 3A shows a display comprising a backlight 60, producing light output 62 which is incident on an LCD input polariser 64, an LCD TFT substrate 66, an LCD pixel plane 67 comprising an array of pixels arranged in columns and rows followed by an LCD counter substrate 80, an array of birefringent lenses 138, followed by an isotropic lens microstructure 134 followed by a lens substrate 132. The previous items can be grouped as a directional display device 236. Following the directional display device 236, a polarization modifying device 146 is positioned. One illustrative configuration of the operation of the display in the 2D mode is also shown along the propagation direction 238. The polarization modifying device 146 transmits horizontal linearly polarized light and extinguishes vertically polarized light. The LCD input polarization 240 is at 90-degrees and is rotated by the ON state of the liquid crystal material in the pixel apertures 78 to a horizontal polarization (0-degrees angle) 242 by the twisted nematic layer, thereby providing a normally white (NW) mode. In the NW mode ON state, no voltage is applied to the liquid crystal layer. Voltage is applied to switch the output to an OFF state, or intermediate levels. The birefringent microlenses 138 are index matched in this polarization and so do not impart any directionality to the illumination. The output of the polarization modifying device 146 is horizontal linear polarization 244.

FIG. 3B shows the configuration for the 3D operation of the display shown in FIG. 3A, along the propagation direction 238. In this case, the polarization modifying device 146 is arranged to transmit vertically linearly polarized light and extinguish horizontally polarized light. The LCD input polarization 240 is at 90-degrees and is not rotated by the ON state of the liquid crystal material to a horizontal polarization (0-degrees angle) 242 by the twisted nematic layer, thereby providing a normally black (NB) mode. In the NB mode ON state, voltage is applied to the liquid crystal layer. Reducing voltage is applied to switch the output to an OFF state, or intermediate levels. The polarization state 246 incident on the birefringent microlenses 138 is given directionality by the birefringent lens 138. In this case, the polarization modifying device 146 is configured to transmit vertical linear polarization state 248, such that the 3D mode illumination structure is transmitted.

Additional information about three-dimensional displays may be found in chapter 2.6 in the Handbook of Optoelectronics, Dakin and Brown, eds., Vol. II, entitled "Three-dimensional display systems," published by CRC Press (2006), which chapter is hereby incorporated by reference herein.

U.S. Pat. No. 7,058,252 referenced above also describes a multi-user display embodiment, shown herein in FIG. 4. FIG. 4 shows in plan view a birefringent microlens display 406 producing viewing windows 408, 410, 412 and 414. The window size is arranged to be greater than the interocular separation of the viewers. Display 406 is suitable for use, for example, on the dashboard of an automobile. The driver places his right eye 416 in window 408, and also his left eye 418 in the same window 408. Similarly the passenger places his left eye 422 and right eye 420 in a single window 414. For a two view display, windows 408 and 412 contain the same information and windows 410 and 414 contain the same information. For aberrational design purposes, it may be convenient to have the windows 410 and 412 between the passenger and driver of the display. If a first image 426 and a second image 428 are input, then an image signal interlacer 424 will put image 426 on the even columns of the display for example, and image 428 on the odd columns of the display for example. The optical elements of the display will direct image 426 to the driver in window 408 and image 428 to the passenger in window 414. U.S. Pat. No. 7,058,252 notes that the display operates in the same manner as the 2D 3D switchable displays described therein, except that viewing windows 408, 410, 412 and 414 are substantially larger than the viewing windows produced by the 2D 3D switchable displays to allow for different viewers to be positioned in different windows. U.S. Pat. No. 7,058,252 further notes that such multi-viewer displays may have two modes of operation: in one mode of operation all viewers can see the same image and in a second mode of operation different viewers can see different images to allow multiple simultaneous uses of the same display.

U.S. Pat. No. 6,424,323, entitled "Electronic Device Having a Display" and issued to Bell et al., also discloses an electronic device having a display and an image deflection system overlying the display, wherein the display is controlled to provide at least two independent display images which, when displayed through the image deflection system, are individually visible from different viewing positions relative to the display. One embodiment of an image deflection system disclosed is a lenticular screen comprising a plurality of lenticles (also referred to as lenticules.) The lenticles extend across the display so that different images are visible as a function of the angle of inclination of the viewer with respect to the screen. In this way, a single user may view the different images by tilting the device about a horizontal axis.

Viewing Window Performance Issues

The term "cross talk" refers to light leakage between the two views such that some of the left eye image will be seen by the right eye and vice versa. Cross talk generates visual strain when viewing 3D displays, and control of cross talk is an important factor in 3D display development. For flat panel autostereoscopic displays (in particular those based on LCD technology), the limitation of window performance is generally determined by the shape and aperture ratio of the pixel and the quality of the optical element. U.S. Pat. No. 7,058,252 referenced above notes that the angles of the output cone of light emitted from the display are determined by the width and shape of the pixel aperture and the alignment and aberrations of the parallax optic. The disclosure in U.S. Pat. No. 7,154,653 further notes that attempts to reduce cross talk (i.e., light leakage between images) by reducing the width of the slits in the parallax barrier may result in uneven color balance as more of one color subpixel becomes visible to the observer, or the color balance may change with the angle of view.

The disclosure in U.S. Pat. No. 7,154,653 further notes that, in order to increase the lateral viewing freedom of the display, more than two pixel columns can be placed under each slit of the parallax barrier. For example, four columns will create four windows in which the view is changed for each window. Such a display will give a "look-around" appearance as the observer moves. The longitudinal freedom is also increased by such a method. However, in this case, the resolution of the display is limited to one quarter of the resolution of the base panel. Moreover, parallax barriers rely on blocking the light from regions of the display and therefore reduce the brightness and device efficiency, generally to approximately 20-40% of the original display brightness.

U.S. Pat. No. 7,154,653 discloses that LCD 20 shown in FIG. 2A herein is of a "conventional" type of display in which "white" pixels are divided into repeating groups of color sub-pixels. In particular, the pixel columns of each group of three columns are provided with red, green and blue filter strips so that all of color sub-pixels in each column display the same color and adjacent pairs of columns display different colors with the pattern red (R), green (G) and blue (B) repeating across the display. U.S. 7,154,653 notes that, although the correct color balance is obtained for the right and left views with such an arrangement, there is a substantial non-uniformity in the spacing of single colors for each view. Such uneven spacing can be very visible in low resolution displays, and therefore detracts from image quality. Also, for each view, the ordering of the color sub-pixels does not follow the same repeating pattern of the three color sub-pixels that comprise LCD 20; this is referred to as "crossing over" in the ordering of the components of each white pixel, and such crossing over can lead to further undesirable image artifacts. U.S. Pat. No. 7,154,653 further discloses examples of alternative subpixel arrangements or layouts other than the standard repeating RGB sub-pixel arrangement. One such arrangement provides for no crossing over in the ordering of the sub-pixel components of a pixel that produces a white color and reduces the spacing of individual color sub-pixels in each view, with a goal of improving the image quality.

U.S. Pat. No. 6,023,315 entitled "Spatial light modulator and directional display" and issued to Harrold et al., discloses a liquid crystal spatial light modulator comprising columns and rows of picture elements, arranged as groups of columns, for instance under respective parallax generating elements in an autostereoscopic 3D display. The picture elements are arranged as sets to form color picture elements such that the picture elements of each set are disposed at the apices of a polygon, such as a triangle, and are disposed in corresponding columns of the groups of columns. U.S. Pat. No. 6,023,315 comments on the deficiencies of using a spatial light modulator having the conventional RGB vertical or horizontal stripe subpixel arrangement, or the known RGGB quad subpixel arrangement, to produce stereoscopic images for a 3D display, citing problems with color integration. In order to alleviate these problems, U.S. Pat. No. 6,023,315 discloses various embodiments of sub-pixel arrangements and groupings of sub-pixels, called "tessellations," that are designed so that color integration occurs over a substantially larger range of viewing distances. One set of several such arrangements makes use of red, green, blue and white sub-pixels.

BRIEF DESCRIPTION OF THE DRAWINGS

The accompanying drawings are incorporated in, and constitute a part of this specification, and illustrate exemplary implementations and embodiments.

FIG. 2A is a diagrammatic view of a second exemplary flat panel autostereoscopic display having a parallax barrier structure;

FIG. 2B is a plan view of a portion of the parallax barrier structure of the display shown in FIG. 2A.

FIG. 2c is a diagrammatic view of the viewing windows produced by the display shown in FIG. 2A.

FIGS. 9A and 9B each illustrate a subpixel repeating group comprising subpixels in three primary colors and white.

FIG. 10 illustrates the subpixel repeating group of FIG. 9A positioned on the two-dimensional spatial grid of FIG. 5, and further showing a portion of a primary color resample area array for the subpixel repeating group of FIG. 9A superimposed thereon.

FIGS. 18B and 18C illustrates the subpixel arrangements of first and second image views produced by the display panel of FIG. 18A when used in a directional display device.

SUMMARY

Figure 1:
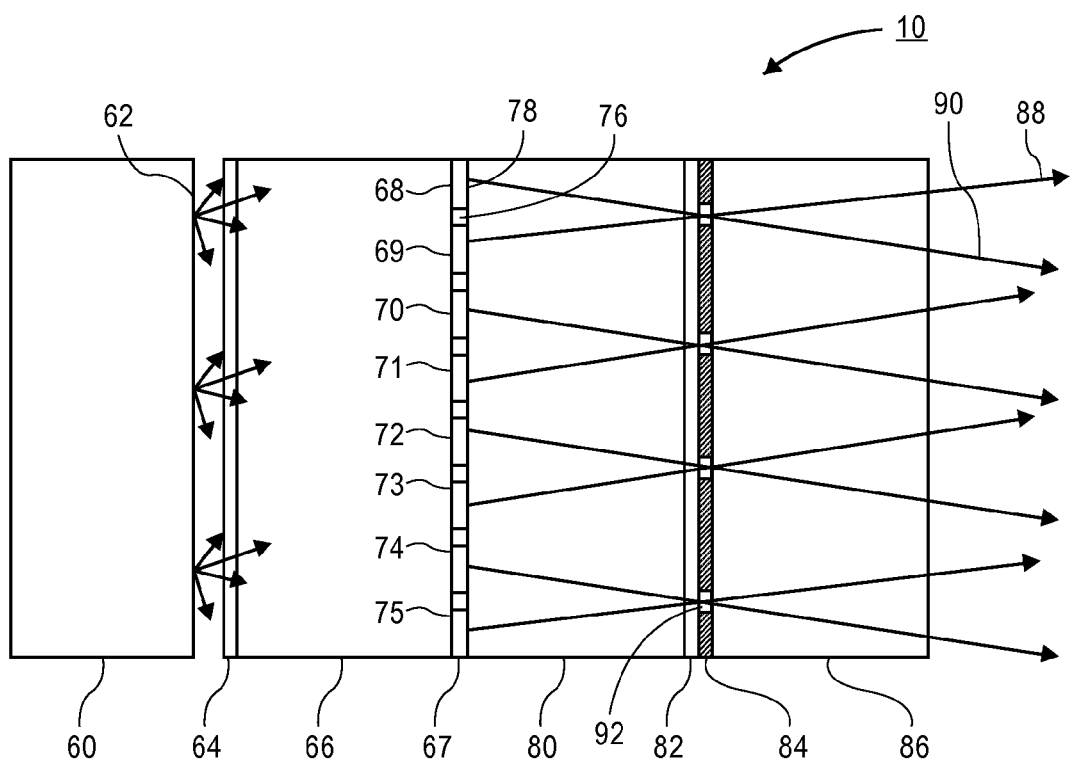
FIG. 1 is a diagrammatic plan view of a first exemplary flat panel autostereoscopic display having a parallax barrier structure.
Figure 3A:
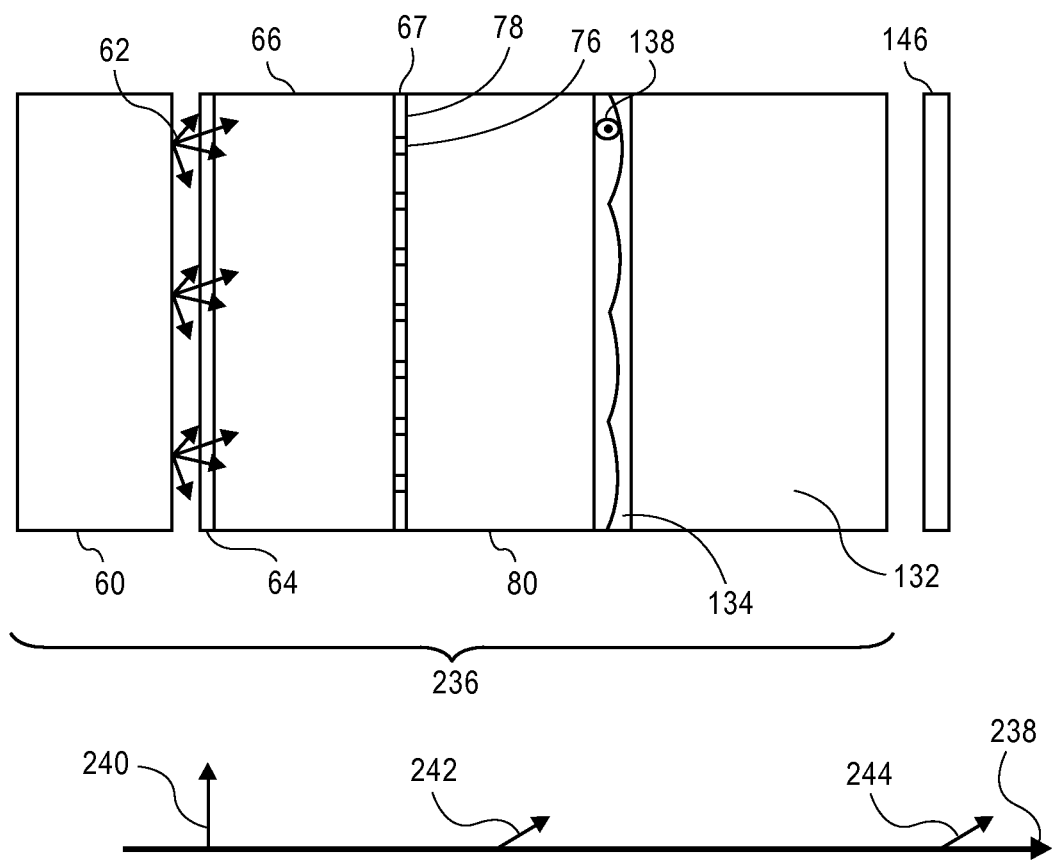
FIG. 3A illustrates a diagram of a 2D 3D switchable display apparatus and the flow of light therethrough when operating in a 2D mode.
Figure 3B:
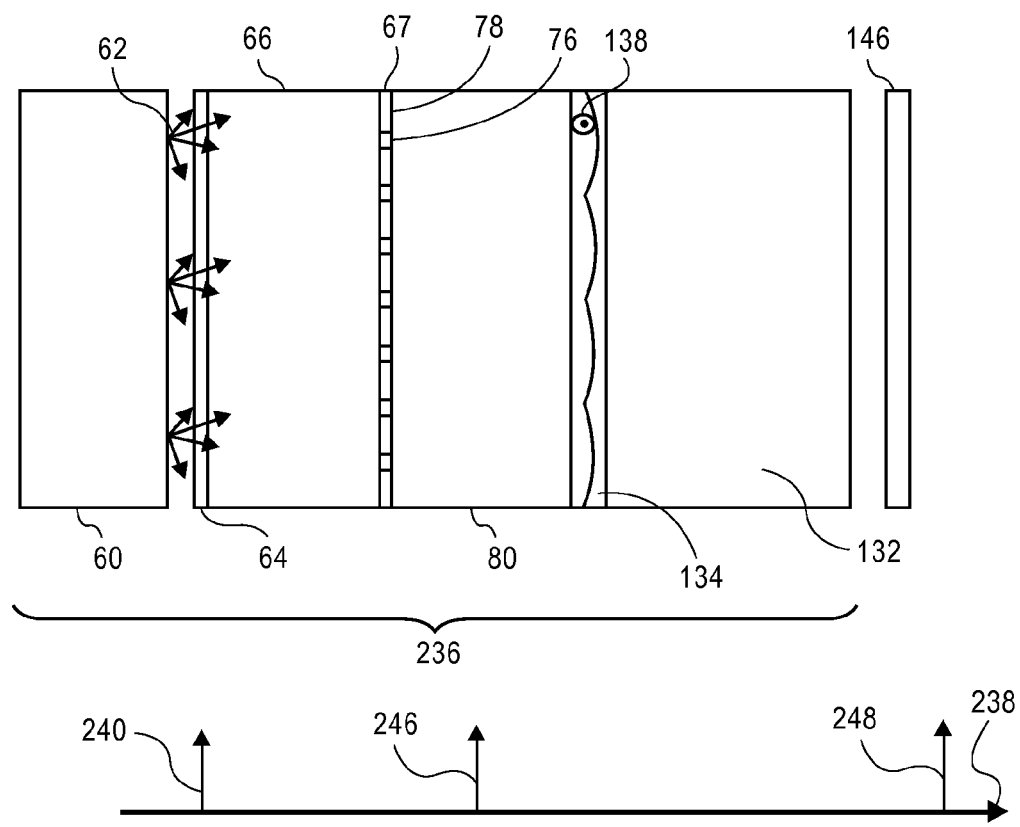
FIG. 3B illustrates a diagram of a 2D 3D switchable display apparatus and the flow of light therethrough when operating in a 3D mode.
Figure 4:
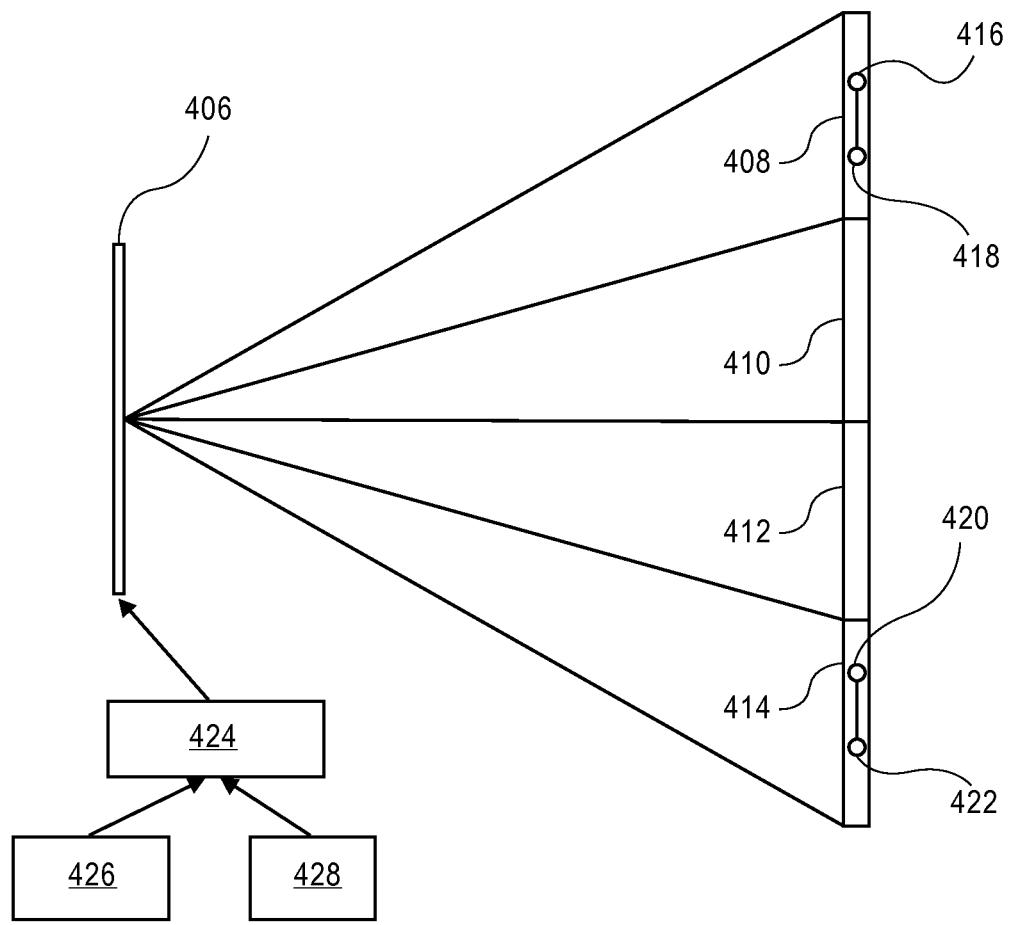
FIG. 4 illustrates a diagram of a multi-viewer display apparatus that produces at least two images in different viewing windows for viewing by at least two viewers.

This discussion discloses display devices and systems that are configured with display panels substantially comprising one of several embodiments of three primary color or multi-primary color subpixel repeating groups that are particularly suitable for directional display devices which produce at least two images simultaneously, such as autostereoscopic three-dimensional display devices or multi-view devices. Input image data indicating an image is rendered to a device configured with one of the illustrated subpixel repeating groups using a subpixel rendering operation.

DETAILED DESCRIPTION

Reference will now be made in detail to implementations and embodiments, examples of which are illustrated in the accompanying drawings. Wherever possible, the same reference numbers will be used throughout the drawings to refer to the same or like parts.

The description that follows discusses several embodiments of subpixel arrangements or layouts that are suitable for display panels in directional display devices of the type described above. These subpixel arrangements depart from the conventional RGB stripe layout, and some of these arrangements include more than three primary colors. If input image data is specified in the conventional three-color "whole pixel" RGB format, the input image data may be processed by a subpixel rendering (SPR) operation in order to be rendered (displayed) on a display panel comprising one of these subpixel arrangements. This description first presents an overview of subpixel rendering operations and hardware configurations that are suitable for a display device having a display panel comprising one of these subpixel arrangements, and then describes several exemplary embodiments.

Overview of Subpixel Rendering Techniques

Commonly owned U.S. Pat. No. 7,123,277 entitled "CONVERSION OF A SUB-PIXEL FORMAT DATA TO ANOTHER SUB-PIXEL DATA FORMAT," issued to Elliott et al., discloses a method of converting input image data specified in a first format of primary colors for display on a display panel substantially comprising a subpixel repeating group having a second format of primary colors that is different from the first format of the input image data. U.S. Pat. No. 7,123,277 is hereby incorporated by reference herein for all that it teaches. The term "primary color" refers to each of the colors that occur in the subpixel repeating group. When a subpixel repeating group is repeated across a display panel to form a device with the desired matrix resolution, the display panel is said to be substantially comprised of the subpixel repeating group. In this discussion, a display panel is described as "substantially" comprising a subpixel repeating group because it is understood that size and/or manufacturing factors or constraints of the display panel may result in panels in which the subpixel repeating group is incomplete at one or more of the panel edges. In addition, any display would "substantially" comprise a given subpixel repeating group when that display had a subpixel repeating group that was within a degree of symmetry, rotation and/or reflection, or any other insubstantial change, of one of the illustrated embodiments of a subpixel repeating group described in the appended claims. Reference to display systems or devices using more than three primary subpixel colors to form color images are referred to herein as "multi-primary" display systems. In a display panel having a subpixel repeating group that includes a white (clear) subpixel, the white subpixel represents a primary color referred to as white (W) or "clear", and so a display system with a display panel having a subpixel repeating group including RGBW subpixels is a multi-primary display system.

By way of example, an input image is presumed to be specified as a two-dimensional array of color values specified in the conventional red (R). green (G) and blue (B) triplet of data values, considered to be the first format of the input image data. Each RGB triplet specifies a color at a pixel location in the input image. The display panel substantially comprises a plurality of a subpixel repeating group that specifies a second format in which the input image data is to be displayed. The subpixel repeating group comprises subpixels in at least first, second and third primary colors that are arranged in at least two rows on the display panel such that the subpixels of two of the primary colors are arranged in what is referred to as a "checkerboard pattern." That is, a second primary color subpixel follows a first primary color in a first row of the subpixel repeating group, and a first primary color subpixel follows a second primary color in a second row of the subpixel repeating group. Note that in U.S. Pat. No. 7,123, 277, subpixels are also referred to as "emitters."

The operation of subpixel rendering the input image data produces a luminance value for each subpixel on the display panel such that the input image specified in the first format is displayed on the display panel comprising the second, different arrangement of primary colored subpixels in a manner that is aesthetically pleasing to a viewer of the image. As noted in U.S. Pat. No. 7,123,277, subpixel rendering operates by using the subpixels as independent pixels perceived by the luminance channel. This allows the subpixels to serve as sampled image reconstruction points as opposed to using the combined subpixels as part of a "true" (or whole) pixel. By using subpixel rendering, the spatial reconstruction of the input image is increased, and the display device is able to independently address, and provide a luminance value for, each subpixel on the display panel.

In addition, another possible desirable feature of the subpixel rendering operation might be to maintain color balance by ensuring that high spatial frequency information in the luminance component of the image to be rendered does not alias with the color subpixels to introduce color errors. An arrangement of the subpixels in a subpixel repeating group might be suitable for subpixel rendering if subpixel rendering upon such an arrangement may provide an increase in both spatial addressability, which may lower phase error, and in the Modulation Transfer Function (MTF) high spatial frequency resolution in both horizontal and vertical axes of the display. In the subpixel rendering operation, the plurality of subpixels for each of the primary colors on the display panel may be collectively defined to be a primary color plane (e.g., red, green and blue color planes) and might be treated individually.

In one embodiment, the subpixel rendering operation may generally proceed as follows. The color image data values of the input image data may be treated as a two-dimensional spatial grid 50 that represents the input image signal data, as shown for example in FIG. 5. Each square input sample area 52 of the grid represents the RGB triplet of color values representing the color at that location of the image, with approximately the same area filled physically by the RGB triplet. Each square input sample area 52 of the grid is further shown with a sample point 54 centered in input sample area 52.

Figure 5:
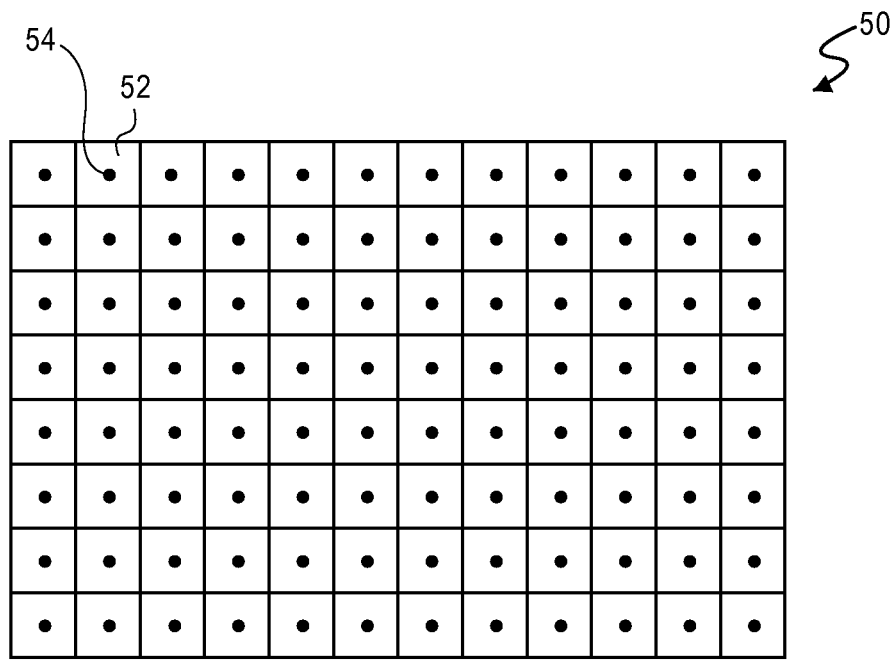
FIG. 5 illustrates a two-dimensional spatial grid representative of input image signal data.
Figure 6:
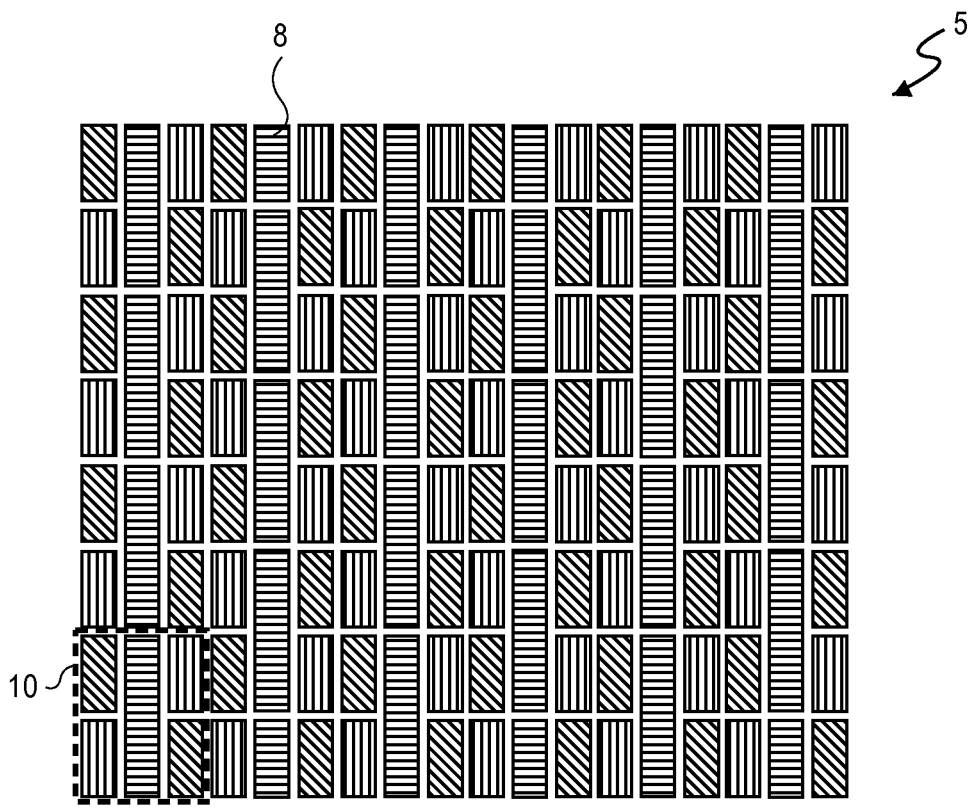
FIG. 6 illustrates a matrix arrangement of a plurality of a subpixel repeating group comprising subpixels in three primary colors that is suitable for a display panel.
Figure 7:
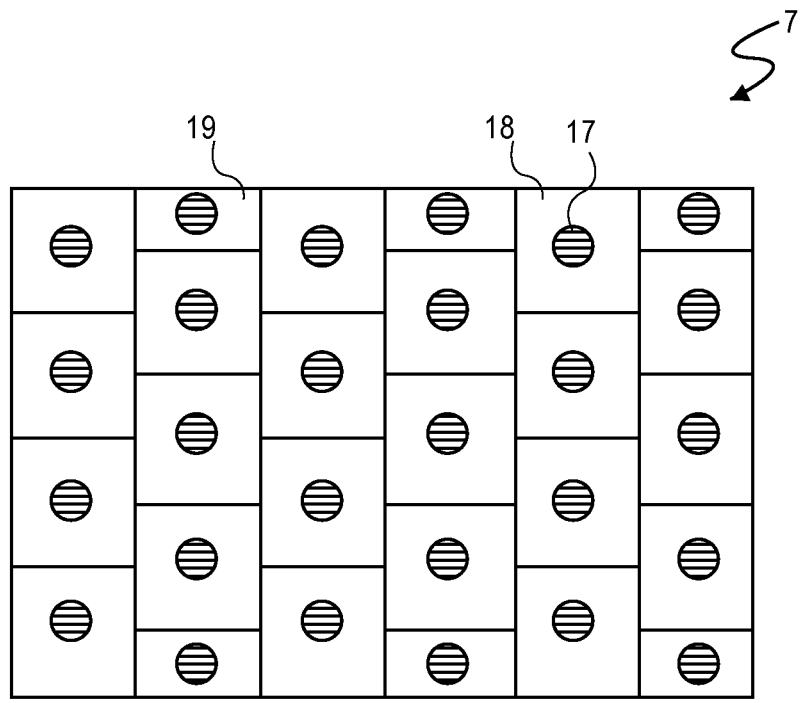
FIG. 7 illustrates a resample area array for a primary color plane of the display panel of FIG. 6, showing reconstruction points and resample areas.

FIG. 6 illustrates an example of a display panel taken from FIG. 6 of U.S. Pat. No. 7,123,277. The display panel comprising the plurality of the subpixel repeating group 10 is assumed to have the same dimensions as the input image sample grid 50 of FIG. 5. In FIG. 6 and in the other Figures that show examples of subpixel repeating groups herein, subpixels shown with vertical hatching are red, subpixels shown with diagonal hatching are green and subpixels 8 shown with horizontal hatching are blue. The location of each primary color subpixel on display panel 5 approximates what is referred to as a reconstruction point (or resample point) used by the subpixel rendering operation to reconstruct the input image represented by spatial grid 50 of FIG. 5 on display panel 5 of FIG. 6. Each reconstruction point is centered inside a resample area. The plurality of resample areas for one of the primary colors comprises a resample area array. FIG. 7 (taken from FIG. 9 of U.S. Pat. No. 7,123,277) illustrates an example of resample area array 7 for the blue color plane of display panel 5, showing reconstruction (resample) points 17, roughly square shaped resample areas 18 and resample areas 19 having the shape of a rectangle.

U.S. Pat. No. 7,123,277 explains how the shape of resample area 18 may be determined in one embodiment as follows. Each reconstruction point 17 is positioned at the center of its respective subpixel (e.g., subpixel 8 of FIG. 6), and a grid of boundary lines is formed that is equidistant from the centers of the reconstruction points; the area within each boundary forms a resample area. A resample area then may be defined in one embodiment by the area closest to its associated reconstruction point, and having boundaries defined by the set of lines equidistant from other neighboring reconstruction points. The grid that is formed creates a tiling pattern. Other embodiments of resample areas are possible. For example, the shapes that can be utilized in the tiling pattern can include, but are not limited to, squares, rectangles, triangles, hexagons, octagons, diamonds, staggered squares, staggered rectangles, staggered triangles, staggered diamonds, Penrose tiles, rhombuses, distorted rhombuses, and the like, and combinations comprising at least one of the foregoing shapes.

Figure 8:
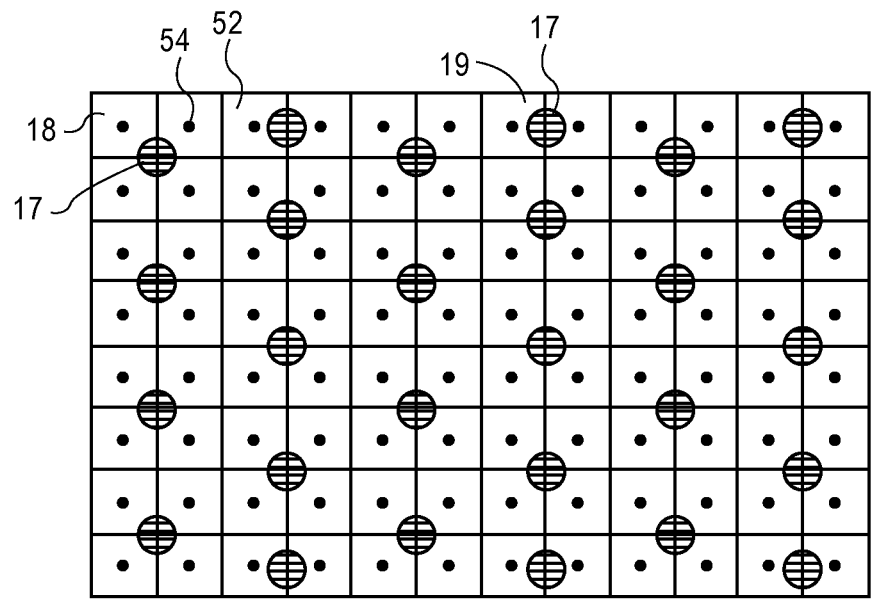
FIG. 8 illustrates the resample area array of FIG. 7 superimposed on the two-dimensional spatial grid of FIG. 5.

Resample area array 7 is then overlaid on input image sample grid 50 of FIG. 5, as shown in FIG. 8 (taken from FIG. 20 of U.S. Pat. No. 7,123,277.) Each resample area 18 or 19 overlays some portion of at least one input image sample area 52 on input image grid 50 (FIG. 5). A set of fractions for each resample area may then be formed. In one embodiment, the denominators of the fractions may be construed as being a function of the resample area and the numerators as being the function of an area of each of the input sample areas that at least partially overlaps the resample area. The set of fractions collectively represent an image filter, also referred to as a filter kernel, and may be stored as a matrix of coefficients. In one embodiment, the total of the coefficients is substantially equal to one. The data values for each input sample area is multiplied by its respective fraction and all products are added together to obtain a luminance value for the resample area. In effect, the area ratios of input to output are determined by either inspection or calculation and stored as coefficients in filter kernels. The filter kernels are transform equations and are generated by determining the relative area overlaps of both the original data set sample areas and target display sample areas. The ratio of overlap determines the coefficient values to be used in the filter kernel array. In the case of the square shaped resample areas 18, each of these overlaps four input sample areas 52. Each input sample area 52 thus contributes one-quarter (¼ or 0.25) of its blue data value to the final luminance value of resample point 17.

The subpixel rendering operation just described is an example of an image processing technique referred to as area resampling. Other types of subpixel rendering techniques may include resampling using bicubic filters, sinc filters, windowed-sinc filters and any convolutions thereof.

In the example illustrated herein, the computations assume that the resample area arrays for the three color planes are coincident with each other and with the input image sample grid 50. It is also possible to align the resample area arrays differently, relative to each other, or relative to the input image sample grid 50. The positioning of the resample area arrays with respect to each other, or with respect to the input image sample grid, is called the phase relationship of the resample area arrays.

Because the subpixel rendering operation renders information to the display panel at the individual subpixel level, the term "logical pixel" is introduced. A logical pixel may have an approximate Gaussian intensity distribution and overlaps other logical pixels to create a full image. Each logical pixel is a collection of nearby subpixels and has a target subpixel, which may be any one of the primary color subpixels, for which an image filter will be used to produce a luminance value. Thus, each subpixel on the display panel is actually used multiple times, once as a center, or target, of a logical pixel, and additional times as the edge of another logical pixel. A display panel substantially comprising a subpixel layout of the type disclosed in U.S. Pat. No. 7,123,277 and using the subpixel rendering operation described therein and above achieves nearly equivalent resolution and addressability to that of a convention RGB stripe display but with half the total number of subpixels and half the number of column drivers. Logical pixels are further described in commonly owned U.S. Patent Application Publication No. 2005/0104908 entitled "COLOR DISPLAY PIXEL ARRANGEMENTS AND ADDRESSING MEANS" (U.S. patent application Ser. No. 10/047,995), which is hereby incorporated by reference herein. See also Credelle et al., "MTF of High Resolution PenTile Matrix™ Displays," published in Eurodisplay 02 Digest, 2002, pp 1-4, which is hereby incorporated by reference herein.

Examples of three-primary color and multi-primary color subpixel repeating groups, including RGBW subpixel repeating groups, and associated subpixel rendering operations are disclosed in the following commonly owned U.S. Patent Application Publications: (1) U.S. Patent Application Publication No. 2004/0051724 (U.S. application Ser. No. 10/243,094), entitled "FOUR COLOR ARRANGEMENTS AND EMITTERS FOR SUB-PIXEL RENDERING;" (2) U.S. Patent Application Publication No. 2003/0128179 (U.S. application Ser. No. 10/278,352), entitled "COLOR FLAT PANEL DISPLAY SUB-PIXEL ARRANGEMENTS AND LAYOUTS FOR SUB-PIXEL RENDERING WITH SPLIT BLUE SUB-PIXELS;" (3) U.S. Patent Application Publication No. 2003/0128225 (U.S. application Ser. No. 10/278,353), entitled "COLOR FLAT PANEL DISPLAY SUBPIXEL ARRANGEMENTS AND LAYOUTS FOR SUBPIXEL RENDERING WITH INCREASED MODULATION TRANSFER FUNCTION RESPONSE;" (4) U.S. Patent Application Publication No. 2004/0080479 (U.S. application Ser. No. 10/347,001), entitled "SUBPIXEL ARRANGEMENTS FOR STRIPED DISPLAYS AND METHODS AND SYSTEMS FOR SUB-PIXEL RENDERING SAME;" (5) U.S. Patent Application Publication No. 2005/0225575 (U.S. application Ser. No. 10/961,506), entitled "NOVEL SUBPIXEL LAYOUTS AND ARRANGEMENTS FOR HIGH BRIGHTNESS DISPLAYS;" and (6) U.S. Patent Application Publication No. 2005/0225563 (U.S. application Ser. No. 10/821,388), entitled "SUBPIXEL RENDERING FILTERS FOR HIGH BRIGHTNESS SUBPIXEL LAYOUTS." Each of these aforementioned Patent Application Publications is incorporated herein by reference for all that it teaches.

U.S. 2005/0225575 entitled "NOVEL SUBPIXEL LAYOUTS AND ARRANGEMENTS FOR HIGH BRIGHTNESS DISPLAYS" discloses a plurality of high brightness display panels and devices comprising subpixel repeating groups having at least one white (W) subpixel and a plurality of primary color subpixels. The primary color subpixels may comprise red, blue, green, cyan or magenta in these various embodiments. U.S. 2005/0225563 entitled "SUBPIXEL RENDERING FILTERS FOR HIGH BRIGHTNESS SUBPIXEL LAYOUTS" discloses subpixel rendering techniques for rendering source (input) image data for display on display panels substantially comprising a subpixel repeating group having a white subpixel, including, for example, an RGBW subpixel repeating group. FIGS. 9 and 10 herein, which are reproduced from FIGS. 5A and 5B of U.S. 2005/0225563, illustrate exemplary RGBW subpixel repeating groups 3 and 9 respectively, each of which may be substantially repeated across a display panel to form a high brightness display device. RGBW subpixel repeating group 9 is comprised of eight subpixels disposed in two rows of four columns, and comprises two of red subpixels 2, green subpixels 4, blue subpixels 8 and white (or clear) subpixels 6. If subpixel repeating group 9 is considered to have four quadrants of two subpixels each, then the pair of red and green subpixels are disposed in opposing quadrants, analogous to a "checkerboard" pattern. Other primary colors are also contemplated, including cyan, emerald and magenta. US 2005/0225563 notes that these color names are only "substantially" the colors described as "red", "green", "blue", "cyan", and "white". The exact color points may be adjusted to allow for a desired white point on the display when all of the subpixels are at their brightest state.

US 2005/0225563 discloses that input image data may be processed as follows: (1) Convert conventional RGB input image data (or data having one of the other common formats such as sRGB, YCbCr, or the like) to color data values in a color gamut defined by R, G, B and W, if needed. This conversion may also produce a separate Luminance (L) color plane or color channel. (2) Perform a subpixel rendering operation on each individual color plane. (3) Use the "L" (or "Luminance") plane to sharpen each color plane.

The subpixel rendering operation for rendering input image data in a conventional RGB format onto a display panel comprising an RGBW subpixel repeating group of the type shown in FIGS. 9A and 9B generally follows the principles disclosed and illustrated in U.S. Pat. No. 7,123,277 and as described above, with some modifications. The subpixel rendering filter kernels may be constructed using the area resampling principles described in U.S. Pat. No. 7,123,277. In one embodiment, a unity filter is used to map the incoming luminance data to the white subpixels; that is, the luminance signal from one incoming conventional image pixel directly maps to the luminance signal of one white subpixel in a subpixel repeating group. The white subpixels reconstruct the bulk of the non-saturated luminance signal of the input image data, and the surrounding primary color subpixels provide the color signal information.

US 2005/0225563 discloses some general information regarding performing the subpixel rendering operation for RGBW subpixel repeating groups that have red and green subpixels arranged in opposing quadrants, or on a "checkerboard." The red and green color planes may use Difference of Gaussian (DOG) Wavelet filter followed by an Area Resample filter. The Area Resample filter removes any spatial frequencies that will cause chromatic aliasing. The DOG wavelet filter is used to sharpen the image using the cross-color component. That is to say, the red color plane is used to sharpen the green subpixel image and the green color plane is used to sharpen the red subpixel image. US 2005/0225563 discloses an exemplary embodiment of these filters as follows:

TABLE 1

| −0.0625 | 0 | −0.0625 |   | 0 | 0.125 | 0 |   | −0.0625 | 0.125 | −0.0625 |
|---|---|---|---|---|---|---|---|---|---|---|
| 0 | 0.25 | 0 | + | 0.125 | 0.5 | 0.125 | = | 0.125 | 0.75 | 0.125 |
| −0.0625 | 0 | −0.0625 |   | 0 | 0.125 | 0 |   | −0.0625 | 0.125 | −0.0625 |
| DOG Wavelet Filter | | | + | Area Resample Filter | | | | Cross-Color Sharpening Kernel | | |

The blue color plane may be resampled using one of a plurality of filters, such as 2×2 box filter,

| 0.25 | 0.25 |
|---|---|
| 0.25 | 0.25 | or a box-tent filter centered on the blue subpixel:

| 0.125 | 0.25 | 0.125 |
|---|---|---|
| 0.125 | 0.25 | 0.125 |

In one embodiment of producing the color signal information in the primary color subpixels, each input pixel image data is mapped to two sub-pixels. In effecting this, there are still a number of different ways to align the input image pixels with the primary color subpixels in order to generate the area resampling filters. FIG. 10 (taken from FIG. 6 of US 2005/0225563) illustrates an area resampling mapping of four input image pixels to subpixels in the red color plane of a display panel having the subpixel repeating group shown in FIG. 9A. Input image data is again depicted as shown in FIG. 5, as an array, or grid, 50 of squares, with each square 52 representing the color data values of an input image pixel. Subpixel repeating group 3 of FIG. 9A, shown in the dark outline in FIG. 10, is superimposed upon grid 50 in an alignment in which two subpixels are substantially aligned with the color image data of one input image pixel 52 on grid 50. Black dots 15 represent the centers of red subpixels 2 of subpixel repeating group 3. The resample area array for the red color plane comprises red resample areas such as resample areas 14 and 16 that have a diamond shape, with the center of each resample area being aligned with the center 15 of a red subpixel. It can be seen that the resample areas 14 and 16 each overlay a portion of several input image pixels. Computing the filter coefficients for the area resample filter produces what is referred to as a "diamond" filter, an example of which is the Area Resample Filter illustrated in Table 1 above.

FIG. 10 illustrates a specific alignment of the subpixel repeating group with the input image pixel grid and the resample areas of the red color plane. US 2005/0225563 discloses that any one or more aspects of the alignment of the input image pixel grid with the subpixel repeating group, or with the resample areas for each color plane, the choice of the location of the resample points vis-à-vis the input grid, and the shapes of the resample areas, may be modified to simplify the area resample filters that are produced. Several examples of such modifications are disclosed therein.

Commonly owned International Application PCT/US06/19657 entitled MULTIPRIMARY COLOR SUBPIXEL RENDERING WITH METAMERIC FILTERING discloses systems and methods of rendering input image data to multiprimary displays that utilize metamers to adjust the output color data values of the subpixels. International Application PCT/US06/19657 is published as WO International Patent Publication No. 2006/127555, which is hereby incorporated by reference herein. In a multiprimary display in which the subpixels have four or more non-coincident color primaries, there are often multiple combinations of values for the primaries that may give the same color value. That is to say, for a color with a given hue, saturation, and brightness, there may be more than one set of intensity values of the four or more primaries that may give the same color impression to a human viewer. Each such possible intensity value set is called a "metamer" for that color. Thus, a metamer on a display substantially comprising a particular multiprimary subpixel repeating group is a combination (or a set) of at least two groups of colored subpixels such that there exists signals that, when applied to each such group, yields a desired color that is perceived by the Human Vision System. Using metamers provides a degree of freedom for adjusting relative values of the colored primaries to achieve desired goal, such as improving image rendering accuracy or perception. The metamer filtering operation may be based upon input image content and may optimize subpixel data values according to many possible desired effects, thus improving the overall results of the subpixel rendering operation.

For example, in an RGBW system, a W subpixel is a metamer for the color grey with a nearby group of R, G, and B subpixels. The subpixels that are used for creating a given color may be any nearby subpixels that are close enough that the Human Vision System will blend the colors together. These degrees of freedom—choosing signal values from among similar color subpixels coupled with the degree of freedom afforded by choosing among metamers, and thus signal values among different sets of color subpixels—allow the luminance component of a given image to be represented possibly with greater fidelity at the subpixel level while maintaining the correct brightness and color at a global (or perceptual) level. This freedom to select a color from among various metamers thus creates a new possibility to improve images. For example, a display can be designed to select metamers in such a way that the W subpixel values are increased when they lie on the bright side of a high-frequency edge or decreased when they lie on the dark side of high-frequency edges. When red and green subpixel pairs fall on the bright side of a high-frequency edge in an image, it may be desirable to select a metamer such that the R and G subpixel values are increased. Conversely, when the red and green subpixel pair lies on the dark side of an edge, the red and green subpixel values may be decreased.

WO 2006/127555 discloses at least two embodiments for implementing the functions of metamer filtering. In one embodiment, a metamer filtering operation precedes a subpixel rendering operation in the image processing pipeline, in effect combining the operations. In WO 2006/127555, this is referred to as "direct metamer filtering." In a second embodiment, the metamer filtering operation may be accomplished in a separate pass over the input image pixel data. In WO 2006/127555, this is referred to as "preconditioning metamer filtering."

WO 2006/127555 further discloses that, in terms of calculating metamers, it is possible to model the dynamic relationships between metamer subpixel groups and associated signals. For example, it is possible to find substantially linear relationships between the metamers and signals of any particular color—to allow calculating "nearby" metamers and signals. Such a model could be used to adjust intensity values of subpixels comprising a metamer in a manner so as to minimize image artifacts and errors—such as color error or the like. From such a model, intensity adjustment values may be stored in a display system and employed whenever there is a need to adjust image data in according with certain data, such as luminance data. An example given for such adjustments is described as follows: When one of the primaries in a metamer is changed by an amount "a", one might change each of the other primaries by an amount "a*m" where the term "m" is the Thetamer slope, which may be different for each of the primaries. The slope term "m" may be calculated from the matrix M2X that converts colors from the multi-primary system into CIE XYZ co-ordinates. It is known in the art to calculate this conversion matrix from measurements of the chromaticity and luminosity of the primaries of a multi-primary system, as discussed, for example, in co-owned United States Patent Application Nos. 2005/0083341 and 2005/0083352. WO 2006/127555 provides a methodology for computing the metamer slope term "m" for a given set of primary colors on a particular display.

Figure 11:
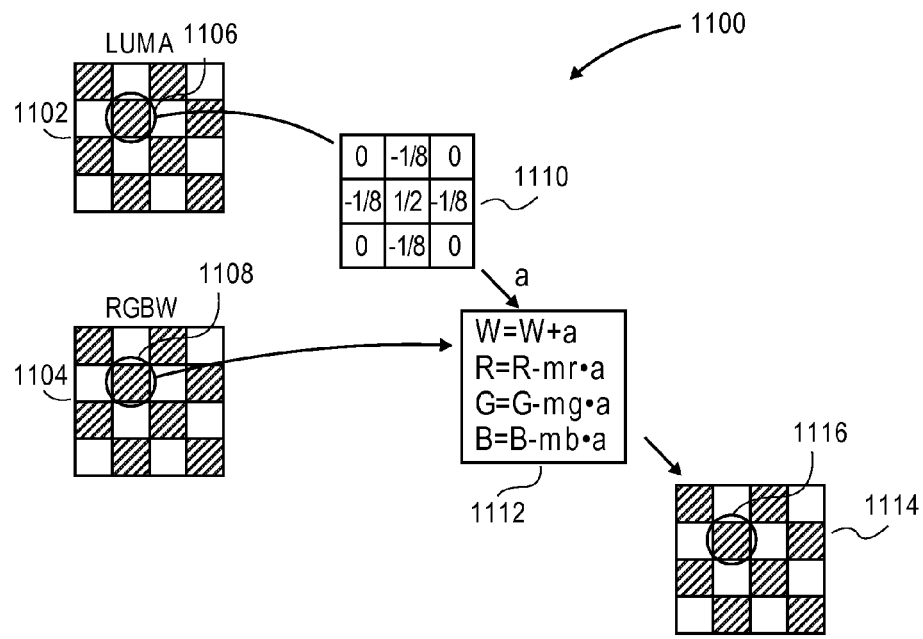
FIG. 11 is a diagram illustrating a metamer filtering operation.
Figure 12:
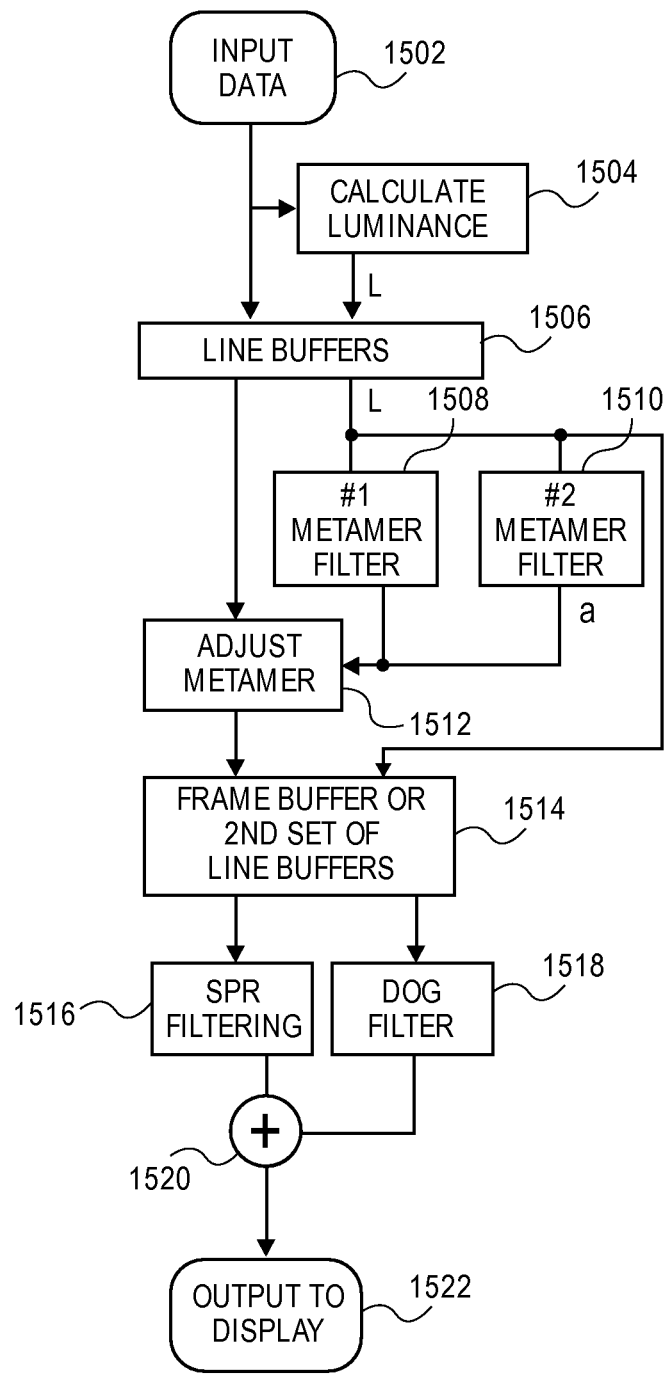
FIG. 12 is a flowchart for an embodiment of a metamer filtering operation followed by a subpixel rendering operation.

FIG. 11 herein is taken from FIG. 11 in WO 2006/127555, and schematically shows one embodiment of a metamer filtering operation. Input image data is represented by luminance data 1102 and color data 1104. These data sets may be substantially coincident spatially—e.g. 1102 is the luminance data of image data 1104. Luminance channel 1102 is sampled for high frequency information with a filter kernel 1110. This filter may be applied to a 3×3 area centered on a blue-white (BW) pixel pair 1106. The result is a sharpening value 'a', which is used to change the metamer of a color in box 1112. For each value 1106 in the luminance channel 1102, there is a corresponding R G B and W value 1108 shown diagrammatically in the color channels 1104. The RGBW values have their metamer changed in step 1112. The resulting metamer 1116 is stored in output buffer 1114 or passed on to the next step of processing. The red-green (RG) subpixel pairs are processed in a similar fashion (not shown in figures here) but with a different filter kernel. Values centered on an RG subpixel pair are sampled from the luminance channel and convolved with the filter kernel. The resulting sharpness value 'a' is used to calculate a new metamer for an RGBW value from the color channels. The resulting new metamer is stored in an output buffer or passed on to the next step of processing. FIG. 12, taken from FIG. 15 in WO 2006/127555, illustrates such an embodiment. WO 2006/127555 discloses that the filter kernels shown and described therein are exemplary only, and that other filter kernels may be employed to obtain different values that reflect different relationships between the metamers (for example, a non-linear relationship, or different input image data dimensions, or the like).

Figure 13:
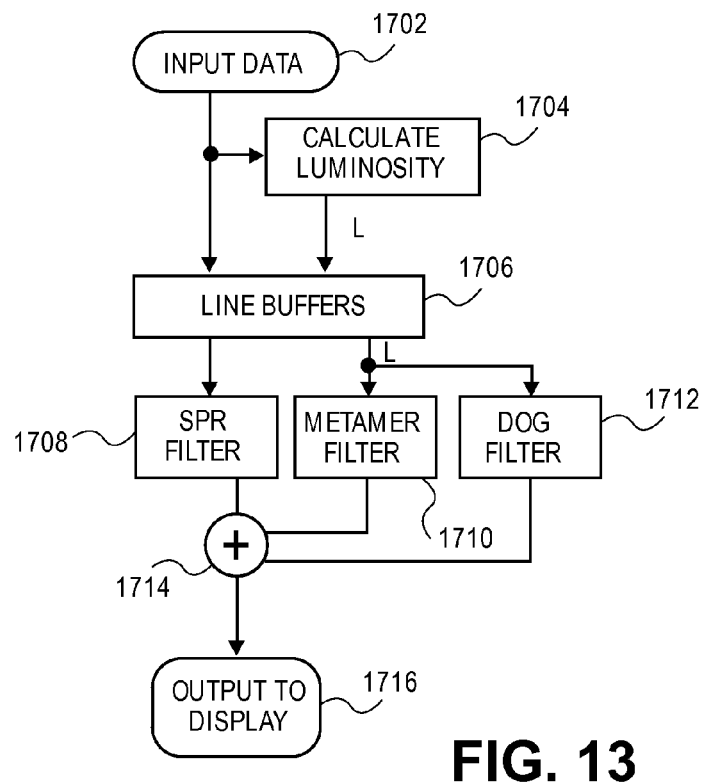
FIG. 13 is a flowchart for an embodiment of a metamer filtering operation combined with a subpixel rendering operation.

WO 2006/127555 further discusses the use of the metamer filtering operation in combination with other subpixel rendering (SPR) techniques, such as the subpixel rendering operation for high brightness layouts described above from US 2005/0225563. Rather than performing the metameric filtering operation as a preconditioning step, it is possible to construct the SPR operation so that it directly performs metamer filtering with subpixel rendering in a single pass. Very generally, using area resampling principles, a sharpening area filter kernel is computed for each color plane and subtracted from an area resampling filter for that color plane to produce a metamer sharpening wavelet filter. The reader is referred to WO 2006/127555 for additional details. FIG. 13, taken from FIG. 17 in WO 2006/127555, illustrates such an embodiment.

WO 2006/127555 also notes that, for all of the figures showing subpixel repeating groups presented therein, additional subpixel layouts may be produced by replacing all or some of the white subpixels with either cyan, yellow, grey or other colors. In addition, the techniques discussed therein encompass the scope of all manners of display technologies, including transmissive and non-transmissive display panels, such as Liquid Crystal Displays (LCD), reflective Liquid Crystal Displays, emissive ElectroLuminecent Displays (EL), Plasma Display Panels (PDP), Field Emitter Displays (FED), Electrophoretic displays, Iridescent Displays (ID), Incandescent Display, solid state Light Emitting Diode (LED) display, and Organic Light Emitting Diode (OLED) displays.

Figure 14A:
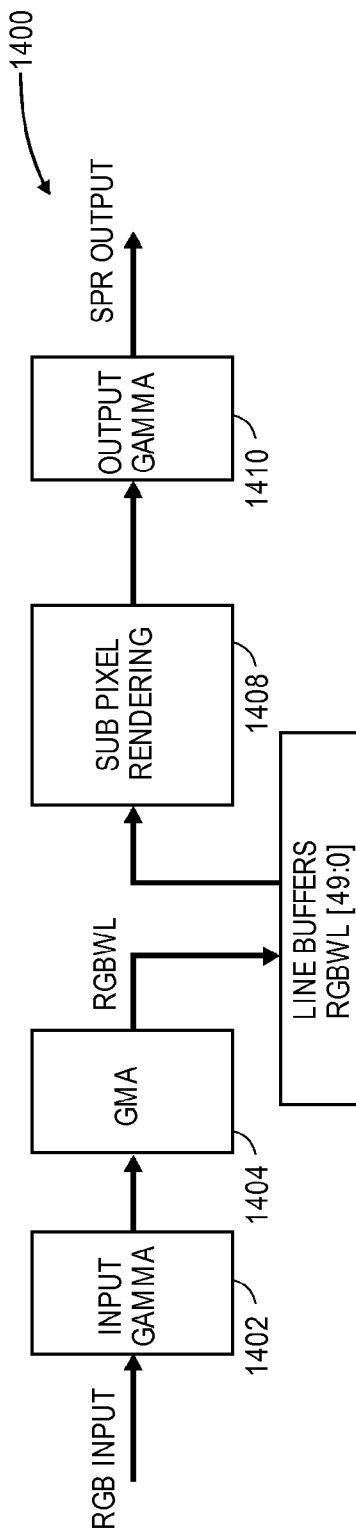
FIGS. 14A and 14B are block diagrams showing the functional components of two embodiments of display devices that perform subpixel rendering operations.
Figure 14B:
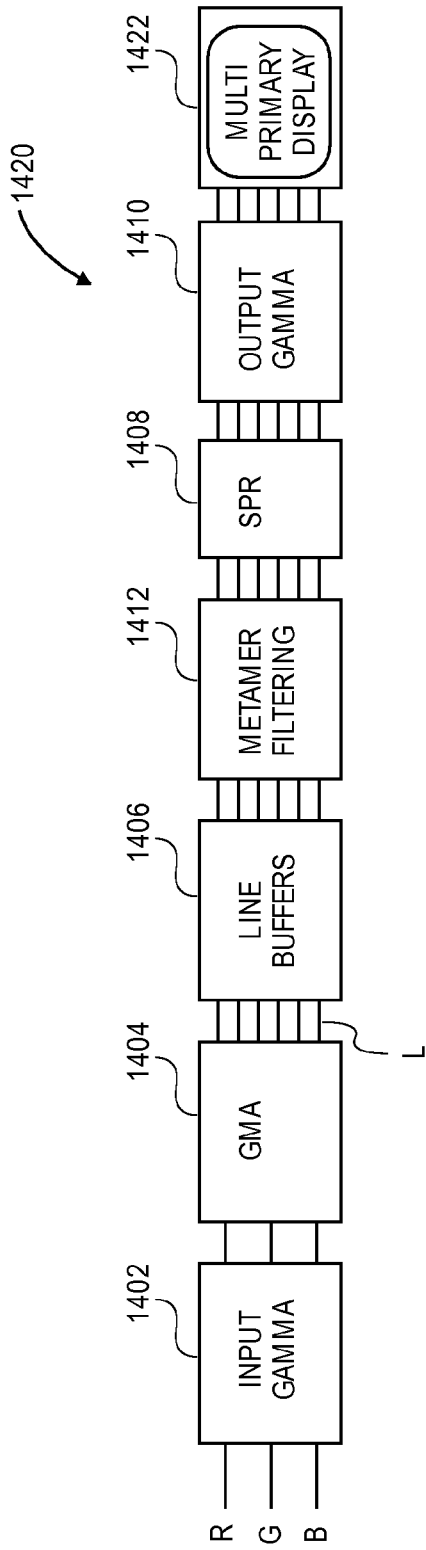

Overview of Display Device Structures for Performing Subpixel Rendering Techniques FIGS. 14A and 14B illustrate the functional components of embodiments of display devices and systems that implement the subpixel rendering operations described above and in the commonly owned patent applications and issued patents variously referenced herein. FIG. 14A illustrates display system 1400 with the data flow through display system 1400 shown by the heavy lines with arrows. Display system 1400 comprises input gamma operation 1402, gamut mapping (GMA) operation 1404, line buffers 1406, SPR operation 1408 and output gamma operation 1410.

Input circuitry provides RGB input data or other input data formats to system 1400. The RGB input data may then be input to Input Gamma operation 1402. Output from operation 1402 then proceeds to Gamut Mapping operation 1404. Typically, Gamut Mapping operation 1404 accepts image data and performs any necessary or desired gamut mapping operation upon the input data. For example, if the image processing system is inputting RGB input data for rendering upon a RGBW display panel, then a mapping operation may be desirable in order to use the white (W) primary of the display. This operation might also be desirable in any general multiprimary display system where input data is going from one color space to another color space with a different number of primaries in the output color space. Additionally, a GMA might be used to handle situations where input color data might be considered as "out of gamut" in the output display space. In display systems that do not perform such a gamut mapping conversion, GMA operation 1404 is omitted. Additional information about gamut mapping operations suitable for use in multiprimary displays may be found in commonly-owned U.S. patent applications which have been published as U.S. Patent Application Publication Nos. 2005/0083352, 2005/0083341, 2005/0083344 and 2005/0225562, all of which are incorporated by reference herein.

With continued reference to FIG. 14A, intermediate image data output from Gamut Mapping operation 1404 is stored in line buffers 1406. Line buffers 1406 supply subpixel rendering (SPR) operation 1408 with the image data needed for further processing at the time the data is needed. For example, an SPR operation that implements the area resampling principles disclosed and described above typically may employ a 3×3 matrix of image data surrounding a given image data point being processed in order to perform area resampling. Thus, three data lines are input into SPR 1408 to perform a subpixel rendering operation that may involve neighborhood filtering steps. After SPR operation 1408, image data may be subject to an output Gamma operation 1410 before being output from the system to a display. Note that both input gamma operation 1402 and output gamma operation 1410 may be optional. Additional information about this display system embodiment may be found in, for example, commonly owned United States Patent Application Publication No. 2005/0083352. The data flow through display system 1400 may be referred to as a "gamut pipeline" or a "gamma pipeline."

FIG. 14B shows a system level diagram 1420 of one embodiment of a display system that employs the techniques discussed in WO 2006/127555 referenced above for subpixel rendering input image data to multiprimary display 1422. Functional components that operate in a manner similar to those shown in FIG. 14A have the same reference numerals. Input image data may consist of 3 primary colors such as RGB or YCbCr that may be converted to multi-primary in GMA module 1404. In display system 1420, GMA component 1404 may also calculate the luminance channel, L, of the input image data signal—in addition to the other multi-primary signals. In display system 1420, the metamer calculations may be implemented as a filtering operation which involves referencing a plurality of surrounding image data (e.g. pixel or subpixel) values. These surrounding values are typically organized by line buffers 1406, although other embodiments are possible, such as multiple frame buffers. Display system 1420 comprises a metamer filtering module 1412 which performs operations as briefly described above, and as described in more detail in WO 2006/127555. In one embodiment of display system 1420, it is possible for metamer filtering operation 1412 to combine its operation with sub-pixel rendering (SPR) module 1408 and to share line buffers 1406. As noted above, this embodiment is called "direct metamer filtering".

Figure 15:
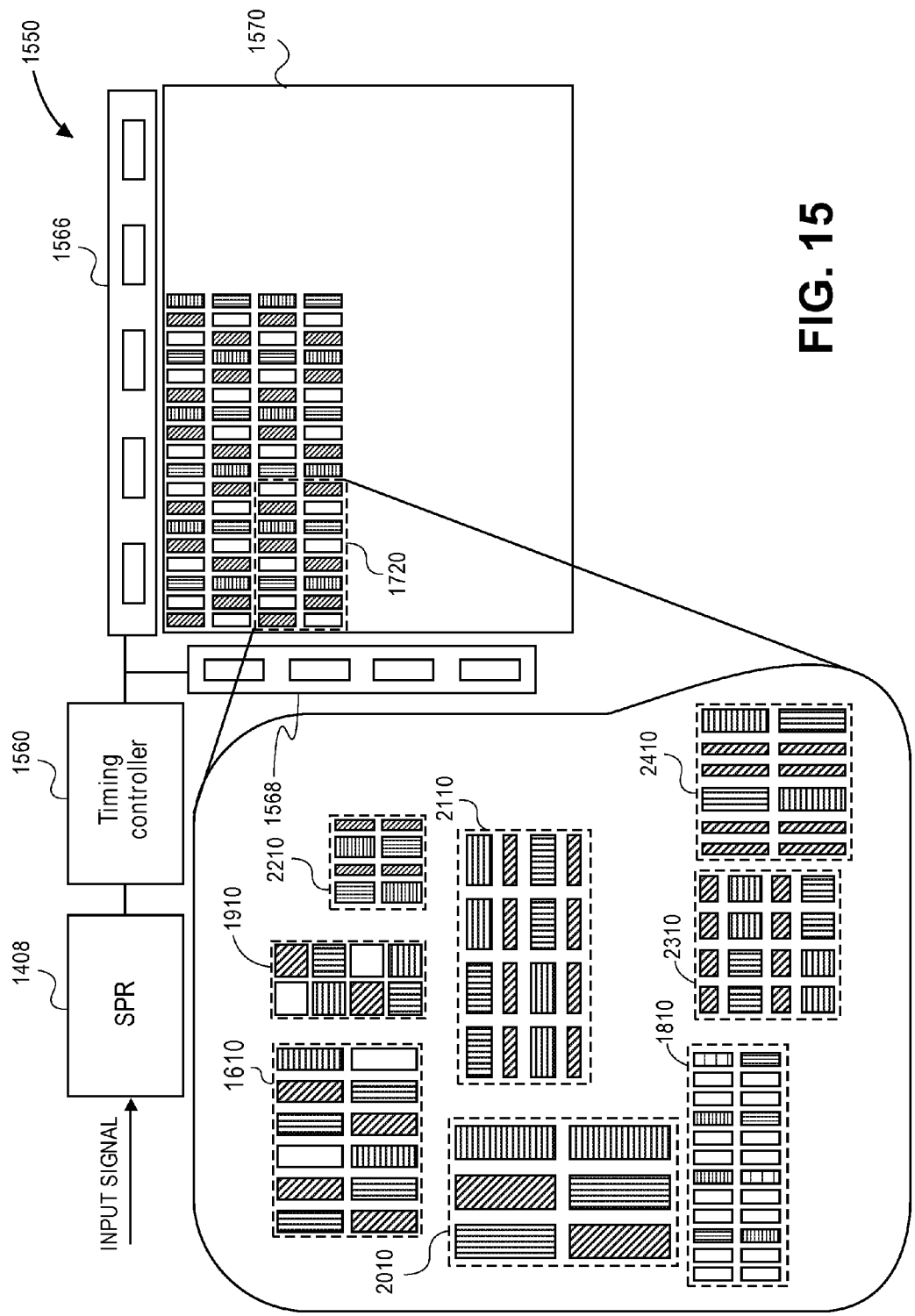
FIG. 15 is a block diagram of a display device architecture and schematically illustrating simplified driver circuitry for sending image signals to a display panel comprising one of several embodiments of a subpixel repeating group.

FIG. 15 provides an alternate view of a functional block diagram of a display system architecture suitable for implementing the techniques and subpixel repeating groups disclosed herein above and discussed below with respect to directional displays. Display system 1550 accepts an input signal indicating input image data. The signal is input to SPR operation 1408 where the input image data may be subpixel rendered for display. While SPR operation 1408 has been referenced by the same reference numeral as used in the display systems illustrated in FIGS. 14A and 14B, it is understood that SPR operation 1408 may include any modifications to SPR functions that are discussed below for the purpose of implementing subpixel rendering techniques on a display panel comprising any one of the subpixel repeating groups also discussed below that are particularly suitable for directional displays.

With continued reference to FIG. 15, in this display system architecture, the output of SPR operation 1408 may be input into a timing controller 1560. Display system architectures that include the functional components arranged in a manner other than that shown in FIG. 15 are also suitable for the directional display systems contemplated herein. For example, in other embodiments, SPR operation 1408 may be incorporated into timing controller 1560, or may be built into display panel 1570 (particularly using LTPS or other like processing technologies), or may reside elsewhere in display system 1550, for example, within a graphics controller. The particular location of the functional blocks in the view of display system 1550 of FIG. 15 is not intended to be limiting in any way.

In display system 1550, the data and control signals are output from timing controller 1560 to driver circuitry for sending image signals to the subpixels on display panel 1570. In particular, FIG. 15 shows column drivers 1566, also referred to in the art as data drivers, and row drivers 1568, also referred to in the art as gate drivers, for receiving image signal data to be sent to the appropriate subpixels on display panel 1570. Display panel 1570 substantially comprises a subpixel repeating grouping 1720 of FIG. 17A, which is comprised of a two row by eight column subpixel repeating group having four primary colors including white (clear) subpixels. It should be appreciated that the subpixels in repeating group 1720 are not drawn to scale with respect to display panel 1570; but are drawn larger for ease of viewing. As shown in the expanded view, display panel 1570 may substantially comprise other subpixel repeating groups as shown, particularly those shown in the figures and described in more detail below that are particularly suitable for directional displays. One possible dimensioning for display panel 1570 is 1920 subpixels in a horizontal line (640 red, 640 green and 640 blue subpixels) and 960 rows of subpixels. Such a display would have the requisite number of subpixels to display VGA, 1280×720, and 1280×960 input signals thereon. It is understood, however, that display panel 1570 is representative of any size display panel.

Various aspects of the hardware implementation of the displays described above is also discussed in commonly owned US Patent Application Publication Nos. US 2005/0212741 (U.S. Ser. No. 10/807,604) entitled "TRANSISTOR BACKPLANES FOR LIQUID CRYSTAL DISPLAYS COMPRISING DIFFERENT SIZED SUBPIXELS," US 2005/0225548 (U.S. Ser. No. 10/821,387) entitled "SYSTEM AND METHOD FOR IMPROVING SUB-PIXEL RENDERING OF IMAGE DATA IN NON-STRIPED DISPLAY SYSTEMS," and US 2005/0276502 (U.S. Ser. No. 10/866,447) entitled "INCREASING GAMMA ACCURACY IN QUANTIZED SYSTEMS," all of which are hereby incorporated by reference herein. Hardware implementation considerations are also described in International Application PCT/US06/12768 published as International Patent Publication No. WO 2006/108084 entitled "EFFICIENT MEMORY STRUCTURE FOR DISPLAY SYSTEM WITH NOVEL SUBPIXEL STRUCTURES," which is also incorporated by reference herein. Hardware implementation considerations are further described in an article by Elliott et al. entitled "Co-optimization of Color AMLCD Subpixel Architecture and Rendering algorithms," published in the SID Symposium Digest, pp. 172-175, May 2002, which is also hereby incorporated by reference herein.

The techniques and subpixel repeating groups discussed herein above and in the discussion that follows encompass the scope of all manners of display technologies, including transmissive and non-transmissive display panels, such as Liquid Crystal Displays (LCD), reflective Liquid Crystal Displays, emissive ElectroLuminecent Displays (EL), Plasma Display Panels (PDP), Field Emitter Displays (FED), Electrophoretic displays, Iridescent Displays (ID), Incandescent Display, solid state Light Emitting Diode (LED) display, and Organic Light Emitting Diode (OLED) displays.

Subpixel Layouts and Subpixel Rendering for Directional Display Devices.

This description now turns to a discussion of exemplary embodiments of subpixel repeating groups that are particularly suited for display panels used in directional display devices that are capable of simultaneously displaying at least two images. As noted in the Background discussion, a directional display device may be configured to display at least two images that are intended to be viewed by a single observer from an optimal viewpoint in order to create the perception of a single three-dimensional image. A directional display device may also be configured to display at least two images each of which is intended to be viewed by a single observer from first and second viewpoints, or by two observers from first and second viewpoints. In many of the Figures showing exemplary embodiments of subpixel repeating groups herein, the columns of subpixels in the portion of the display panel illustrated are labeled as "L" and "R," indicating that some of the columns of the display panel are directed to a "left view" (for example, an observer's left eye in a 3D display system,) while other columns are directed to a "right view." The "L" and "R" labeling is not intended to restrict the use of the display panel in any way to an autostereoscopic device. What is intended is that when a display panel substantially comprising a subpixel repeating group as shown in a particular figure is used in a directional display device, the light emissions of a first half of the columns (the "R" columns) are directed to produce a first image visible from a first viewing point and the light emissions of the second half of the columns (the "L" columns) are directed to produce a second image visible from a second viewing point. These first and second images are referred to as views and the subpixel arrangement that form the basis of each view is shown in a separate figure. It is to be understood that the subpixel arrangement shown in a view is a subset of the subpixels that form the originating display panel.

In some of the illustrated embodiments discussed below, the columns of subpixels in the portion of the display panel illustrated are labeled as "L" "R," and "B." The columns designated "B" are intended to be directed to both left and right views by the optical steering mechanism or component of the display. These particular embodiments are well-suited to autostereoscopic 3D displays in which the right and left eye views share the chromatic information in the image. These particular embodiments may be less suitable for multi-view directional displays where the first and second images do not share the same chromatic information.

In each of the illustrated embodiments described below, a display device having a display panel substantially comprising the subpixel repeating group of the embodiment is not restricted to use solely in a directional display device, and may operate in a conventional single image or 2D mode, or in what is referred to above as a 2D 3D switchable display. The subpixel rendering (SPR) operation (for example, SPR operation 1408 of display device 1400 of FIG. 14A or display device 1420 of FIG. 14B) may be configured to receive input image data and produce output image data for each subpixel on the display panel when operating in a 2D mode, using the area resampling and metamer filtering techniques described in the discussion above and in the published patent and patent application documents referenced herein. It is understood that a person of skill in the art would be able to apply the principles taught in the aforementioned documents to the subpixel repeating groups illustrated herein to produce the appropriate filters to carry out the subpixel rendering operation, and those details are omitted from the discussion that follows.

In the discussion of the exemplary embodiments of subpixel repeating groups that follows, reference is made, and examples are shown, of subpixels arranged in a particular color order and position in rows and columns. It is to be understood that in some or all of the arrangements illustrated, the row positions of the subpixels may be interchanged, such as when the subpixels in the first and second rows are interchanged. In addition, in some or all of the arrangements illustrated, it is also to be understood that reference to a particular order of the color subpixels in first and second rows of a subpixel repeating group also encompasses arrangements in which the subpixel repeating group is rotated 90 degrees to the right or left.

1. Multiprimary Subpixel Repeating Group Embodiments

As a preliminary matter, each of the multiprimary subpixel repeating group embodiments illustrated in FIGS. 16A, 17A, 18A and 19A includes a white (W) subpixel as a primary color. In each of these embodiments it is understood that the white subpixels may be replaced by any other suitable color that functions as a primary color, such as yellow, magenta, grey-blue, or cyan. The white subpixels may also be replaced by additional instances of red, green, or blue subpixels. In addition, as noted in commonly owned US 2005/0225563 which discusses additional embodiments of these high brightness layouts, these color names are only "substantially" the colors described as "red", "green", "blue", "cyan", and "white". The exact color points may be adjusted to allow for a desired white point on the display when all of the subpixels are at their brightest state.

Figure 16A:
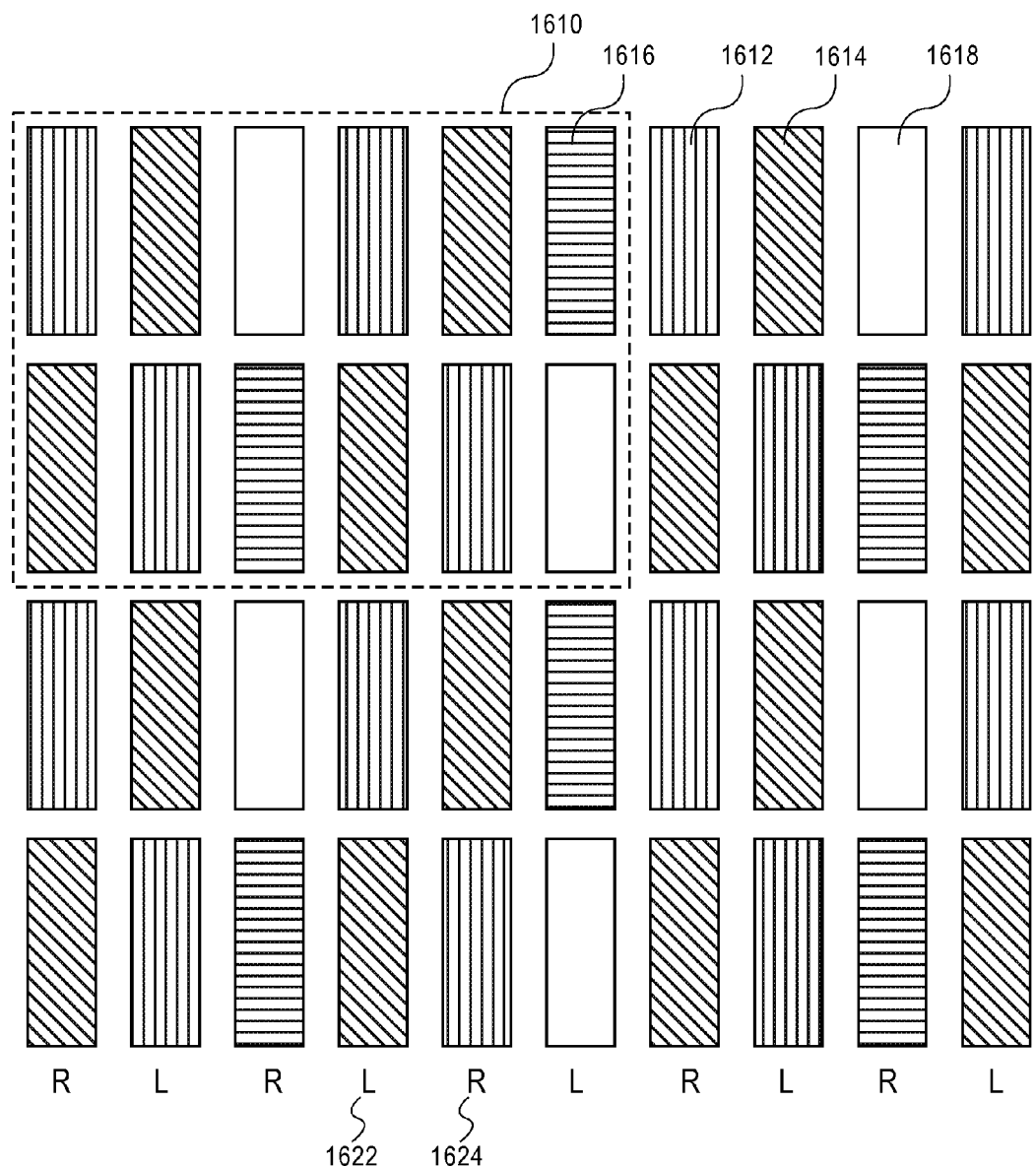
FIG. 16A illustrates a portion of a display panel comprising a first embodiment of a novel multi-primary color subpixel repeating group.

FIG. 16A shows a portion of a display panel substantially comprising subpixel repeating group 1610. Subpixel repeating group 1610 comprises twelve (12) subpixels disposed in two rows and comprising four red subpixels 1612, four green subpixels 1614, two blue subpixels 1616 and two white (or clear) subpixels 1618. The blue subpixels 1616 and the white subpixels 1618 are disposed in the same columns forming stripes of alternating blue and white subpixels. If the subpixel repeating group is viewed as having four quadrants of three subpixels each, then the white subpixels 1618 and the blue subpixels 1616 are disposed in different rows in opposing quadrants, forming a low resolution checkerboard pattern. A red subpixel 1612 is paired with a green subpixel 1614 in each quadrant. In the first row, the green subpixel 1614 follows the red subpixel 1612 when moving across the row in the left to right direction, and in the second row the red subpixel 1612 follows the green subpixel 1614. Such an arrangement of the red and green subpixels could be viewed as a higher resolution checkerboard pattern.

Figure 16B:
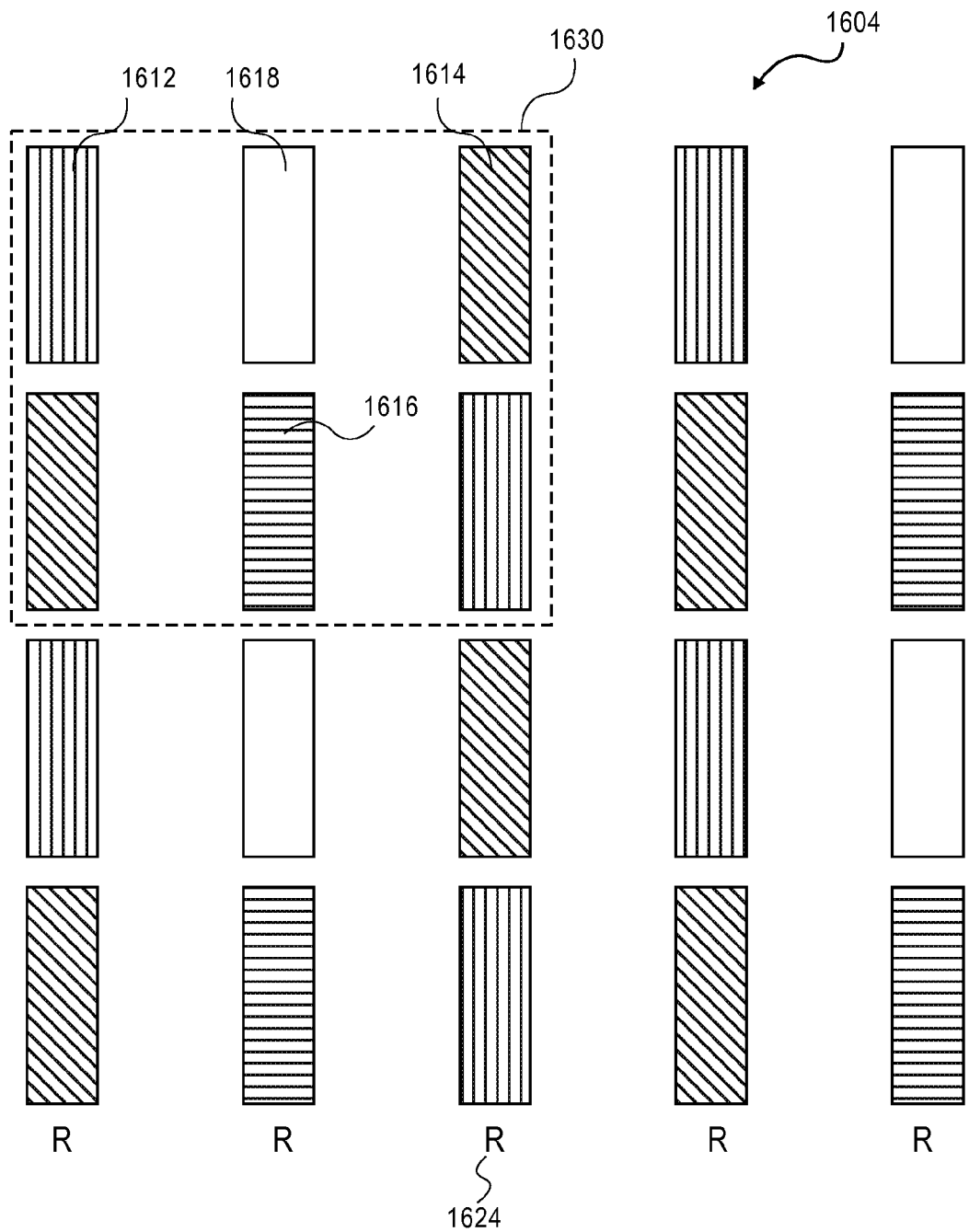
FIGS. 16B and 16C illustrates the subpixel arrangements of first and second image views produced by the display panel of FIG. 16A when used in a directional display device.
Figure 16C:
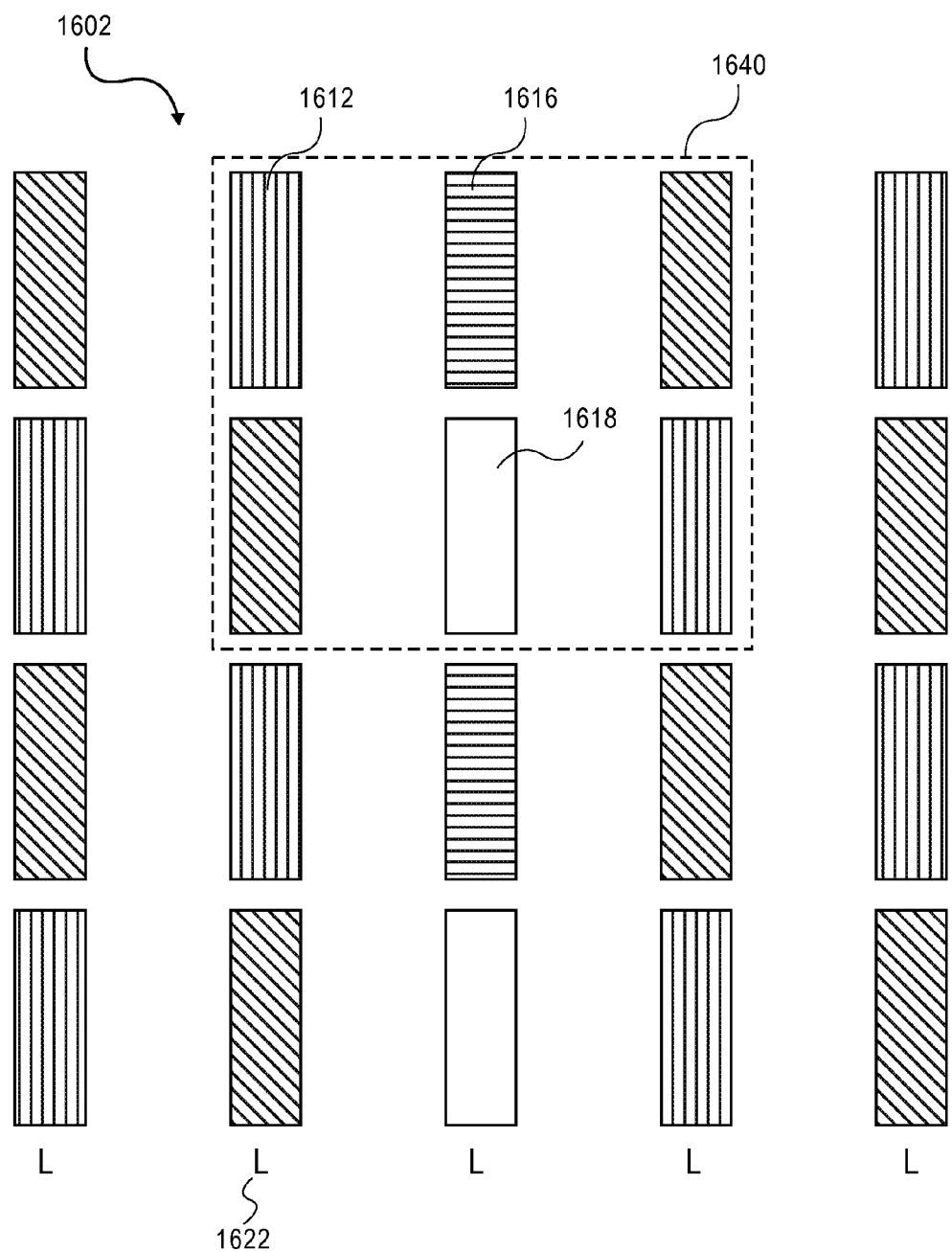

A display device having a display panel substantially comprising subpixel repeating group 1610 as shown in FIG. 16A may also operate as a directional display device. FIG. 16B shows the view 1604 produced by columns 1624 of subpixels labeled "R" in FIG. 16A. The image displayed in view 1604 is rendered on a subpixel repeating group 1630 comprising six subpixels disposed in two rows, and including two red subpixels 1612, two green subpixels 1614, one blue subpixel 1616 and one white subpixel 1618. FIG. 16C shows the view 1602 produced by columns 1622 of subpixels labeled "L" in FIG. 16A. The image displayed in view 1602 is rendered on a subpixel repeating group 1640 also comprising six subpixels disposed in two rows, and including two red subpixels 1612, two green subpixels 1614, one blue subpixel 1616 and one white subpixel 1618. These particular subpixel repeating groups 1630 and 1640 are previously disclosed and discussed in commonly owned U.S. Patent Application Publication No. 2004/0051724, entitled "FOUR COLOR ARRANGEMENTS AND EMITTERS FOR SUB-PIXEL RENDERING," and WO International Patent Publication No. 2006/127555, entitled "MULTIPRIMARY COLOR SUBPIXEL RENDERING WITH METAMERIC FILTERING." Thus, the distinct "L" and "R" images produced on a display panel comprising subpixel repeating group 1610 of FIG. 16A have all of the advantages discussed therein with respect to images produced on display panels substantially comprising subpixel arrangements 1630 and 1640.

Figure 17A:
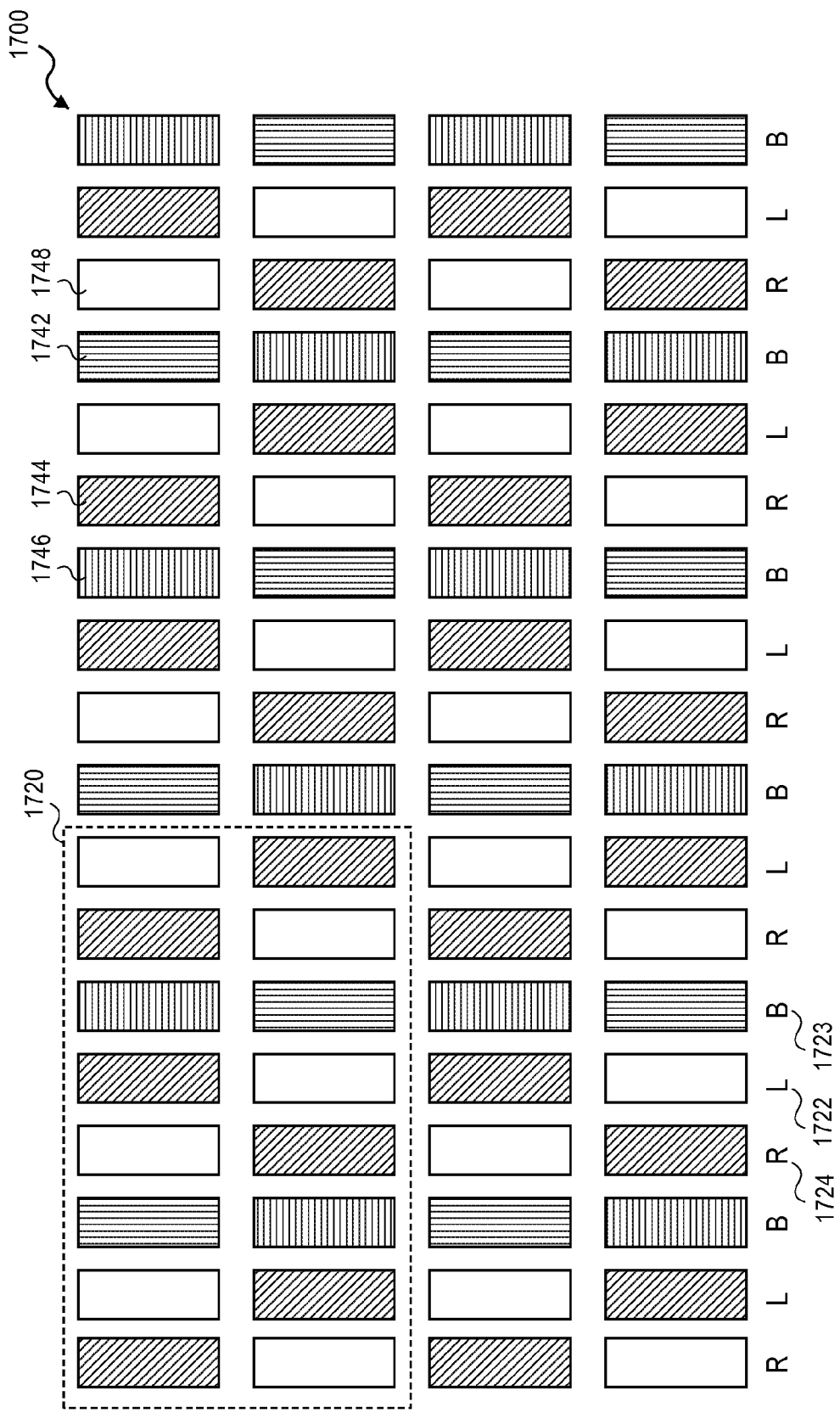
FIG. 17A illustrates a portion of a display panel comprising a second embodiment of a novel multi-primary color subpixel repeating group.

FIG. 17A shows a portion of a display panel 1700 substantially comprising subpixel repeating group 1720. Subpixel repeating group 1720 comprises twenty four (24) subpixels disposed in two rows and comprising eight green subpixels 1744, eight white (or clear) subpixels 1748, four blue subpixels 1746 and four red subpixels 1742. The red subpixels 1742 and the blue subpixels 1746 are disposed in the same columns forming four columns of alternating red and blue subpixels. The columns of red and blue subpixels are disposed between pairs of green subpixels 1744 and white subpixels 1748 that form columns of alternating green and white subpixels. Each row contains two red subpixels 1742 and two blue subpixels 1746 that alternate in order from left to right, with blue subpixels 1746 following red subpixels 1742 in the first row, and red subpixels 1742 following blue subpixels 1746 in the second row, forming a low resolution checkerboard pattern of the red and blue primary colors. Paired green and white subpixels also alternate in order from left to right in each row, forming a horizontally higher resolution checkerboard pattern. The repeating pattern of the green (G) and white (W) subpixels may be more easily seen in the example below using letters to represent the subpixel color and location, where "x" is a placeholder for the blue and red subpixels in subpixel repeating group 1720:

| G | W | x | W | G | x | G | W | x | W | G | x |
| W | G | x | G | W | x | W | G | x | G | W | x |

FIG. 17A has columns of subpixels 1724, 1722, and 1723 labeled "R," "L" and "B" respectively. Columns 1723 labeled "B" comprising the red and blue alternating subpixels are directed to both first (R) and second (L) images when a display device having a display panel substantially comprising subpixel repeating group 1720 is operated as a directional display device. In this embodiment, the color primaries are divided into two classes of primaries based on their relative luminance, and the relatively darker primaries, in this embodiment the red and blue primary color subpixels, are shared between the left and right views. The Human Vision System can tolerate this because the chromatic channels are not referenced when creating the mental impression of visual depth or distance perception because the resolution of the chromatic channels is too low to support the fine distinction between the two parallax separated views. Only the luminance channel has the required resolution. Thus, the subpixels of the brighter primary color(s) carry the burden of conveying the needed stereoscopic information. In addition, the left and right views can share the chromatic information of these columns without creating visual artifacts. The embodiment shown in FIG. 17A, then, is particularly well-suited to autostereoscopic 3D displays and to switchable 2D 3D displays.

Figure 17B:
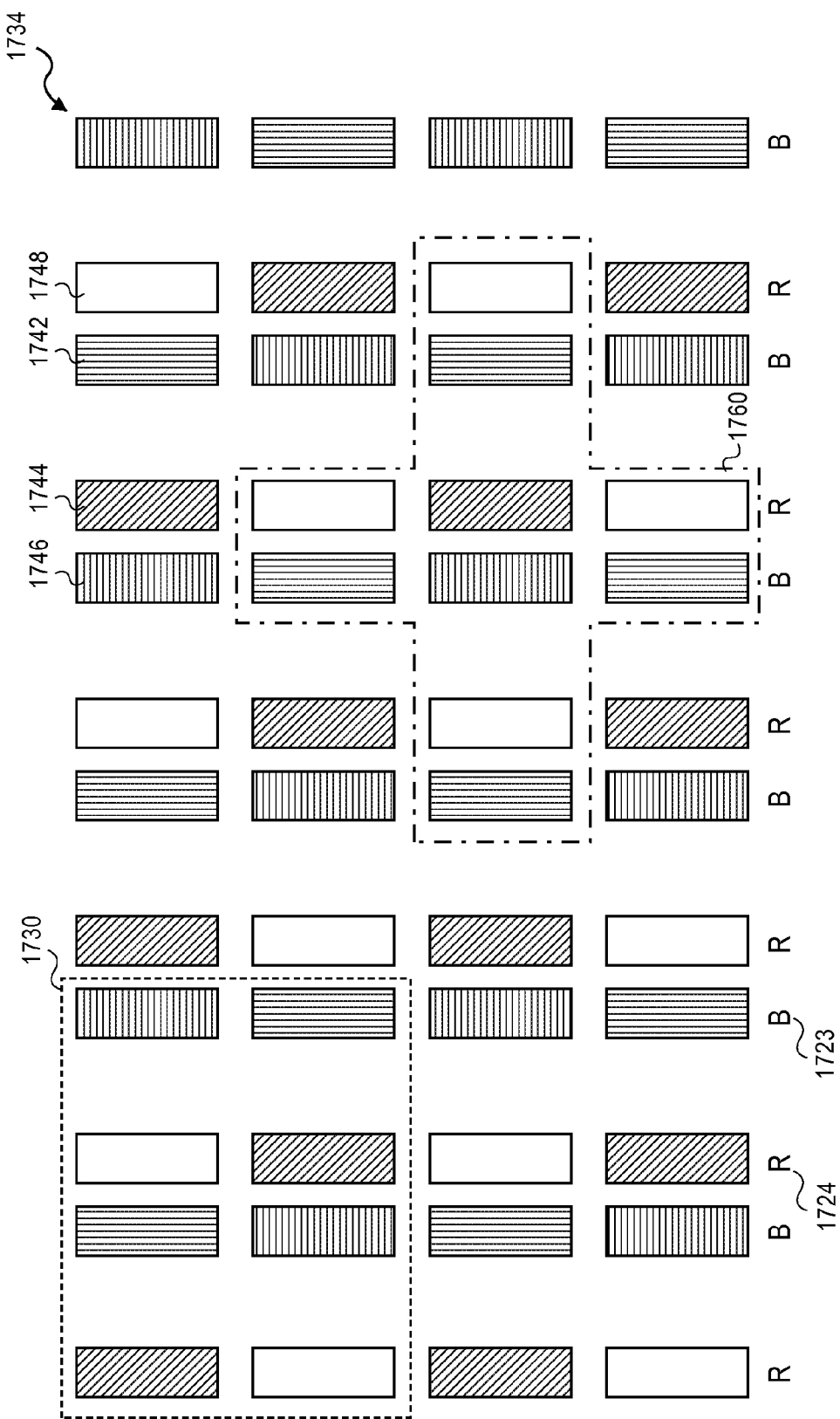
FIGS. 17B and 17C illustrates the subpixel arrangements of first and second image views produced by the display panel of FIG. 17A when used in a directional display device.
Figure 17C:
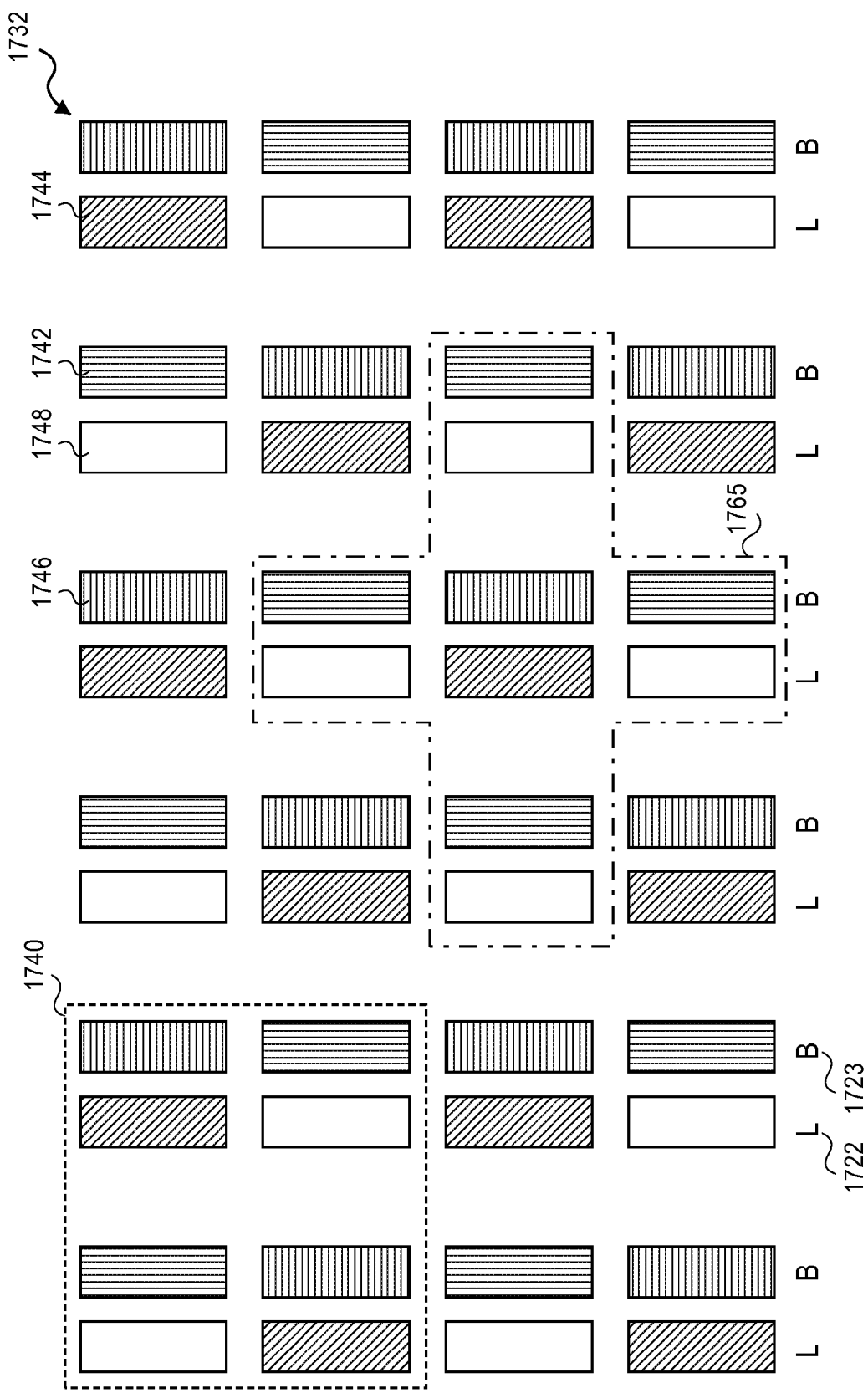

FIG. 17B shows the view 1734 produced by columns 1724 of subpixels labeled "R" and columns 1723 of subpixels labeled "B" in FIG. 17A. The image displayed in view 1734 is rendered on a subpixel repeating group 1730 comprising eight subpixels disposed in two rows, and including two subpixels each of red, green, blue and white. FIG. 17C shows the view 1732 produced by columns 1722 of subpixels labeled "L" and columns 1723 of subpixels labeled "B" in FIG. 17A. The image displayed in view 1732 is rendered on a subpixel repeating group 1740 also comprising eight subpixels disposed in two rows, and including two subpixels each of red, green, blue and white. The subpixel repeating groups 1730 and 1740 of the first and second views are previously disclosed and discussed in commonly-owned U.S. Patent Application Publication No. 2005/0225575 entitled "NOVEL SUBPIXEL LAYOUTS AND ARRANGEMENTS FOR HIGH BRIGHTNESS DISPLAYS," and also in WO 2006/127555 referenced above. Thus, the distinct "L" and "R" images produced on a display panel comprising subpixel repeating group 1720 of FIG. 17A have all of the advantages discussed therein with respect to images produced on display panels substantially comprising subpixel arrangements 1730 and 1740.

The subpixel rendering operation used to render the first and second (e.g., left and right) views may be modified to account for the fact that a subset of the subpixels on display panel 1700 (i.e., columns 1723) are shared by the two views. The subpixel rendering operation may average the contributions for the input image data belonging to the two separate views 1734 and 1732 for those color planes corresponding to the color subpixels in the columns 1723 shared by both views. In the embodiment shown in FIG. 17A, the subpixel rendering operation may average the contributions for the input image data belonging to the two separate views 1734 and 1732 for the red and blue color planes. Additionally, it may be desirable to adjust the metamers selected for each of the two views 1734 and 1732 such that the subpixels in the columns in both views are most nearly the same. If one must be chosen over the other, it may be desirable to select the metamers that most nearly bring the red-green chromatic channel in each view most nearly together, since the Human Vision System is more sensitive to error in this chromatic channel than to error in the yellow-blue chromatic channel. In the case of the arrangement of subpixels 1720 of FIG. 17A, the red color plane of each view is to be set most nearly identical.

Figure 18A:
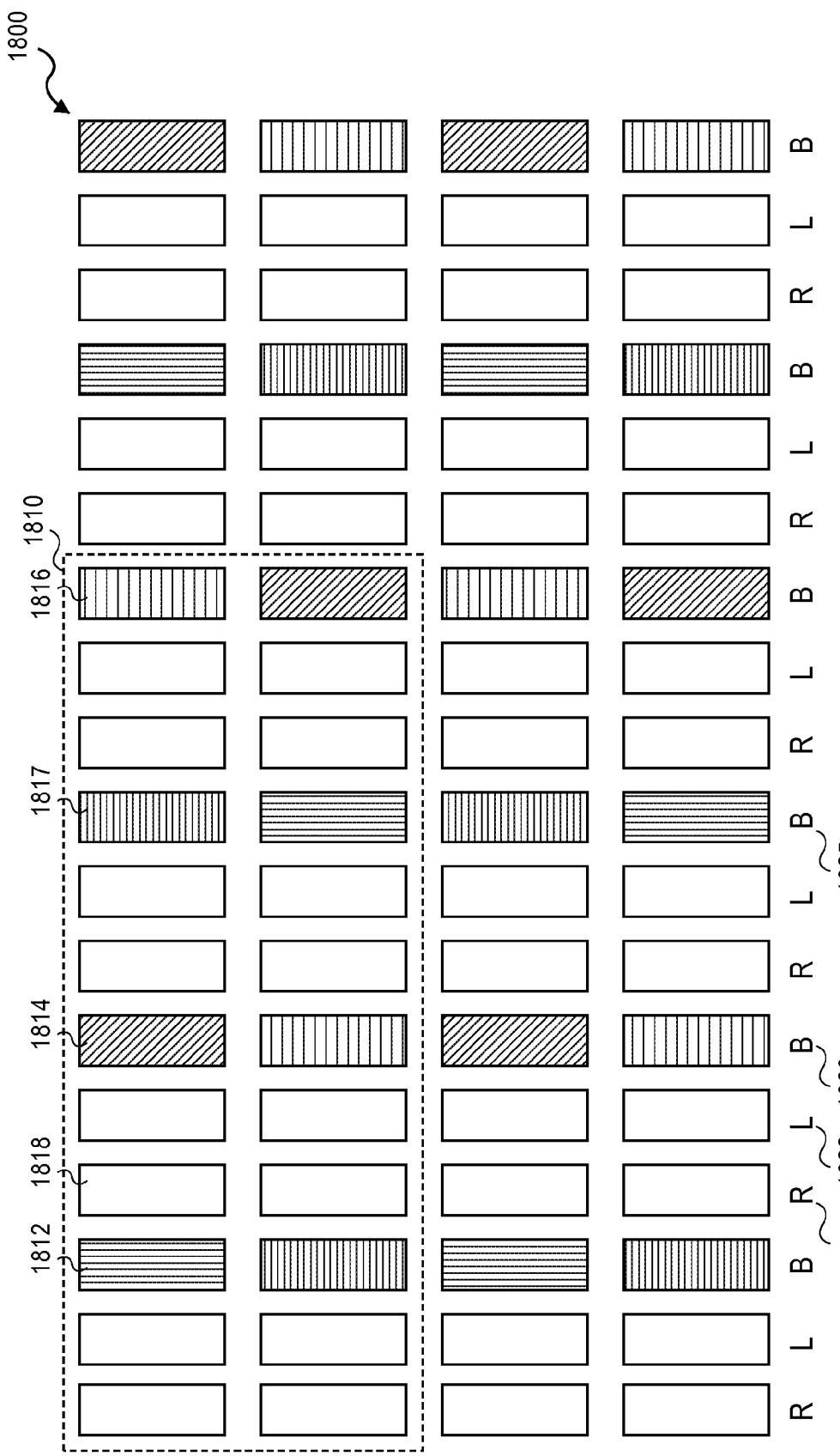
FIG. 18A illustrates a portion of a display panel comprising a third embodiment of a novel multi-primary color subpixel repeating group.
Figure 18B:
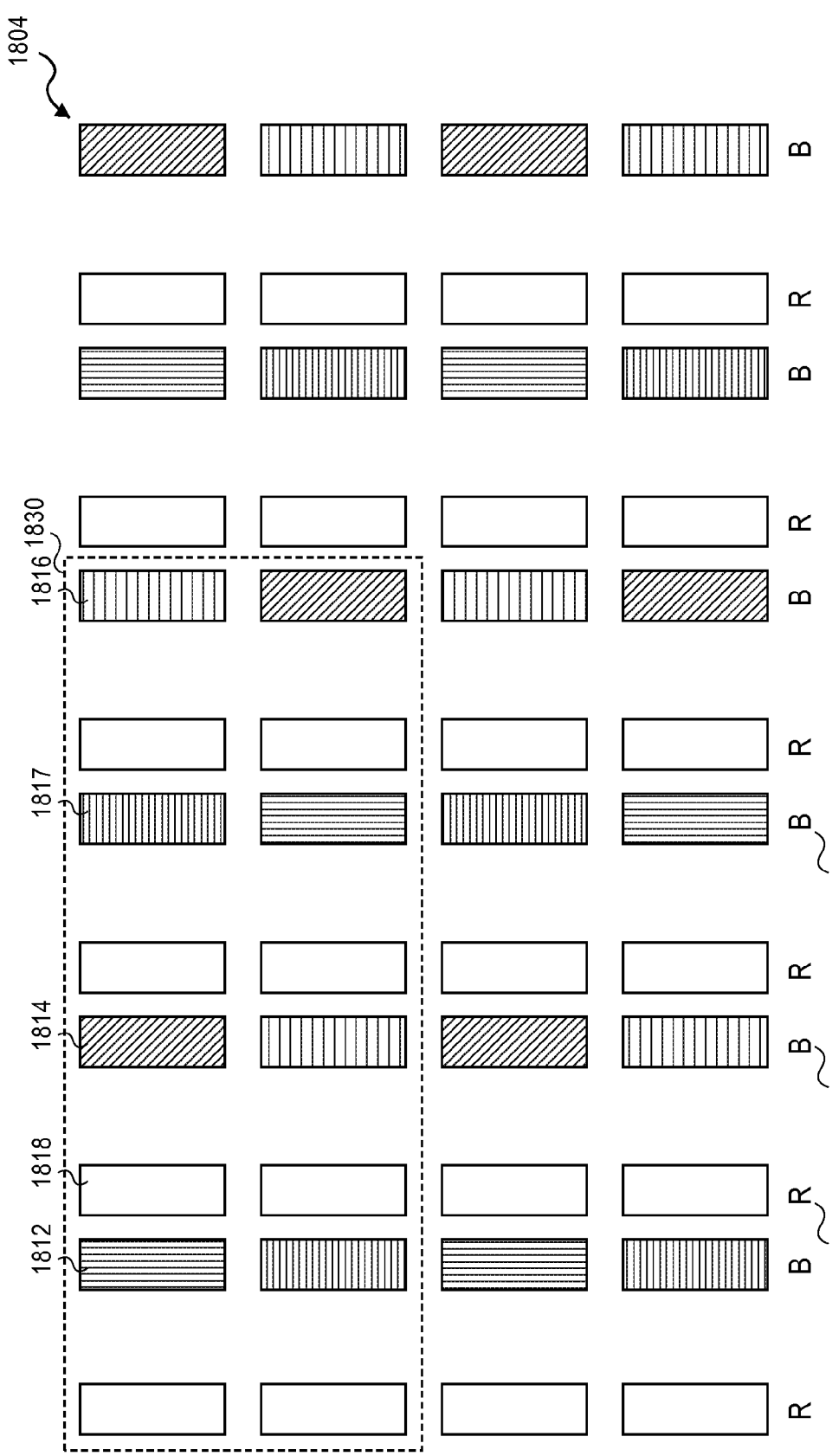

FIG. 18A shows a portion of a display panel substantially comprising subpixel repeating group 1810. Subpixel repeating group 1810 comprises twenty four (24) subpixels disposed in two rows and comprising 16 white (or clear) subpixels 1818, 2 green subpixels 1814, 2 blue subpixels 1816, 2 red subpixels 1812 and 2 subpixels 1817 of a suitable fifth color primary such as cyan, emerald, yellow, magenta, or other suitable color 1817. In FIGS. 18A, 18B and 18C, fifth color primary subpixels 1817 represent the color cyan, indicated by closely spaced horizontal hatching. The white subpixels 1818 are disposed in two adjacent columns. Red subpixels 1812 alternate with cyan subpixels 1817 in two columns, and green subpixels 1814 alternate with blue subpixels 1816 in two columns.

FIG. 18A shows columns 1824 and 1822 of white subpixels 1818, labeled "R" and "L" respectively. Columns 1824 labeled "R" of the display panel are directed to the first (R) image and columns 1822 of the display panel are directed to the second (L) image when a display device having a display panel substantially comprising subpixel repeating group 1810 is operated as a directional display device. Columns 1825 labeled "B" and comprising the red and cyan alternating subpixels and columns 1823 comprising the green and blue alternating subpixels are directed to both first (R) and second (L) images when a display device having a display panel substantially comprising subpixel repeating group 1810 is operated as a directional display device.

FIG. 18B shows the view 1804 produced by columns 1824 of subpixels labeled "R" and columns 1823 and 1825 of subpixels labeled "B" in FIG. 18A. FIG. 18C shows the view 1802 produced by columns 1822 of subpixels labeled "L" and columns 1823 and 1825 of subpixels labeled "B" in FIG. 18A. The embodiment shown in FIG. 18A is particularly well-suited to autostereoscopic 3D displays and to switchable 2D 3D displays. As discussed above with respect to the embodiment illustrated in FIGS. 17A, 17B and 17C, since it is the luminance channel that has the required resolution needed by the Human Vision System to produce the mental impression of visual depth or distance perception, it is primarily the white subpixels in the embodiment of FIG. 18A that carry the burden of conveying the needed stereoscopic information, while the saturated primary color subpixels carry the chromatic information of the image without creating visual artifacts.

The image displayed in each of views 1804 and 1806 is rendered on a subpixel repeating group 1830 comprising sixteen subpixels disposed in two rows, and including eight white subpixels 1818, and two subpixels each of red, green, blue and cyan. It can be seen that the white subpixels are disposed in a square arrangement across view 1804. That is, imaginary lines connecting the centers of four neighboring white subpixels form a square. When subpixel repeating group 1830 is viewed as having four quadrants of four pixels each, it can be seen that the pairs of saturated color primaries are disposed in opposing quadrants, forming a checkerboard pattern. Subpixel repeating groups having columns of white subpixels of the type illustrated in FIGS. 18B and 18C are previously disclosed and discussed in commonly-owned US Patent Application Publication No. 2005/0225575, and in commonly-owned WO 2006/127555, both referenced above. Thus, the distinct "L" and "R" images produced on a display panel comprising subpixel repeating group 1810 of FIG. 18A have all of the advantages discussed therein with respect to images produced on display panels substantially comprising subpixel arrangement 1830.

Figure 19A:
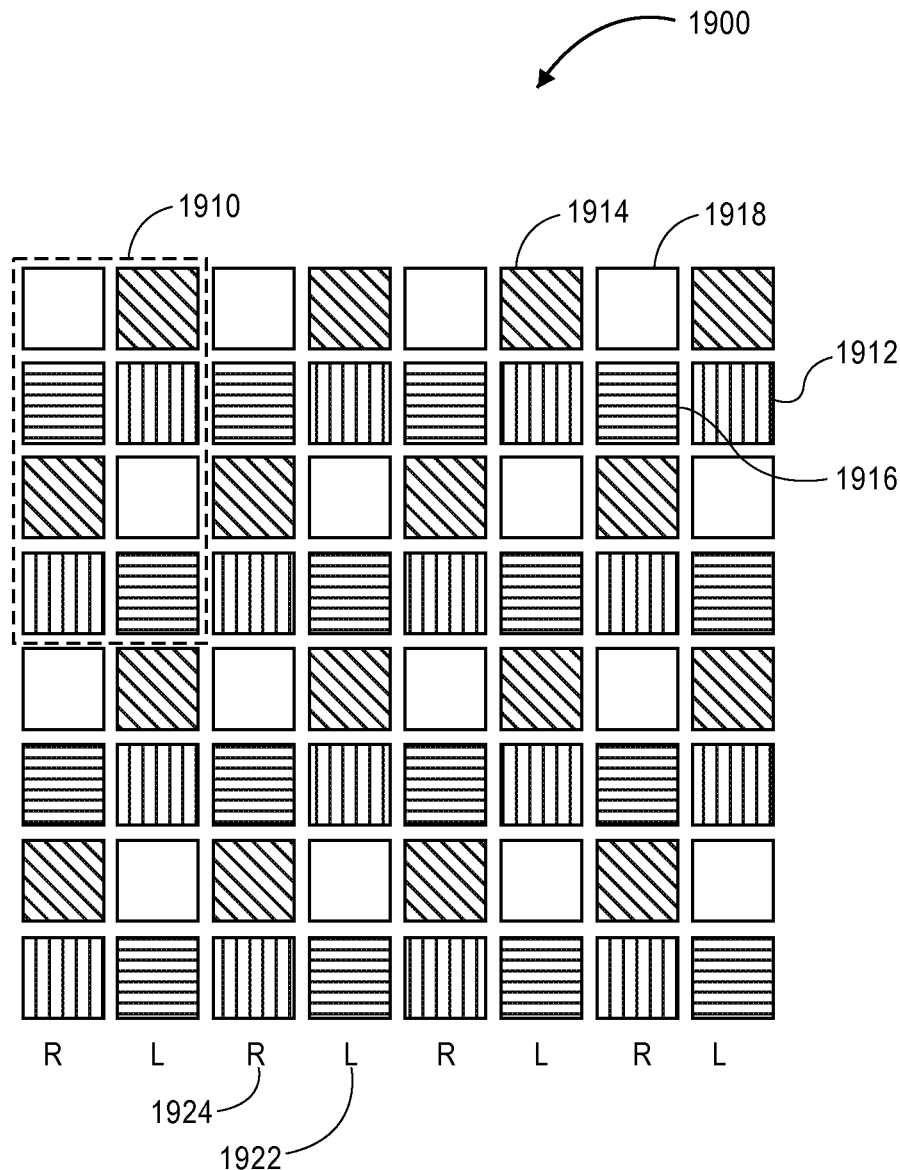
FIG. 19A illustrates a portion of a display panel comprising a fourth embodiment of a novel multi-primary color subpixel repeating group.

FIG. 19A shows a portion of a display panel 1900 substantially comprising subpixel repeating group 1910. Subpixel repeating group 1910 comprises eight (8) substantially square shaped subpixels disposed in four rows and two columns and comprising two subpixels of each primary color. The red subpixels 1912 and the blue subpixels 1916 are disposed in the same rows forming two rows of alternating red and blue subpixels that are disposed between rows of alternating green subpixels 1914 and white subpixels 1918. Each column in subpixel repeating group 1910 contains one subpixel of each primary color. When a display device having a display panel comprising subpixel repeating group 1910 operates in the conventional 2D mode, four subpixels (one each of red, green, blue and white) may be used to display information in a "whole pixel" mode, and the subpixel rendering operation may be bypassed. When a display device having a display panel comprising subpixel repeating group 1910 operates as a directional display device, such as in 3D mode, first and second image data may be split column by column, with image data in columns 1924 labeled (R) going to produce view 1902 as shown in FIG. 19B, and image data in columns 1922 labeled (L) going to produce view 1904 as shown in FIG. 19C.

Figure 19B:
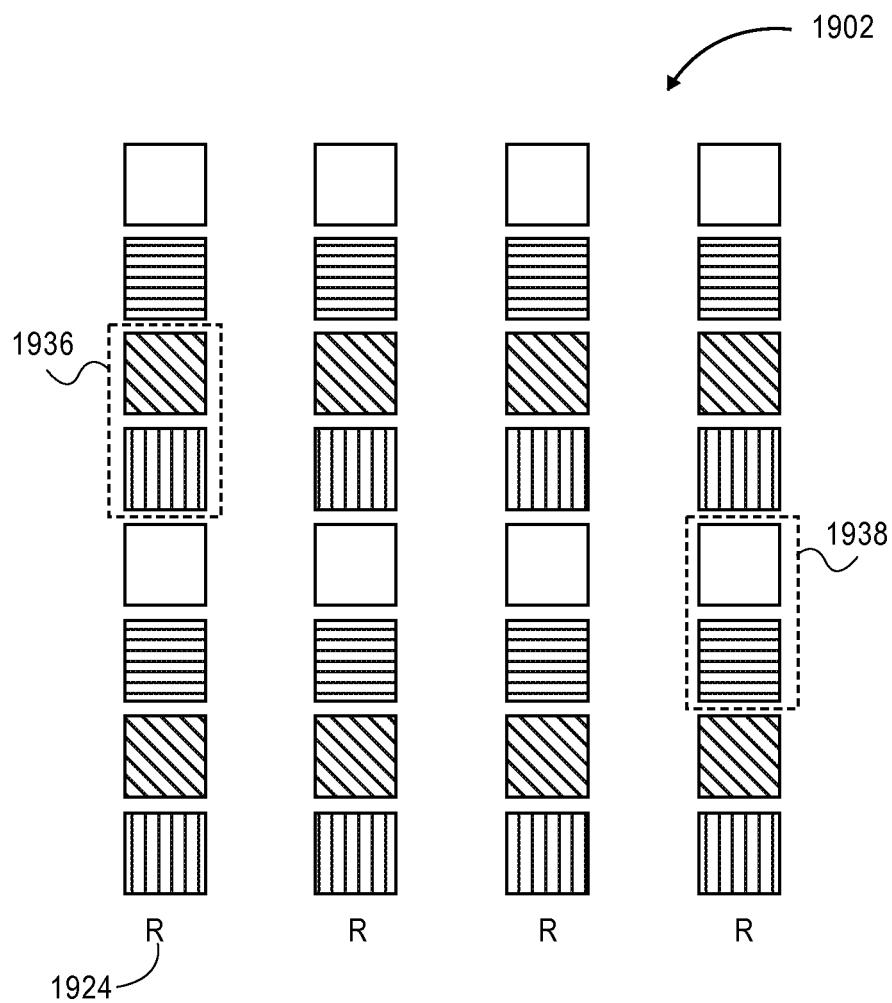
FIGS. 19B and 19C illustrates the subpixel arrangements of first and second image views produced by the display panel of FIG. 19A when used in a directional display device.
Figure 19C:
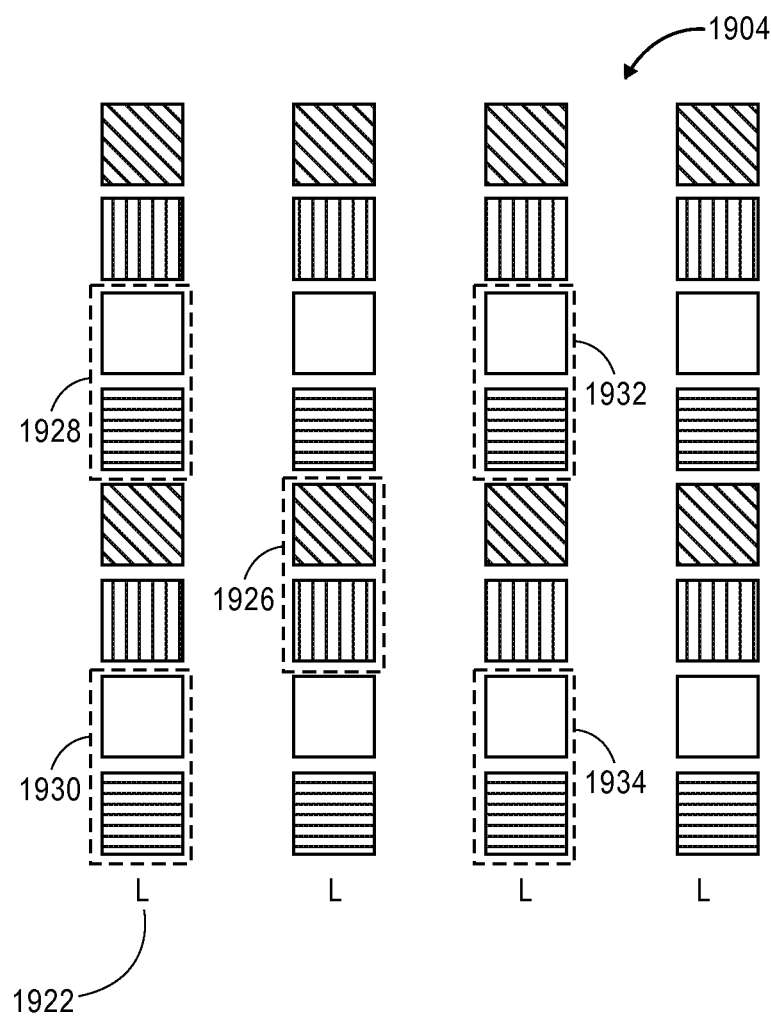

View 1902 in FIG. 19B and view 1904 in FIG. 19C have some similarities. Each row of data comprises 2 subpixel rows. Luminance centers will be either on a red-green (RG) subpixel pair 1936 or blue-white (BW) subpixel pair 1938 (FIG. 19B). Each column of image data can create full resolution in this mode of operation (e.g., in 3D) using a subpixel rendering operation as described above with appropriate sharpening algorithms. However, the color information must be spread to two or three pairs of rows in order to achieve the correct color, which limits the resolution in the vertical axis. FIG. 19C shows the subpixels needed to achieve proper color. When the input image data pixel whose color is to be produced is centered on red-green subpixel pair 1926, four pairs of blue and white subpixels 1928, 1930, 1932, 1934 are used to balance the color. Sharpening algorithms may be used to enhance the sharpness of horizontal lines in the output image. Note that in display panels comprising subpixel repeating group 1910, in each of views 1902 and 1904 diagonal lines in the output image can have the same modulation transfer function (MTF) they would have when the display panel operates in the conventional 2D mode because in each of views 1902 and 1904 the subpixel colors alternate in the columns.

2. Subpixel Repeating Group Embodiments with Three Color Primaries

Figure 20A:
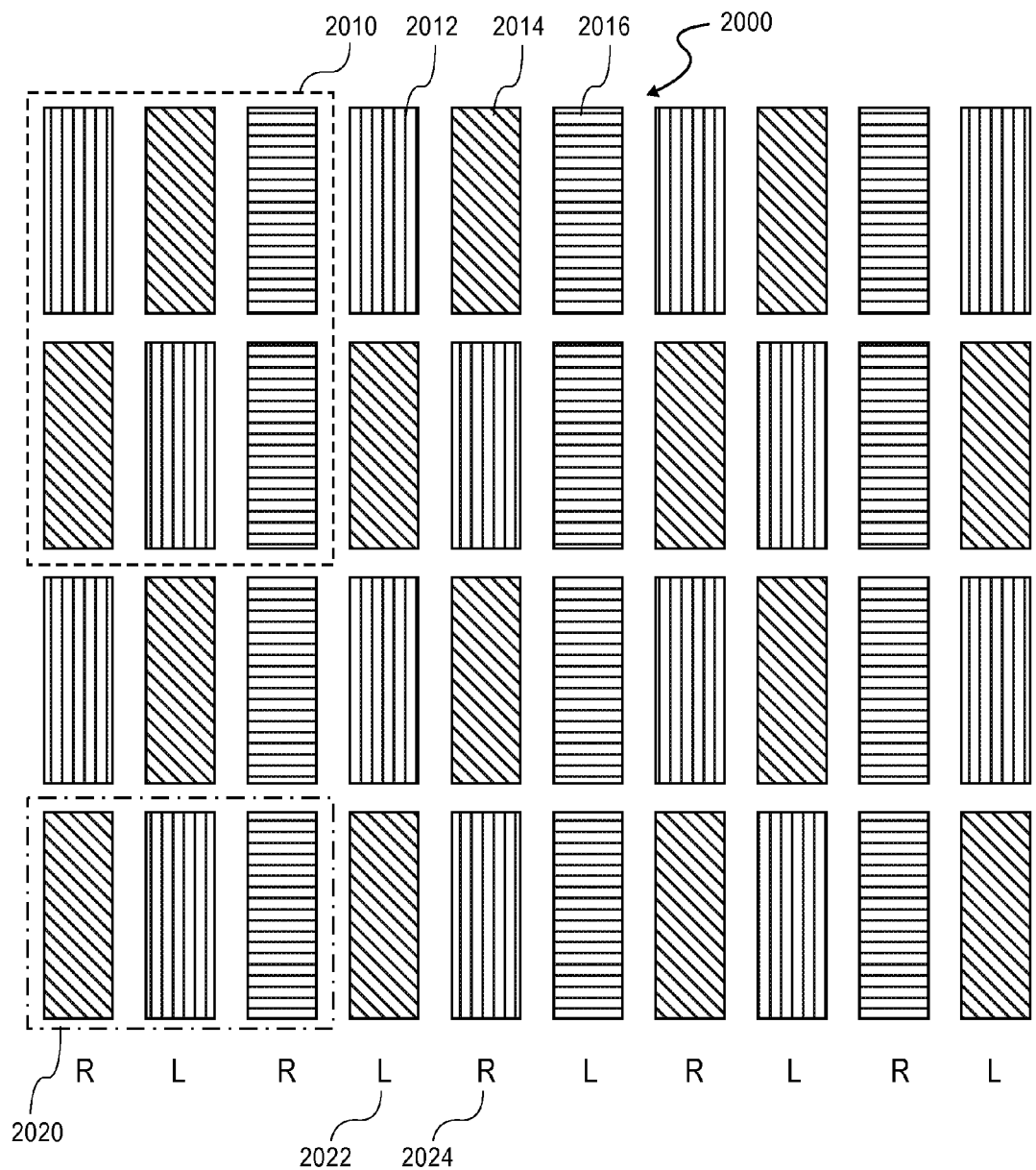
FIG. 20A illustrates a portion of a display panel comprising a first embodiment of a novel three primary color subpixel repeating group.

FIG. 20A shows a portion of a display panel 2000 substantially comprising subpixel repeating group 2010. Subpixel repeating group 2010 comprises six (6) subpixels in three primary colors disposed in two rows. The blue subpixels 2016 are disposed in columns forming vertical stripes. Each row contains one red subpixel 2012 and one green subpixel 2014, with green subpixel 2014 following red subpixel 2012 in the first row and the red subpixel 2012 following green subpixel 2014 in the second row, forming a checkerboard pattern. Any three consecutive different primary color subpixels in a row may be grouped together as a conventional whole pixel 2020. Thus, the display panel may be treated as an array of full color conventional whole pixels 2020 when operating in the 2D mode.

Figure 20B:
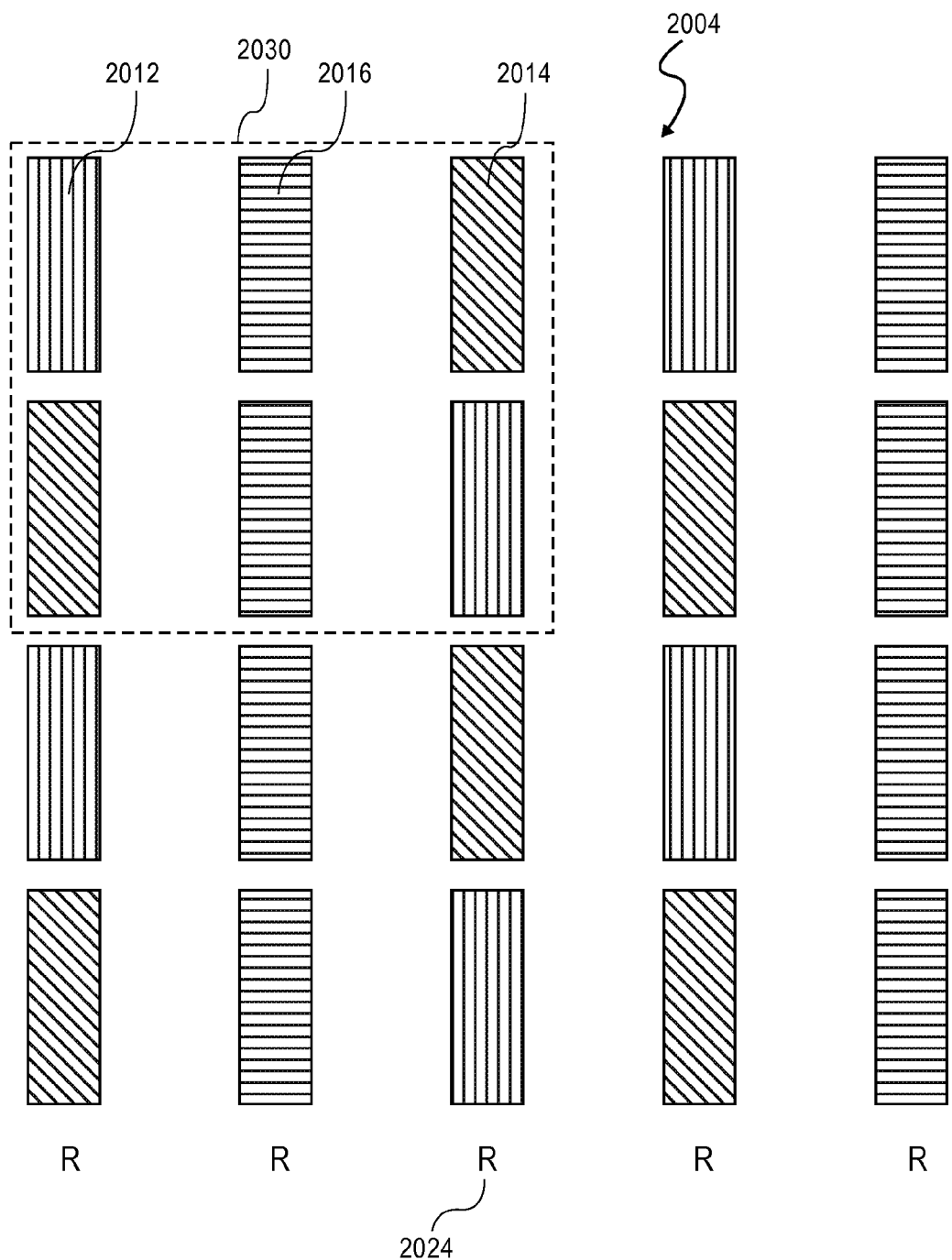
FIGS. 20B and 20C illustrates the subpixel arrangements of first and second image views produced by the display panel of FIG. 20A when used in a directional display device.
Figure 20C:
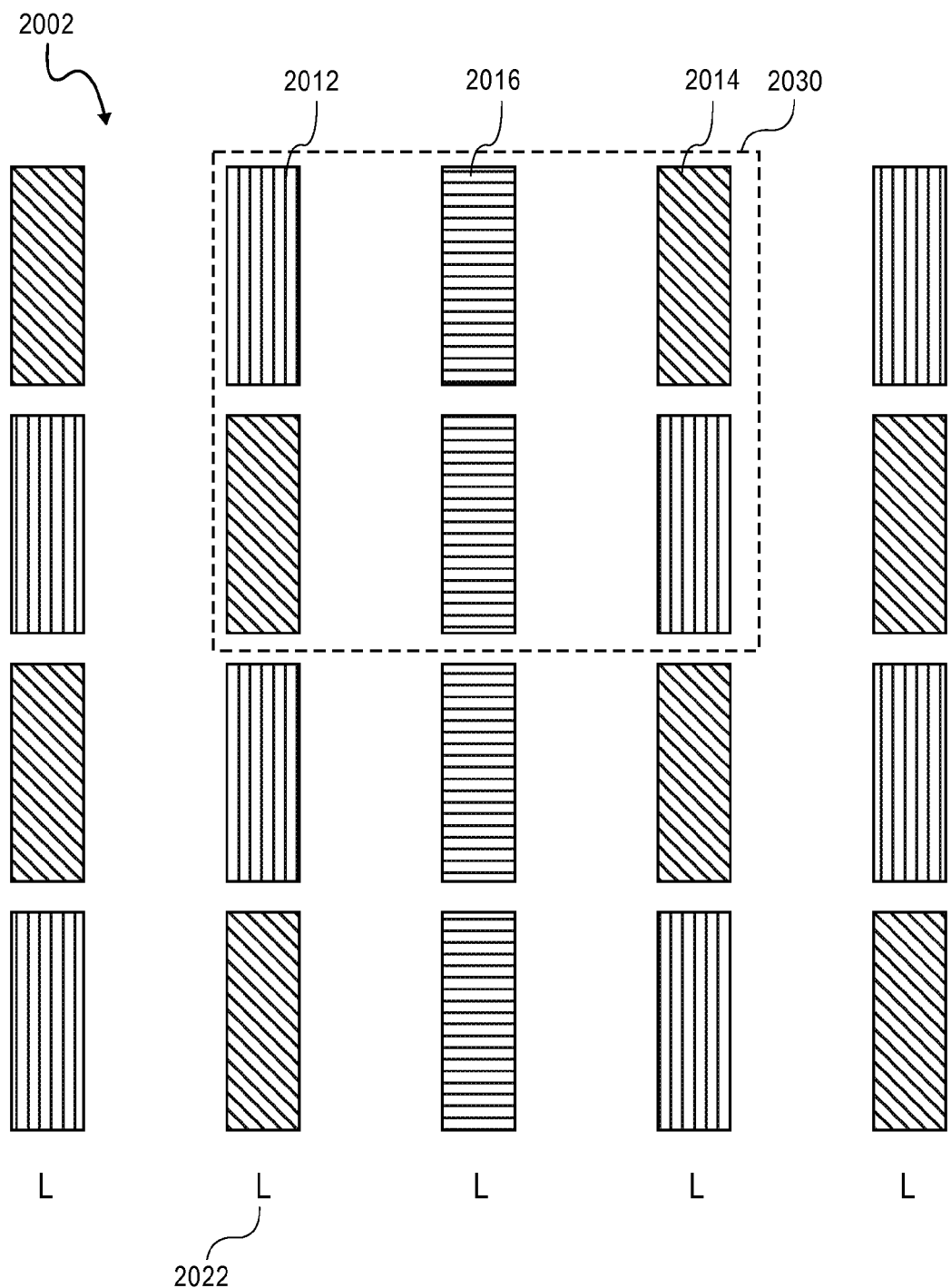

FIG. 20A has columns of subpixels 2024 and 2022 labeled "R" and "L" respectively. Columns 2024 labeled "R" are directed to a first (R) image and columns 2022 labeled "L" are directed to a second (L) image when a display device having a display panel substantially comprising subpixel repeating group 2010 is operated as a directional display device. FIG. 20B shows the view 2004 produced by columns 2024 of subpixels labeled "R" in FIG. 20A. The image displayed in view 2004 is rendered on a subpixel repeating group 2030 comprising six subpixels disposed in two rows, and including two subpixels each of red, green and blue. Note that the subpixels substantially occupy the same positions relative to subpixel repeating group 2010, including the vertical stripe of blue subpixels. FIG. 20C shows the view 2002 produced by columns 2022 of subpixels labeled "L" in FIG. 20A. The image displayed in view 2002 is also rendered on subpixel repeating group 2030.

Variations of subpixel repeating group 2030 having a vertical blue stripe are previously disclosed and discussed in commonly-owned U.S. Pat. Nos. 7,123,277 and 6,903,754. Thus, the distinct "L" and "R" images produced on a display panel comprising subpixel repeating group 2020 of FIG. 20A have all of the advantages discussed therein with respect to images produced on a display panel substantially comprising the subpixel arrangement of 2030. In particular, if display panel 2000 of FIG. 20A is used in a conventional 2D mode to display images rendered in whole pixel mode (i.e, using whole pixels 2020 and not using a subpixel rendering technique), it will have a given resolution, r. The first (R) and second (L) images produced by this same panel when operating as a directional display device will each have the same resolution r when a subpixel rendering operation is used to render the image data for each view.

Alternatively, red subpixels 2012, green subpixels 2014 and blue subpixels 2016 of display panel 2000 of FIG. 20A may be configured to have a narrow aspect ratio. This would allow display panel 2000 when used in a conventional 2D mode of operation to increase the resolution of the panel in the horizontal direction, and thereby improve the image quality, by taking advantage of subpixel rendering for displaying images in the 2D mode.

FIGS. 21A, 22A, 23A and 24A discuss embodiments in which the subpixel repeating group of the display panel includes subpixels in one of the primary colors at a higher resolution than subpixels of the other two primary colors. The subpixels that occur at the higher resolution are referred to as the majority subpixels in the subpixel repeating group. These particular embodiments use green subpixels as the majority subpixels, but it is to be understood that there may be occasions (for example, a particular display application) in which it may be suitable for the majority subpixels to be a different primary color. In each of these embodiments, the majority subpixels are disposed in the subpixel repeating group so as to form vertical or horizontal stripes on the display panel. The minority subpixels are disposed in the subpixel repeating group in opposing quadrants, in a manner similar to a checkerboard pattern. That is, if the subpixel repeating group has N subpixels disposed in two rows of N/2 subpixels, then the subpixel repeating group can be viewed as having four quadrants of N/4 subpixels with the same color minority subpixels disposed in opposing quadrants, such as shown below, where P1 is the majority subpixel and P2 and P3 are the two minority primary color subpixels:

| P1 | P1 | P2 | P1 | P1 | P3 |
| P1 | P1 | P3 | P1 | P1 | P2. |

When a directional display device includes a display panel substantially comprising one of these subpixel repeating groups, the first (R) and second (L) views are produced on subpixel repeating groups in which subpixels in one of the primary colors are at a higher resolution than subpixels of the other two primary colors. These various subpixel repeating groups illustrated in FIGS. 21B, 21C, 22B, 22C, 23B, 23C, 24B and 24C are previously disclosed and discussed in, or are all variations of subpixel repeating groups previously disclosed and discussed in U.S. Patent Application Publication No. 2003/0128225 (U.S. application Ser. No. 10/278,353), entitled "COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE." Thus, when the first or second view is produced as shown in the figures herein, the image has all of the advantages and benefits discussed in US 2003/0128225 with respect to images produced on a display panel substantially comprising the subpixel arrangements disclosed therein.

Figure 21A:
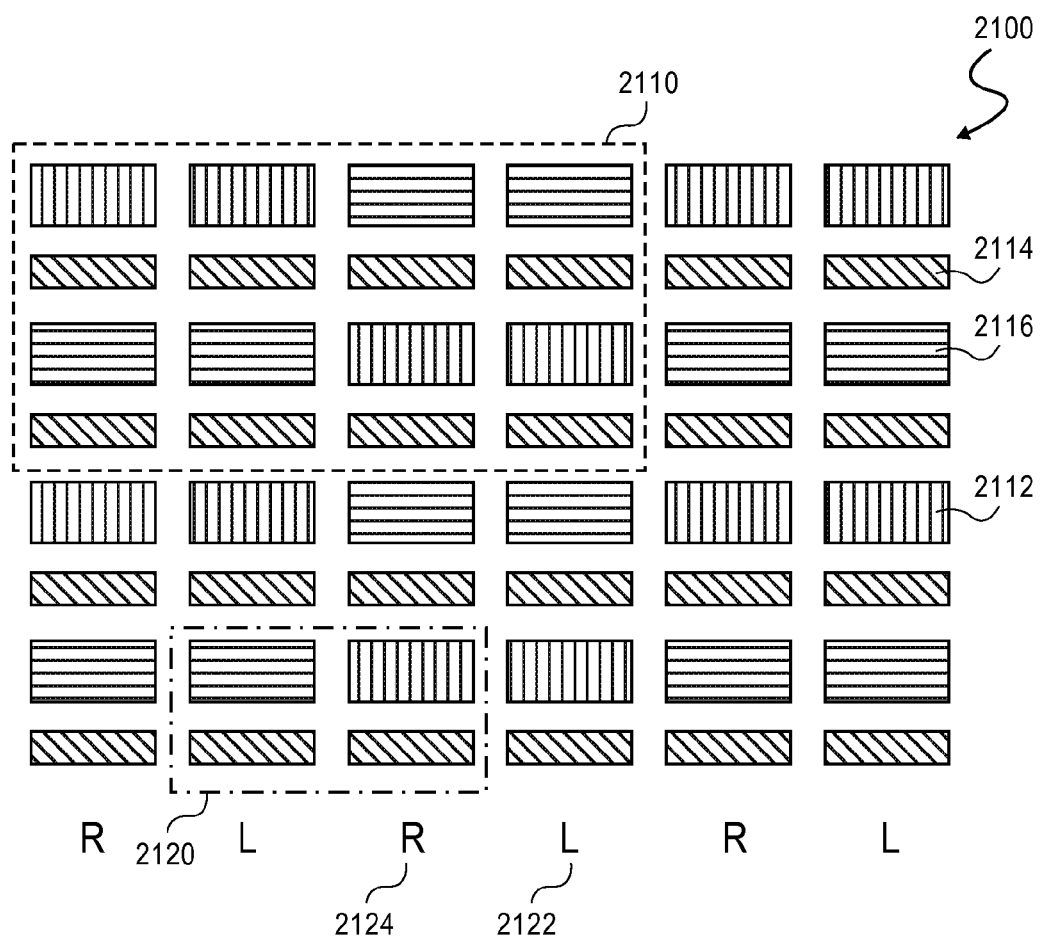
FIG. 21A illustrates a portion of a display panel comprising a second embodiment of a novel three primary color subpixel repeating group.

FIG. 21A shows a portion of a display panel 2100 substantially comprising subpixel repeating group 2110. FIG. 21A shows a portion of display panel 2100 substantially comprising subpixel repeating group 2110. Subpixel repeating group 2110 comprises sixteen (16) subpixels disposed in four rows and four columns, and comprising four red subpixels 2112, eight green subpixels 2114 and four blue subpixels 2116. The green subpixels 2114 have half the aspect ratio of the red and blue subpixels in the vertical dimension and are disposed in rows forming horizontal stripes across display panel 2100. If the subpixel repeating group is viewed as having four quadrants of four subpixels each, then red and blue subpixels are paired in each quadrant, and pairs of red subpixels 2112 and blue subpixels 2116 are disposed in different columns in opposing quadrants, forming what might be referred to as a double checkerboard pattern. Four subpixels of three primary colors in a quad grouping, for example the red 2112, two green 2114, and blue 2116 subpixels, may be viewed as a conventional whole pixel 2120. Thus, display panel 2100 may be treated as an array of full color conventional whole pixels 2120 when operating in the 2D mode.

Figure 21B:
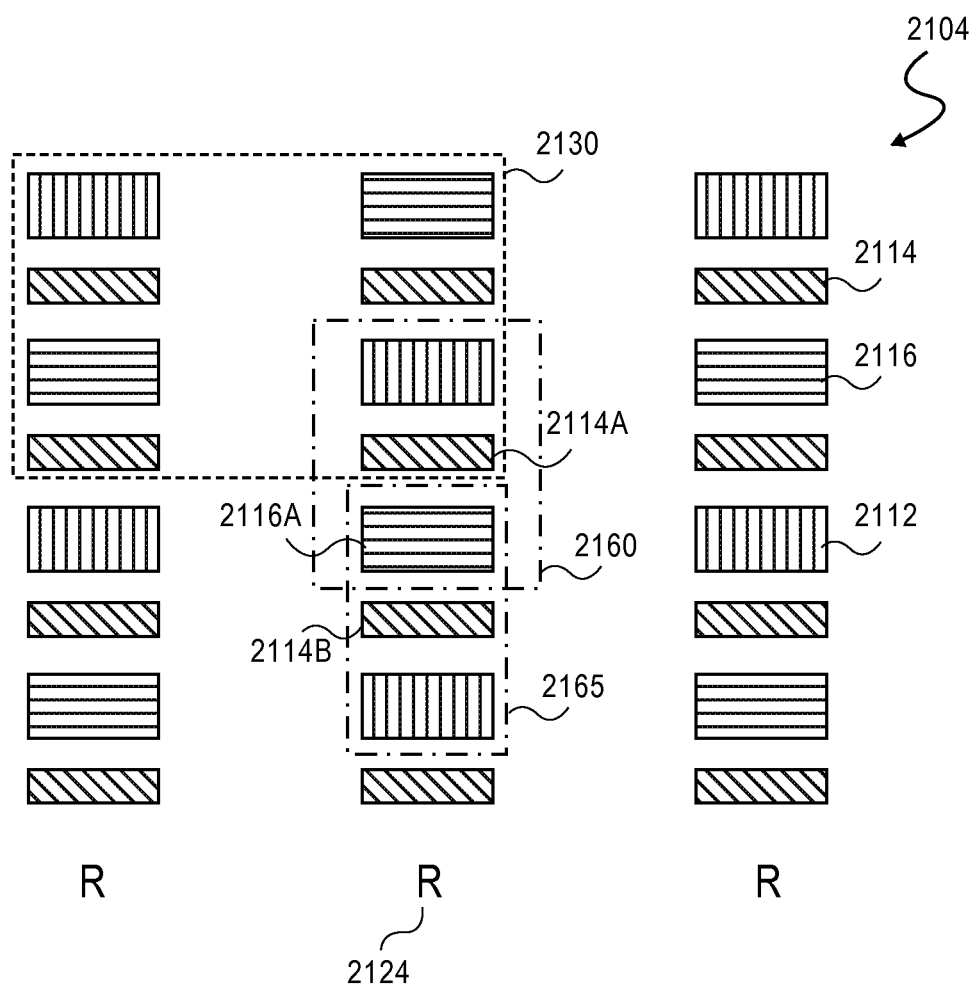
FIGS. 21B and 21C illustrates the subpixel arrangements of first and second image views produced by the display panel of FIG. 21A when used in a directional display device.
Figure 21C:
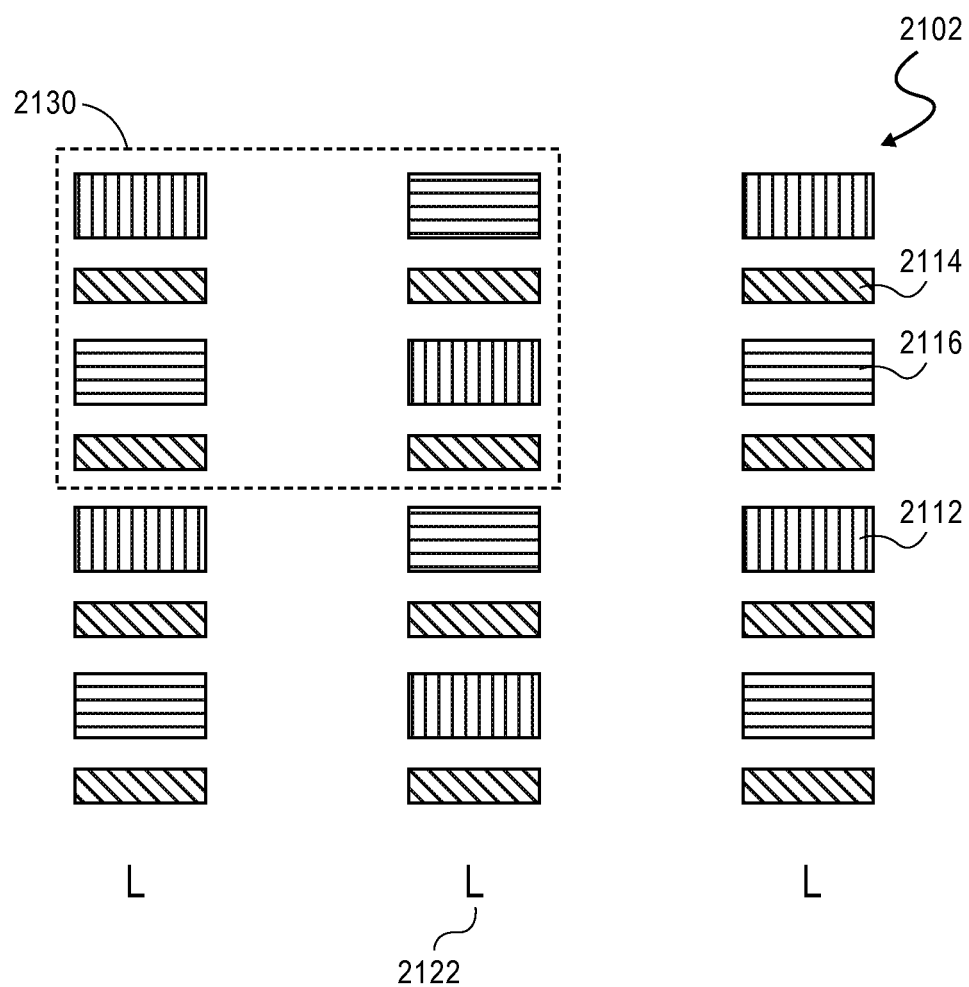

FIG. 21A has columns of subpixels 2124 and 2122 labeled "R" and "L" respectively. Columns 2124 labeled "R" are directed to a first (R) image and columns 2122 labeled "L" are directed to a second (L) image when a display device having a display panel substantially comprising subpixel repeating group 2110 is operated as a directional display device. FIG. 21B shows view 2104 produced by columns 2124 of subpixels labeled "R" in FIG. 21A. The image displayed in view 2104 is rendered on a subpixel repeating group 2130 comprising eight subpixels disposed in four rows, and including four green subpixels 2114, and two subpixels each of red and blue. Note that the green subpixels 2114 in subpixel repeating group 2130 are disposed in horizontal stripes, and that green subpixels 2114 form a rectangular arrangement across view 2104. That is, imaginary lines connecting the centers of four adjacent green subpixels form a rectangle. The subpixels in subpixel repeating group 2130 occupy substantially the same positions relative to subpixel repeating group 2110, including the horizontal stripes of green subpixels 2116 and the checkerboard pattern of the red and blue subpixels. FIG. 21C shows the view 2102 produced by columns 2122 of subpixels labeled "L" in FIG. 21A. The image displayed in view 2102 is also rendered on subpixel repeating group 2130.

With reference to FIG. 21B, an incoming conventional RGB image data set consisting of right view 2104 may be mapped to the arrangement of subpixels in right view 2104 such that the input green image values are mapped one-to-one with green subpixels 2114 (i.e., one incoming image pixel to one green subpixel) in order to fully reconstruct the green portion of the input image. The red and blue data values of the input image data set are reconstructed on the red subpixels 2112 and blue subpixels 2116 that form respective red and blue resample area arrays, such as described above with respect to the subpixel rendering operation disclosed in U.S. Pat. No. 7,123,277. Several types of filters may be used to accomplish the mapping of the red and blue color planes. In one method, contributions of the red or blue data values of several input image pixels are used to produce the data value for a target red or blue subpixel, according to which input image pixels are used to reconstruct the data values for the green subpixels that are proximate to the target red or blue subpixel.

For an example of this type of mapping, refer to FIG. 21B which shows logical pixels 2160 and 2165 each bounded by a dashed-and-dotted line. Overlapping logical pixels 2160 and 2165 are comprised of one each of red, green and blue subpixels for a total of three subpixels in each logical pixel. In this image mapping example, each logical pixel 2160 and 2165 contains a unique green subpixel 2114A and 2114B respectively, and shares its red subpixel and its blue subpixel (e.g., blue subpixel 2116A) with other adjoining and overlapping logical pixels. Thus, a target blue subpixel 2116A is surrounded above and below by green subpixels 2114A and 2114B. A box filter is used to map the blue data values of the two incoming image pixels used to map the green image data values to adjoining green subpixels 2114A and 2114B. The two values in the box filter would both be one half (0.5). A similar operation is used for mapping the input image pixel data to data values for the red subpixels.

Figure 22A:
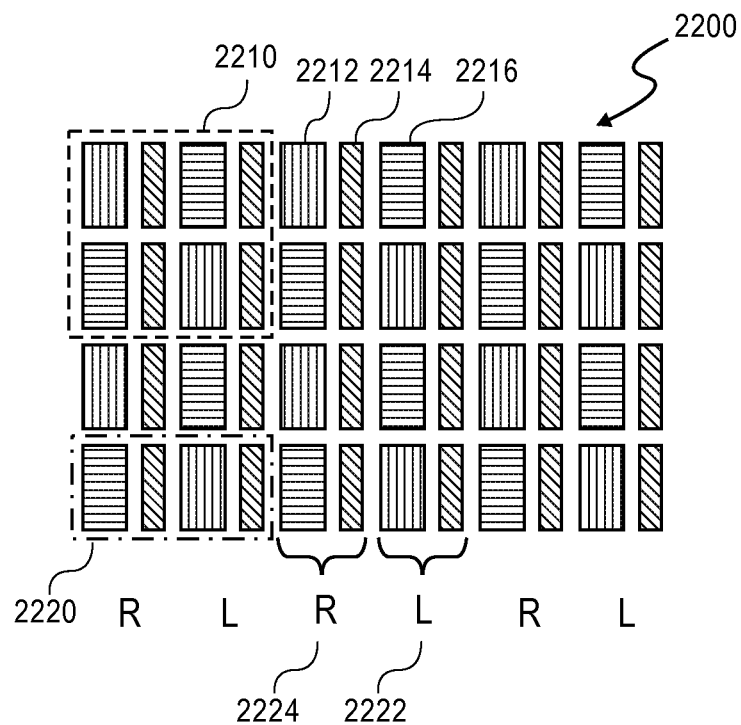
FIG. 22A illustrates a portion of a display panel comprising a third embodiment of a novel three primary color subpixel repeating group.

FIG. 22A shows a portion of a display panel substantially comprising subpixel repeating group 2210. Subpixel repeating group 2210 comprises eight (8) subpixels disposed in two rows and four columns, and comprising two red subpixels 2212, four green subpixels 2214 and two blue subpixels 2216. The green subpixels 2214 have half the aspect ratio of the red and blue subpixels in the horizontal dimension and are disposed in two rows forming vertical stripes down display panel 2200. If the subpixel repeating group is viewed as having four quadrants of two subpixels each, then red and blue subpixels are disposed in different columns in opposing quadrants, forming a checkerboard pattern. Four subpixels of three primary colors in a quad grouping, for example the red 2212, two green 2214, and blue 2216 subpixels, may be viewed as a conventional whole pixel 2220. Thus, display panel 2200 may be treated as an array of full color conventional whole pixels 2220 when operating in the 2D mode.

Figure 22B:
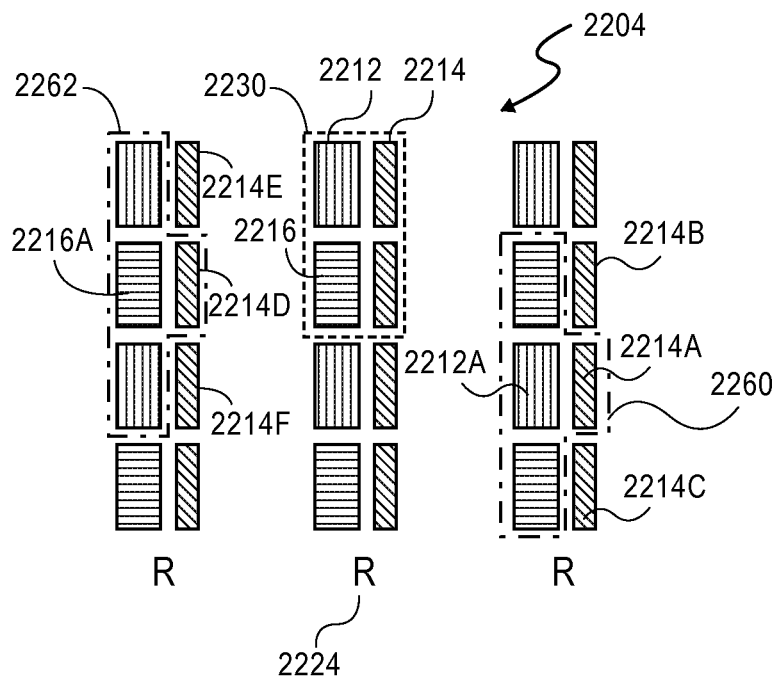
FIGS. 22B and 22C illustrates the subpixel arrangements of first and second image views produced by the display panel of FIG. 22A when used in a directional display device.
Figure 22C:
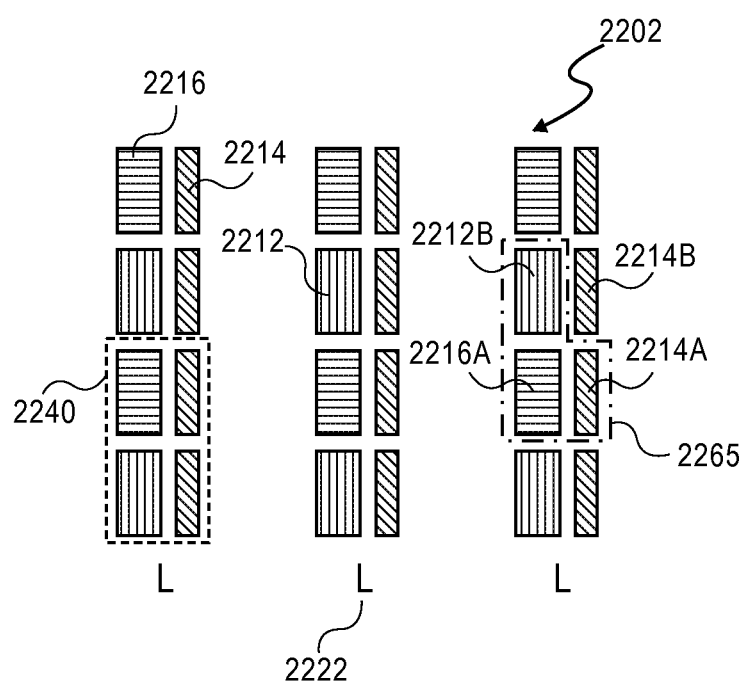

FIG. 22A has pairs of columns of subpixels 2224 and 2222 labeled "R" and "L" respectively. Pairs of columns 2224 labeled "R" are directed to a first (R) image and pairs of columns 2222 labeled "L" are directed to a second (L) image when a display device having a display panel substantially comprising subpixel repeating group 2210 is operated as a directional display device. FIG. 22B shows view 2204 produced by pairs of columns 2224 of subpixels labeled "R" in FIG. 22A. The image displayed in view 2204 is rendered on a subpixel repeating group 2230 comprising four subpixels disposed in two rows, and including two green subpixels 2114, and one subpixel each of red and blue. Note that the green subpixels 2214 in subpixel repeating group 2230 are also disposed in vertical stripes; green subpixels 2214 also form a rectangular arrangement across view 2204. That is, imaginary lines connecting the centers of four green subpixels form a rectangle. As can be seen from viewing multiple subpixel groups 2230, in view 2204, the red subpixels 2212 are disposed in horizontal stripes alternating with horizontal stripes of blue subpixels 2216. In contrast to other embodiments disclosed and illustrated herein, when pairs of columns 2224 of subpixels are directed to the first (R) view 2204, the red and blue subpixels on display panel 2200 of FIG. 22A do not form a checkerboard pattern across first (R) view 2204. FIG. 22C shows the view 2202 produced by pairs of columns 2222 of subpixels labeled "L" in FIG. 22A. The image displayed in view 2202 is rendered on subpixel repeating group 2240. Subpixel repeating group 2240 is similar to subpixel repeating group 2230 with green subpixels 2214 disposed in vertical stripes, but with the positions of the alternating horizontal stripes of red and blue subpixels reversed.

With reference to FIG. 22B, an incoming conventional RGB image data set consisting of right view 2204 may be mapped to the arrangement of subpixels in right view 2204 such that the input green image values are mapped one-to-one with green subpixels 2214 (i.e., one incoming image pixel to one green subpixel) in order to fully reconstruct the green portion of the input image. The red and blue data values of the input image data set are reconstructed on the red subpixels 2212 and blue subpixels 2216 that form respective red and blue resample area arrays, such as described above with respect to the subpixel rendering operation disclosed in U.S. Pat. No. 7,123,277. Several types of filters may be used to accomplish the mapping of the red and blue color planes. In each method, contributions of the red or blue data values of several input image pixels are used to produce the data value for a target red or blue subpixel, according to which input image pixels are used to reconstruct the data value for the green subpixels that are proximate to the target red or blue subpixel.

For an example of a first type of mapping, refer to FIG. 22B which shows logical pixel 2260 bounded by a dashed-and-dotted line. Logical pixel 2260 contains four subpixels, including a unique green subpixel 2214A, and is the logical pixel for target red subpixel 2212A. Three incoming image pixels would be mapped to the data value of target red subpixel 2212A: a first incoming image pixel that is mapped to the green subpixel 2214A adjacent to target red subpixel 2212A, as well as second and third incoming image pixels that are mapped to green subpixels 2214B and 2114B positioned above and below green subpixel 2214A. A tent filter is used to map the red data values of the first, second and third incoming image pixels to produce a data value for target red subpixel 2212A. The three values in the tent filter may be one quarter (0.25), one half (0.5), and one quarter (0.25). A similar operation may be used for mapping the input image pixel data to data values for the blue subpixels. Consider logical pixel 2262 for target blue subpixel 2216A in FIG. 22B. Using the same tent filter, three incoming image pixels would be mapped to the data value of target blue subpixel 2216A: a first incoming image pixel that is mapped to the green subpixel 2214D adjacent to target blue subpixel 2216A, as well as second and third incoming image pixels that are mapped to green subpixels 2214E and 2114F positioned above and below green subpixel 2214D. When the subpixel rendering operation is carried out according to this embodiment, it can be seen that each logical pixel shares a red or blue subpixel with an adjoining and overlapping logical pixel. Overlapping logical pixels are not explicitly shown in FIG. 22B to avoid undue complexity in the figure.

For an example of a second type of mapping, refer to FIG. 22C which shows logical pixel 2265 bounded by a dashed-and-dotted line. Logical pixel 2260 contains three subpixels, including a unique green subpixel 2214A, and is the logical pixel for target blue subpixel 2216A. Two incoming image pixels would be mapped to produce the data value of target blue subpixel 2216A: a first incoming image pixel that is mapped to the green subpixel 2214A adjacent to target blue subpixel 2216A, as well as a second incoming image pixel that is mapped to green subpixel 2214B positioned above green subpixel 2214A. A box filter is used to map the blue data values of the first and second incoming image pixels to produce a data value for target blue subpixel 2216A. The two values in the box filter may both be one half (0.5). A similar operation may be used for mapping the input image pixel data to data values for the red subpixels. Using the same box filter, two incoming image pixels would be mapped to produce the data value of target red subpixel 2212B: a first incoming image pixel that is mapped to the green subpixel 2214B adjacent to target red subpixel 2212B, as well as a second incoming image pixel that is mapped to green subpixel 2214A positioned below green subpixel 2214B. When the subpixel rendering operation is carried out according to this embodiment, it can be seen that each logical pixel shares a red or blue subpixel with an adjoining and overlapping logical pixel. Overlapping logical pixels are not explicitly shown in FIG. 22C to avoid undue complexity in the figure.

Figure 23A:
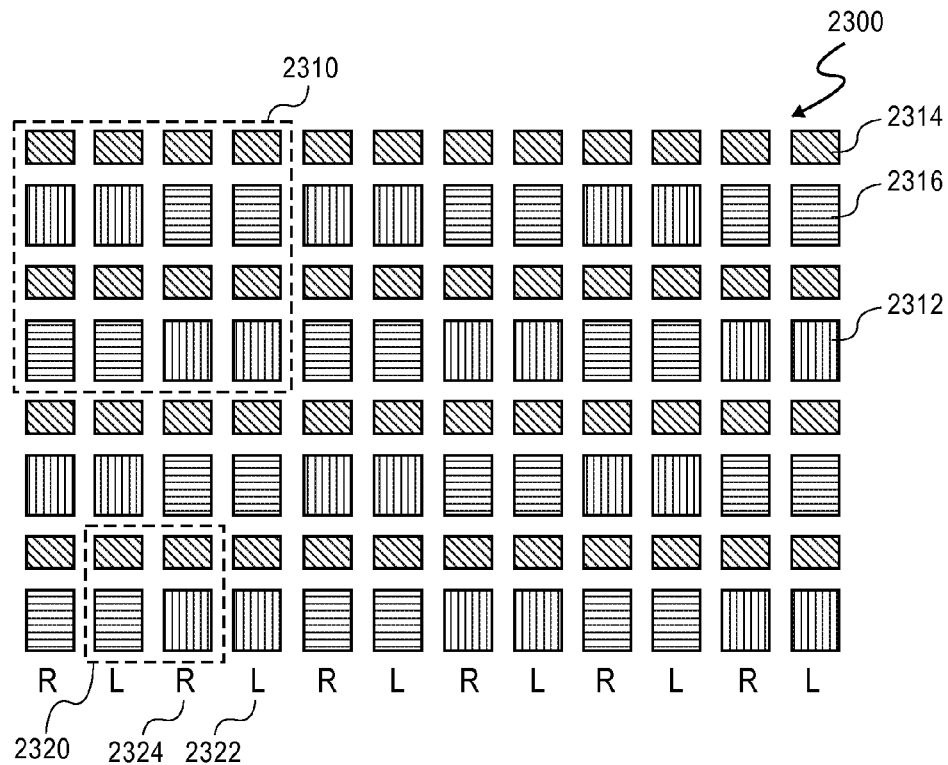
FIG. 23A illustrates a portion of a display panel comprising a fourth embodiment of a novel three primary color subpixel repeating group.

FIG. 23A shows a portion of display panel 2300 substantially comprising subpixel repeating group 2310. Subpixel repeating group 2310 comprises sixteen (16) subpixels disposed in four rows and four columns, and comprising four red subpixels 2312, eight green subpixels 2314, and four blue subpixels 2316. The green subpixels 2314 have half the aspect ratio of the red and blue subpixels in the vertical dimension and are disposed within subpixel repeating group 2310 in two rows forming two horizontal stripes across display panel 2300. If subpixel repeating group 2310 is viewed as having four quadrants of four subpixels each, then the pairs of red subpixels 2312 and the pairs of blue subpixels 2316 are disposed in opposing quadrants, forming a double checkerboard pattern. A group 2320 or quad of four subpixels may be treated as a conventional "whole" pixel. Thus, the display panel may be treated as an array of full color conventional whole pixels 2320 when operating in the conventional 2D mode.

Figure 23B:
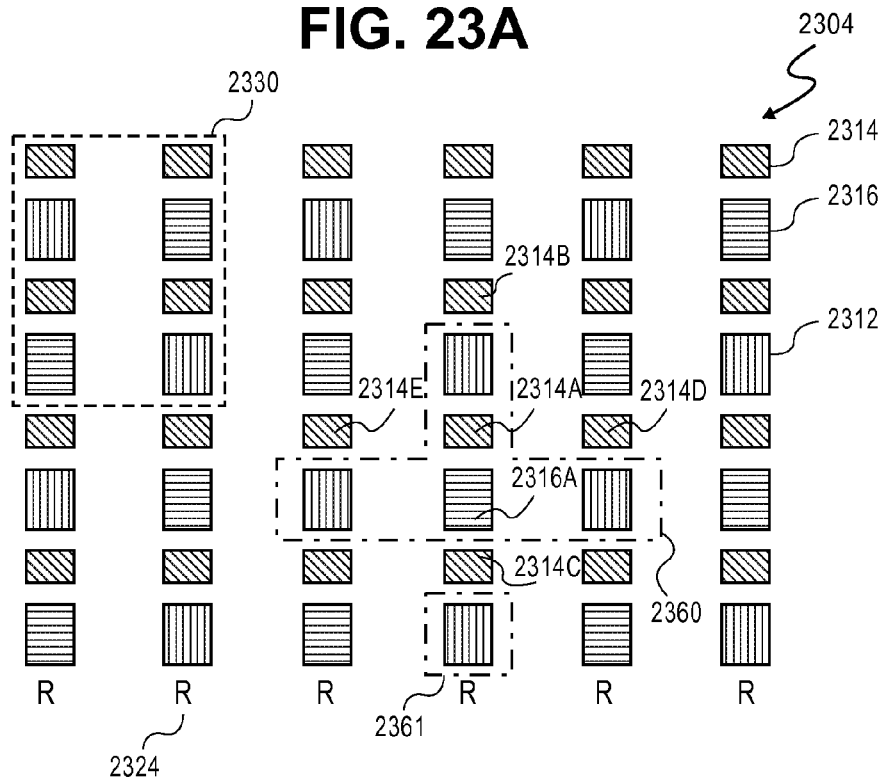
FIGS. 23B and 23C illustrates the subpixel arrangements of first and second image views produced by the display panel of FIG. 23A when used in a directional display device.

A display device having a display panel substantially comprising subpixel repeating group 2310 as shown in FIG. 23A may also operate as a directional display device. FIG. 23B shows the view 2304 produced by columns 2324 of subpixels labeled "R" in FIG. 23A. The image displayed in view 2304 is rendered on a subpixel repeating group 2330 comprising eight subpixels disposed in four rows and two columns, and including two red subpixels 2312, two blue subpixels 2316 and four green subpixels 2314 which form two rows of horizontal stripes. The positions of green subpixels 2314 in view 2304 form a square arrangement across the display panel. That is, imaginary lines connecting the centers of four adjacent green subpixels form a square. The red subpixels 2312 and the blue subpixels 2316 are diagonally opposed to each other in a checkerboard pattern.

Figure 23C:
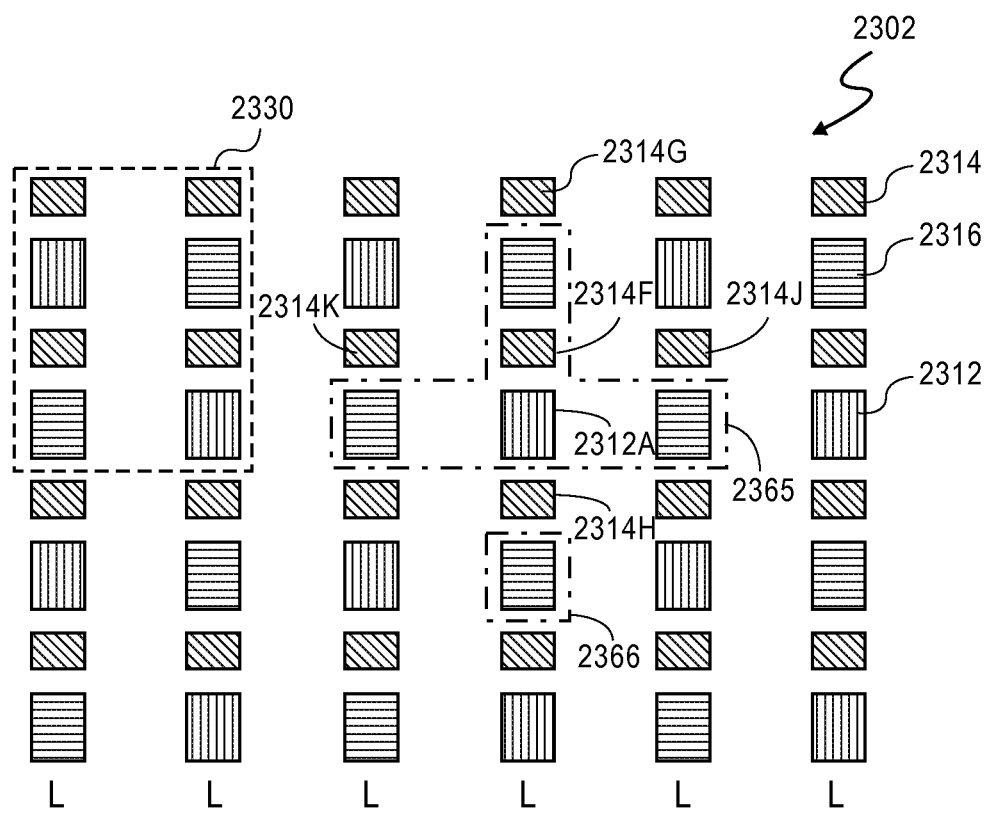

FIG. 23C shows the view 2302 produced by columns 2322 of subpixels labeled "L" in FIG. 23A. The image displayed in view 2302 is also rendered on the same subpixel repeating group 2330 as produced in view 2304. Thus, the distinct "L" and "R" images produced on a display panel comprising subpixel repeating group 2310 of FIG. 23A have all of the advantages discussed therein with respect to images produced on display panels substantially comprising subpixel arrangement 2330 using a subpixel rendering operation of the type described therein. In addition, with respect to using subpixel repeating group 2310 in a directional display system, adjusting the aspect ratios of the green subpixels 2314 as shown results in keeping the resolution of each of the ordinal axes in views 2304 and 2302 approximately equal.

With reference to FIG. 23B, during the subpixel rendering operation that creates view 2304 (the view labeled "R"), the incoming conventional RGB image data representing the view 2304 may be mapped to subpixel repeating group 2330 such that the input green image values are mapped one-to-one with green subpixels 2314 (i.e., one incoming image pixel to one green subpixel) in order to fully reconstruct the green portion of the input image. The red and blue data values of the input image data set are reconstructed on the red subpixels 2112 and blue subpixels 2116 that form respective red and blue resample area arrays, such as described above with respect to the subpixel rendering operation disclosed in U.S. Pat. No. 7,123,277. Several types of filters may be used to accomplish the mapping of the red and blue color planes. In general, these filters produce the data value for a target red or blue subpixel using contributions of the red or blue data values of several input image pixels that are used to reconstruct the data values for the green subpixels that are proximate to the target red or blue subpixel.

For one example of this type of mapping, refer to FIG. 23B which shows one non-contiguous (NC) logical pixel (hereafter referred to as NC logical pixel) that is bounded by dashed-and-dotted lines 2360 and 2361. NC logical pixel is the logical pixel for target blue subpixel 2316A and is comprised of six subpixels. In this image mapping example, each NC logical pixel contains one unique first primary color subpixel, and one second primary color subpixel that is the target subpixel for the logical pixel. The first primary color subpixel is referred to as unique because it is the only green subpixel included in the logical pixel. In the example shown, NC logical pixel contains a unique green subpixel 2314A, and one blue subpixel 2316A that is the target subpixel. Each NC logical pixel further contains four subpixels of the third primary color; in the example shown, NC logical pixel contains four red subpixels that are not individually called out in the figure.

To produce the data value for target blue subpixel 2316A, an area resampling filter is used that maps the blue data values of five incoming image pixels. A first one of these five incoming image pixels is the image pixel used to map the green data value to the unique green subpixel associated with the logical pixel of the target subpixel. In this example, the logical pixel for target blue subpixel 2316A includes unique green subpixel 2314A. The input image pixel used to map the green data value to green subpixel 2314A is the first of the five input image pixels that provide a contribution to the data value for target blue subpixel 2316A. Second, third, fourth and fifth input image pixels are identified according to their position relative to this first input image pixel. Green subpixel 2314A has four nearest green subpixel neighbors, called out in FIG. 23B as green subpixel 2314B above green subpixel 2314A, green subpixel 2314C below green subpixel 2314A, and green subpixels 2314D and 2314E to the right and left respectively of green subpixel 2314A. The blue data value of each of the input image pixels used to map green data values to these four neighboring green subpixels provides a contribution to the data value of target blue subpixel 2316A. For convenience, the input image pixel used to map the green data value to green subpixel 2314A is referred to as the center input image pixel. The area resample filter that may be used to produce the data value of target blue subpixel 2316A may contain five values: one eighth (0.125) for each of the four neighboring input image pixels and one half (0.5) for the center input image pixel. A similar operation may be used for mapping the input image pixel data to data values for the red subpixels.

Using this area resampling filter gives rise to overlapping logical pixels, each of which comprises six subpixels in the configuration of the non-contiguous logical pixel shown in FIG. 23B having a unique green subpixel, a target red or blue subpixel and four subpixels of the primary color that is not the target primary color. Overlapping logical pixels are not explicitly shown in FIG. 23B to avoid undue complexity in the figure. However, FIG. 23C illustrates a non-contiguous logical pixel that is bounded by dashed-and-dotted lines 2365 and 2366 for target red subpixel 2312A and having unique green subpixel 2314F. The same area resampling filter as described above for producing the data value for a target blue subpixel may be used to produce the data value for target red subpixel 2312A, using the input image pixel associated with producing the data value for green subpixel 2314F and the four image input pixels associated with producing the data values for neighboring green subpixels 2314G, 2314H, 2314J and 2314K.

Figure 24A:
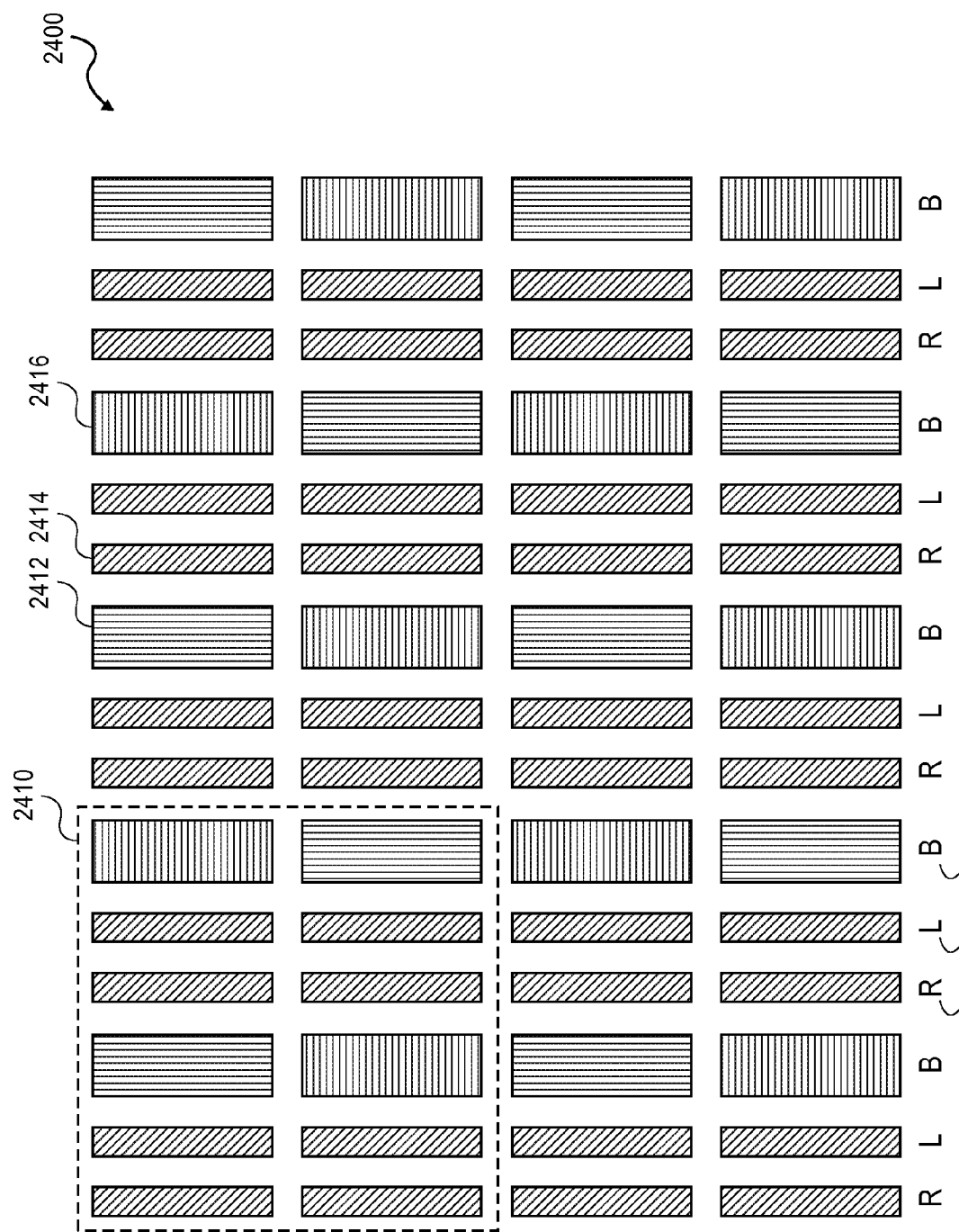
FIG. 24A illustrates a portion of a display panel comprising a fifth embodiment of a novel three primary color subpixel repeating group.

FIG. 24A shows a portion of a display panel 2400 substantially comprising subpixel repeating group 2410. Subpixel repeating group 2410 comprises twelve (12) subpixels disposed in two rows and comprising eight green subpixels 2414, two red subpixels 2412 and two blue subpixels 2416. The green subpixels 2414 have half the aspect ratio of the red and blue subpixels in the horizontal dimension and pairs of narrow green subpixels form adjacent vertical stripes on display panel 2400. If the subpixel repeating group is viewed as having four quadrants of three subpixels each, then the red subpixels 2412 and the blue subpixels 2416 are disposed in different rows in opposing quadrants, forming a low resolution checkerboard pattern.

FIG. 24A has columns of subpixels 2424, 2422, and 2423 labeled "R," "L" and "B" respectively. It can be seen from the figure that half of the green subpixel columns are directed to the first view and half are directed to the second view. Columns 2423 labeled "B" comprising the red and blue alternating subpixels are directed to both first (R) and second (L) images when a display device having a display panel substantially comprising subpixel repeating group 2410 is operated as a directional display device. In this embodiment, the color primaries are divided into two classes of primaries based on their relative luminance, and the relatively darker primaries, in this embodiment the red and blue primary color subpixels, are shared between the left and right views. As noted above with respect to the other embodiments having columns directed to both views, this subpixel arrangement exploits a characteristic of the Human Vision System in which the luminance channel, represented by the subpixels of the brighter primary colors, has the required resolution to convey the needed stereoscopic information. The embodiment shown in FIG. 24A, then, is particularly well-suited to autostereoscopic 3D displays and to switchable 2D 3D displays.

Figure 24B:
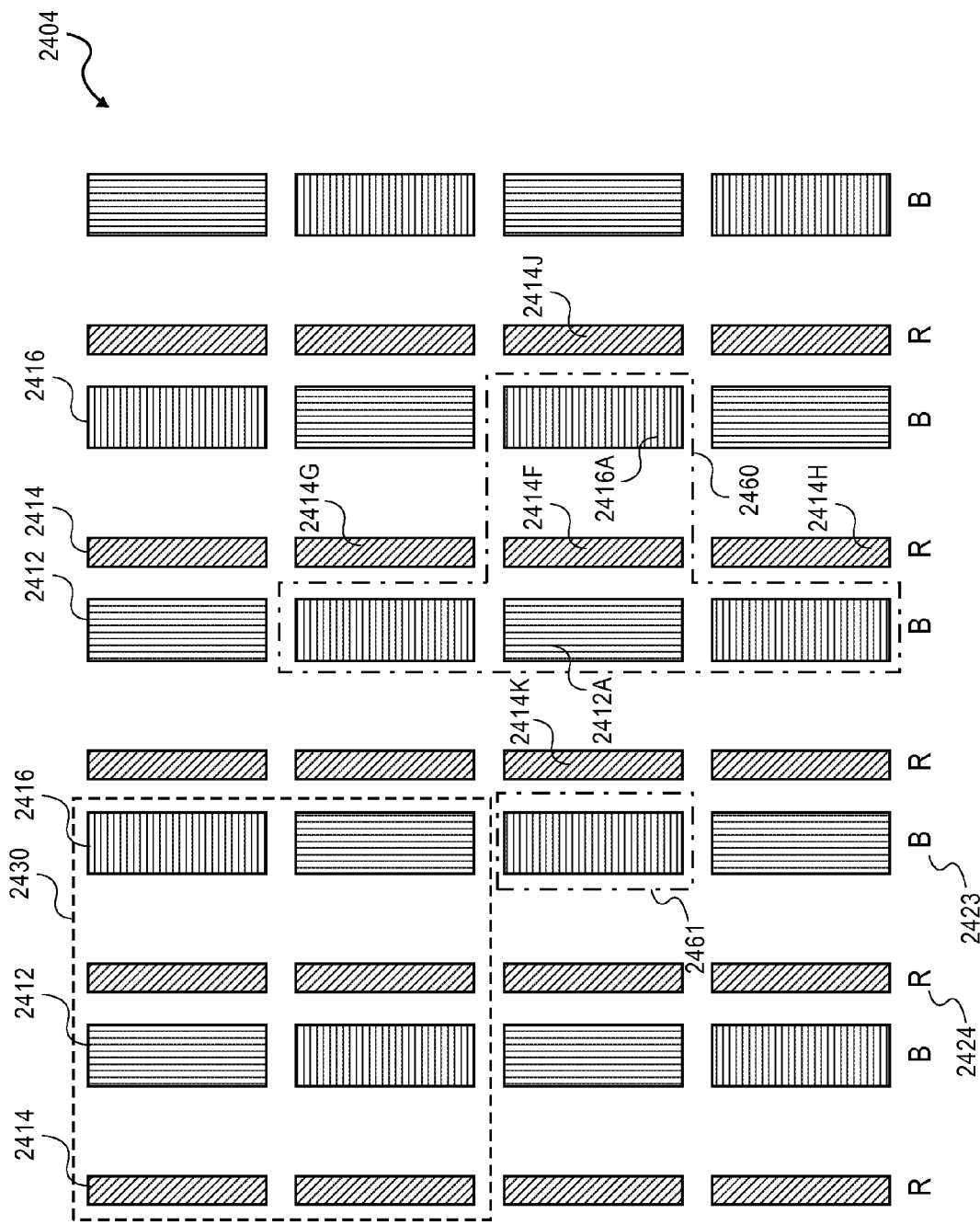
FIGS. 24B and 24C illustrates the subpixel arrangements of first and second image views produced by the display panel of FIG. 24A when used in a directional display device.
Figure 24C:
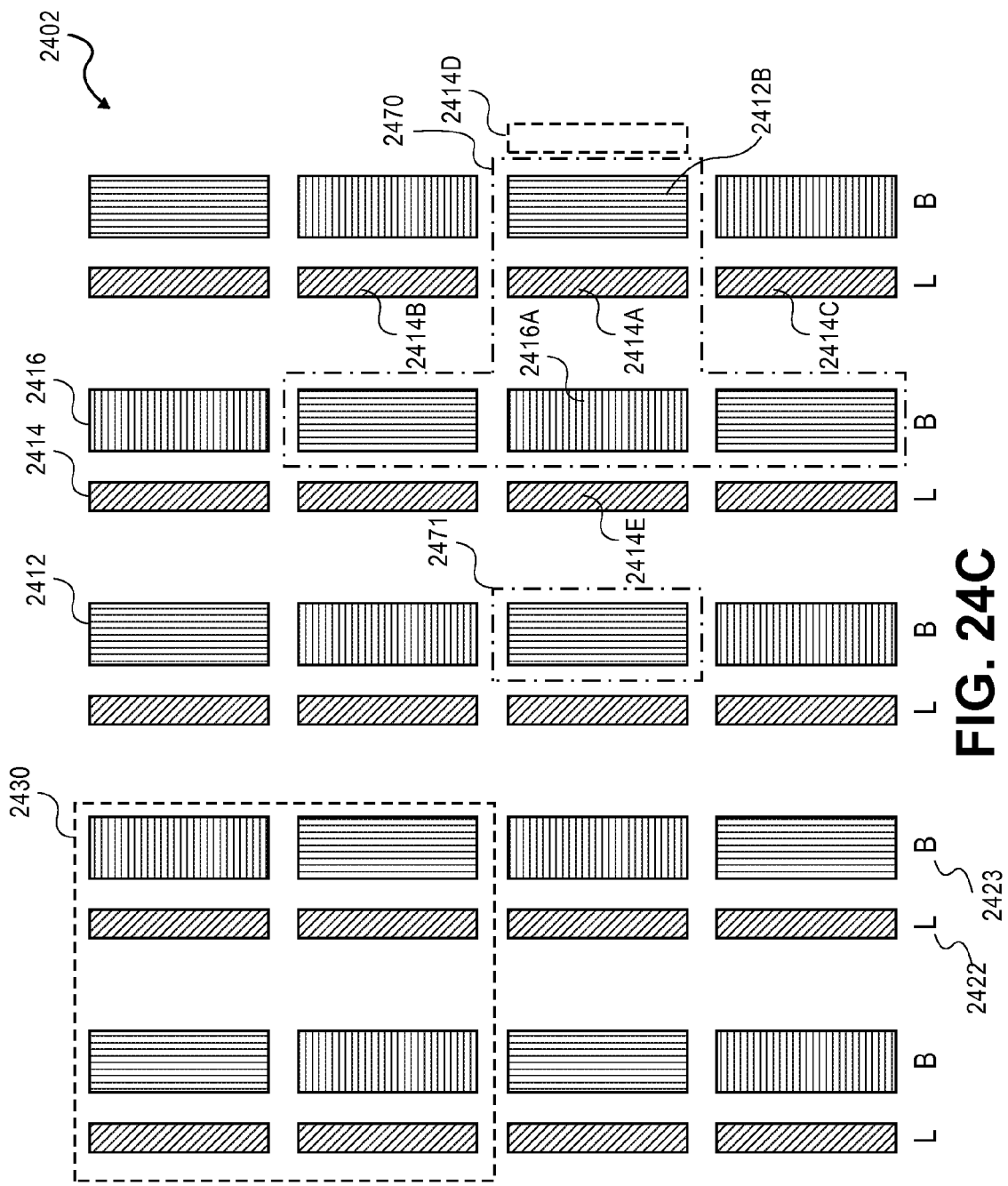

FIG. 24B shows the view 2404 produced by columns 2424 of subpixels labeled "R" and columns 2423 of subpixels labeled "B" in FIG. 24A. The image displayed in view 2404 is rendered on a subpixel repeating group 2430 comprising eight subpixels disposed in two rows, and including four green subpixels 2416 disposed in vertical stripes and two subpixels each of red and blue. The green subpixels 2414 form a square arrangement across view 2404; that is, imaginary lines connecting the centers of 4 neighboring green subpixels form a square. The red subpixels 2412 and the blue subpixels 2416 are disposed in opposing quadrants forming a checkerboard pattern. FIG. 24C shows the view 2402 produced by columns 2422 of subpixels labeled "L" and columns 2423 of subpixels labeled "B" in FIG. 24A. The image displayed in view 2402 is also rendered on subpixel repeating group 2430.

As indicated in the discussion of the other embodiments that have columns of subpixels that are shared between the left and right views, the subpixel rendering operation used to render the left and right views may average the contributions for the input image data belonging to the two separate views 2404 and 2402 for those color planes corresponding to the color subpixels in the columns 2423 shared by both views. In the embodiment shown in FIG. 24A, the subpixel rendering operation may average the contributions for the input image data belonging to the two separate views 2404 and 2402 for the red and blue color planes.

With reference to FIG. 24C, during the subpixel rendering operation that creates view 2402 (the view labeled "L"), the incoming conventional RGB image data representing the view 2402 may be mapped to subpixel repeating group 2430 such that the input green image values are mapped one-to-one with green subpixels 2414 (i.e., one incoming image pixel to one green subpixel) in order to fully reconstruct the green portion of the input image. This is done for the left view 2402 without sharing that data with the right view 2404 of FIG. 24B. A subpixel rendering operation may be performed on the input image red and blue data values intended for both the right view 2404 and the left view 2402 to reconstruct the image data on the red subpixels 2412 and blue subpixels 2416 using respective red and blue resample area arrays, such as described above with respect to the subpixel rendering operation disclosed in U.S. Pat. No. 7,123,277. The results of the subpixel rendering operation may then be averaged. The order of the subpixel rendering and averaging operations may be interchanged as they are commutative and distributive mathematical functions. It may prove to be more efficient (e.g., by reducing the number of digital operations) if the averaging of the two primary color planes for the right and left views (e.g., the two red input data color planes) is performed before subpixel rendering.

Several types of filters may be used to accomplish the subpixel rendering operation of the red and blue color planes. In general, these filters produce the data value for a target red or blue subpixel using contributions of the red or blue data values of several input image pixels that are used to reconstruct the data values for the green subpixels that are proximate to the target red or blue subpixel. The discussion of an exemplary subpixel rendering operation for a target blue subpixel 2416A in FIG. 24C that follows below is similar to the discussion of an exemplary subpixel rendering operation for a target blue subpixel 2316A in FIG. 23B. The reader is referred to that discussion for any details that may be omitted here.

FIG. 24C shows one non-contiguous (NC) logical pixel that is bounded by dashed-and-dotted lines 2470 and 2471. NC logical pixel is the logical pixel for target blue subpixel 2416A and is comprised of six subpixels. In this example, each NC logical pixel contains one unique first primary color subpixel, and one second primary color subpixel that is the target subpixel for the logical pixel. The first primary color subpixel is referred to as unique because it is the only green subpixel in the logical pixel. In the example shown, NC logical pixel contains a unique green subpixel 2414A, and one blue subpixel 2416A that is the target subpixel. Each NC logical pixel further contains four subpixels of the third primary color; in the example shown, NC logical pixel contains four red subpixels that are not individually called out in the figure.

To produce the data value for target blue subpixel 2416A, an area resampling filter is used that maps the blue data values of five incoming image pixels. A first one of these five incoming image pixels is the image pixel used to map the green data value to the unique green subpixel associated with the logical pixel of the target subpixel. In this example, the NC logical pixel for target blue subpixel 2416A includes unique green subpixel 2414A. The input image pixel used to map the green data value to green subpixel 2414A is the first of the five input image pixels that provide a contribution to the data value for target blue subpixel 2416A; this first image pixel is referred to as the center pixel. Second, third, fourth and fifth input image pixels are identified according to their position relative to this first input image pixel. Green subpixel 2414A has four nearest green subpixel neighbors, called out in FIG. 24C as green subpixel 2414B above green subpixel 2414A, green subpixel 2414C below green subpixel 2414A, green subpixels 2414E to the left of green subpixel 2414A, and green subpixel 2414D, which, if present on the display panel, is shown to the right of green subpixel 2414A and red subpixel 2412B. The blue data value of each of the input image pixels used to map green data values to these four neighboring green subpixels provides a contribution to the data value of target blue subpixel 2416A. The area resample filter that may be used to produce the data value of target blue subpixel 2416A may contain five values: one eighth (0.125) for each of the four neighboring input image pixels and one half (0.5) for the center input image pixel.

A similar operation may be used for mapping the input image pixel data to data values for the red subpixels. FIG. 24B shows one non-contiguous logical pixel that is bounded by dashed-and-dotted lines 2460 and 2461. NC logical pixel is the logical pixel for target red subpixel 2412A and is comprised of six subpixels, including unique green subpixel 2414F. To produce the data value for target red subpixel 2412A, an area resampling filter is used that maps the red data values of the five incoming image pixels that were used to map green data values to green subpixels 2414F, 2414G, 2414H, 2414J and 2414K. The area resample filter that may be used to produce the data value of target red subpixel 2412A may be the same area resample filter described above that is used to produce the data value of target blue subpixel 2416A of FIG. 24C. Note that using this type of area resampling filter gives rise to overlapping logical pixels. Each of neighboring green subpixels 2414G, 2414H, 2414J and 2414K is the unique green subpixel of its own logical pixel. Red subpixels 2412 and blue subpixels 2416 are shared between views 2404 and 2402 and become part of several overlapping logical pixels. For example, blue subpixel 2416A of FIG. 24C is the target subpixel of NC logical pixel bounded by dashed-and-dotted lines 2470 and 2471, and is also contained in NC logical pixel bounded by dashed-and-dotted lines 2460 and 2461 of FIG. 24B.

It will be understood by those skilled in the art that various changes may be made to the exemplary embodiments illustrated herein, and equivalents may be substituted for elements thereof, without departing from the scope of the appended claims. Therefore, it is intended that the appended claims include all embodiments falling within their scope, and not be limited to any particular embodiment disclosed, or to any embodiment disclosed as the best mode contemplated for carrying out this invention.

What is claimed is:

1. A display device comprising: a display panel substantially comprising a plurality of subpixel repeating groups, each subpixel repeating group having subpixels in at least first, second, third and fourth primary colors; said subpixel repeating group comprising at least twelve subpixels disposed in two rows of at least six subpixels each, wherein four of the twelve subpixels have the first primary color, four of the twelve subpixels have the second primary color, two of the twelve subpixels have the third primary color, and two of the twelve subpixels have the fourth primary color, and wherein, in a row, the first primary color and second primary color alternate between a first, a second, a fourth and a fifth column; and driver circuitry configured to send a signal to each subpixel on said display panel, the signal for each subpixel in a single subpixel repeating group based on a same input image data for a single pixel.

2. The display device as recited in claim 1 wherein said fourth primary color is one of a group of primary colors, said group comprising white, yellow, magenta, grey-blue, cyan and emerald.

3. The display device as recited in claim 1 further comprising an optical directing component configured to direct light emissions from a first group of subpixels on said display panel to a first viewing window, and configured to direct light emissions from a second group of subpixels on said display panel to a second viewing window.

4. The display device as recited in claim 3 wherein said display device is an autostereoscopic display device such that when an observer positions left and right eyes in said respective first and second viewing windows, the observer perceives a three-dimensional image.

5. The display device as recited in claim 3 wherein said display device is a multi-view device such that an observer sees a first image from said first viewing window, and sees a second image from said second viewing window.

6. The display device as recited in claim 3 further comprising a light direction switching apparatus configured to control operation of said optical directing component in at least two modes; said light direction switching apparatus causing said optical directing component to direct light emissions to said first and second viewing windows in said first mode, and said light direction switching apparatus causing said display panel to display a two-dimensional image in said second mode.

7. The display device as recited in claim 1 wherein said display device is an autostereoscopic display device further comprising an optical directing component configured to direct light emissions from a first group of subpixels on said display panel to a first viewing window, configured to direct light emissions from a second group of subpixels on said display panel to a second viewing window, and configured to direct light emissions from a third group of subpixels on said display panel to both said first and second viewing windows, such that when an observer positions left and right eyes in said respective first and second viewing windows, the observer perceives a three-dimensional image.

8. The display device as recited in claim 1 wherein said display panel is one of a group of panels, said group comprising a liquid crystal display panel, an emissive electroluminecent display panel, a plasma display panel, a field emitter display panel, an electrophoretic display panel, an iridescent display panel, an incandescent display panel, a light emitting diode display panel, and an organic light emitting diode display panel.

9. The display device as recited in claim 1 wherein said subpixel repeating group defines an output display format; said display device further comprising: an input image receiving component for receiving input image data in a first format for rendering on said display panel in said output display format; and a subpixel rendering component configured to perform a subpixel rendering operation on said input image data to produce a luminance value for each subpixel on said display panel.

10. The display device as recited in claim 9 wherein said subpixel rendering operation produces said luminance value for each subpixel on said display panel by forming a resample area for each subpixel and computing said luminance value using input image data values from portions of said input image data that overlap with said resample area.

11. The display device as recited in claim 1 wherein said subpixel repeating group comprises twelve subpixels and said subpixels are arranged in the two rows as

| P1 | P2 | P4 | P1 | P2 | P3 |
|----|----|----|----|----|----|
| P2 | P1 | P3 | P2 | P1 | P4 | wherein P1, P2, P3 and P4 respectively designate said first, second, third and fourth primary colors.

12. A display device comprising:
a display panel substantially comprising a plurality of subpixel repeating groups, each subpixel repeating group having subpixels in at least first, second, third and fourth primary colors; said subpixel repeating group comprising sixteen subpixels and said subpixels being arranged in two rows as

| P2 | P4 | P1 | P4 | P2 | P3 | P2 | P4 |
|----|----|----|----|----|----|----|----|
| P4 | P2 | P3 | P2 | P4 | P1 | P4 | P2 |

; and driver circuitry configured to send a signal to each subpixel on said display panel, the signal for each subpixel in a single subpixel repeating group based on a same input image data for a single pixel, wherein P1, P2, P3 and P4 respectively designate said first, second, third and fourth primary colors.

13. A display device comprising:
a display panel substantially comprising a plurality of subpixel repeating groups, each subpixel repeating group having subpixels in at least first, second, third and fourth primary colors; said subpixel repeating group comprising twenty-four subpixels and said subpixels being arranged in two rows as

| P4 | P4 | P1 | P4 | P4 | P2 | P4 | P4 | P5 | P4 | P4 | P3 |
|----|----|----|----|----|----|----|----|----|----|----|----|
| P4 | P4 | P5 | P4 | P4 | P3 | P4 | P4 | P1 | P4 | P4 | P2 |

; and driver circuitry configured to send a signal to each subpixel on said display panel, the signal for each subpixel in a single subpixel repeating group based on a same input image data for a single pixel, wherein P1, P2, P3, P4 and P5 respectively designate first, second, third, fourth and fifth primary colors.

14. A directional display device comprising: a display panel substantially comprising a subpixel repeating group having subpixels in at least first, second, third and fourth primary colors; said subpixel repeating group comprising eight subpixels disposed in four rows and two columns; each column of subpixels comprising one subpixel each of said first, second, third and fourth primary colors; driver circuitry configured to send a signal to each subpixel on said display panel; and an optical directing component configured to direct light emissions from a first group of subpixels on said display panel to a first viewing window, and configured to direct light emissions from a second group of subpixels on said display panel to a second viewing window.

15. The directional display device as recited in claim 14 wherein said fourth primary color is one of a group of primary colors, said group comprising white, yellow, magenta, greyblue, cyan and emerald.

16. The directional display device as recited in claim 14 wherein said directional display device is an autostereoscopic display device such that when an observer positions left and right eyes in said respective first and second viewing windows, the observer perceives a three-dimensional image.

17. The directional display device as recited in claim 14 wherein said directional display device is a multi-view device such that an observer sees a first image from said first viewing window, and sees a second image from said second viewing window.

18. The directional display device as recited in claim 14 further comprising a light direction switching apparatus configured to control operation of said optical directing component in at least two modes; said light direction switching apparatus causing said optical directing component to direct light emissions to said first and second viewing windows in said first mode, and said light direction switching apparatus causing said display panel to display a two-dimensional image in said second mode.

19. The directional display device as recited in claim 14 wherein said subpixels are arranged in the four rows and two columns as

| P4 | P2 |
|----|----|
| P3 | P1 |
| P2 | P4 |
| P1 | P3 | wherein P1, P2, P3 and P4 respectively designate said first, second, third and fourth primary colors.

20. The directional display device as recited in claim 14 wherein said subpixel repeating group defines an output display format; said directional display device further comprising: an input image receiving component for receiving input image data in a first format for rendering on said display panel in said output display format; and a subpixel rendering component configured to perform a subpixel rendering operation on said input image data to produce a luminance value for each subpixel on said display panel.

21. The directional display device as recited in claim 20 wherein said subpixel rendering operation produces said luminance value for each subpixel on said display panel by forming a resample area for each subpixel and computing said luminance value using input image data values from portions of said input image data that overlap with said resample area.

22. The directional display device as recited in claim 14 wherein said display panel is one of a group of panels, said group comprising a liquid crystal display panel, an emissive electroluminecent display panel, a plasma display panel, a field emitter display panel, an electrophoretic display panel, an iridescent display panel, an incandescent display panel, a light emitting diode display panel, and an organic light emitting diode display panel.

23. A directional display device comprising: a display panel substantially comprising a subpixel repeating group having subpixels in first, second and third primary colors; said subpixel repeating group comprising at least six subpixels disposed in two rows and at least three columns such that at least one column comprises two subpixels of said first primary color forming a vertical stripe on said display panel; said subpixel repeating group further comprising one subpixel each of said second and third primary colors in each row such that a second primary color subpixel follows a third primary color subpixel in said first row and a third primary color subpixel follows a second primary color subpixel in said second row; driver circuitry configured to send a signal to each subpixel on said display panel; and an optical directing component configured to direct light emissions from a first group of subpixels on said display panel to a first viewing window, and configured to direct light emissions from a second group of subpixels on said display panel to a second viewing window, wherein said first primary color is green.

24. The directional display device as recited in claim 23 wherein said subpixel repeating group comprises eight subpixels disposed in two rows and four columns such that two columns comprise subpixels of said first primary color forming two vertical stripes on said display panel.

25. The directional display device as recited in claim 24 wherein said first primary color is green; and wherein said vertical stripes of green subpixels are non-adjacent.

26. The directional display device as recited in claim 25 wherein said green subpixels have half the aspect ratio in the horizontal dimension of said second and third primary color subpixels.

27. The directional display device as recited in claim 23 wherein said directional display device is an autostereoscopic display device such that when an observer positions left and right eyes in said respective first and second viewing windows, the observer perceives a three-dimensional image.

28. The directional display device as recited in claim 23 wherein said directional display device is a multi-view device such that an observer sees a first image from said first viewing window, and sees a second image from said second viewing window.

29. The directional display device as recited in claim 23 further comprising a light direction switching apparatus configured to control operation of said optical directing component in at least two modes; said light direction switching apparatus causing said optical directing component to direct light emissions to said first and second viewing windows in said first mode, and said light direction switching apparatus causing said display panel to display a two-dimensional image in said second mode.

30. The directional display device as recited in claim 23 wherein said subpixel repeating group defines an output display format; said directional display device further comprising: an input image receiving component for receiving input image data in a first format for rendering on said display panel in said output display format; and a subpixel rendering component configured to perform a subpixel rendering operation on said input image data to produce a luminance value for each subpixel on said display panel.

31. The display device as recited in claim 30 wherein said subpixel rendering operation produces said luminance value for each subpixel on said display panel by forming a resample area for each subpixel and computing said luminance value using input image data values from portions of said input image data that overlap with said resample area.

32. A directional display device comprising: a display panel substantially comprising a subpixel repeating group having subpixels in at least first, second and third primary colors; said subpixel repeating group comprising at least twelve subpixels disposed in two rows; said subpixel repeating group further comprising one subpixel each of said second and third primary colors in each row such that a second primary color subpixel follows a third primary color subpixel in said first row and a third primary color subpixel follows a second primary color subpixel in said second row; driver circuitry configured to send a signal to each subpixel on said display panel; and an optical directing component configured to direct light emissions from a first group of subpixels on said display panel to a first viewing window, configured to direct light emissions from a second group of subpixels on said display panel to a second viewing window, and configured to direct light emissions from a third group of subpixels, the third group including second and third primary colors, on said display panel to both said first and second viewing windows, such that when an observer positions left and right eyes in said respective first and second viewing windows, the observer perceives a three-dimensional image.

33. The display device as recited in claim 32 wherein said subpixel repeating group includes subpixels in first, second, third and fourth primary colors; wherein said subpixels in said subpixel repeating group are arranged in two rows as

| P2 | P4 | P1 | P4 | P2 | P3 | P2 | P4 |
| P4 | P2 | P3 | P2 | P4 | P1 | P4 | P2 | wherein P1, P2, P3 and P4 respectively designate said first, second, third and fourth primary colors; and further wherein said columns of P1 and P3 subpixels are directed to both of said first and second viewing windows.

34. The display device as recited in claim 32 wherein said subpixel repeating group includes subpixels in first, second, third, fourth and fifth primary colors; and wherein each of said fourth and fifth primary colors is one of a group of primary colors, said group comprising white, yellow, magenta, grey-blue, cyan and emerald.

35. The display device as recited in claim 34 wherein said subpixel repeating group comprises twenty-four subpixels and said subpixels are arranged in the two rows as

| P4 | P4 | P1 | P4 | P4 | P2 | P4 | P4 | P5 | P4 | P4 | P3 |
| P4 | P4 | P5 | P4 | P4 | P3 | P4 | P4 | P1 | P4 | P4 | P2 | wherein P1, P2, P3, P4 and P5 respectively designate first, second, third, fourth and fifth primary colors; and further wherein said columns of P1, P2, P3 and P5 subpixels are directed to both of said first and second viewing windows.

36. The display device as recited in claim 32 wherein said subpixels in said subpixel repeating group are arranged in two rows as

| P1 | P1 | P2 | P1 | P1 | P3 |
|----|----|----|----|----|----|
| P1 | P1 | P3 | P1 | P1 | P2 | wherein P1, P2 and P3 respectively designate said first, second and third primary colors; and further wherein said columns of P2 and P3 subpixels are directed to both of said first and second viewing windows.

37. The directional display device as recited in claim 32 further comprising a light direction switching apparatus configured to control operation of said optical directing component in at least two modes; said light direction switching apparatus causing said optical directing component to direct light emissions to said first and second viewing windows in said first mode, and said light direction switching apparatus causing said display panel to display a two-dimensional image in said second mode.

38. The directional display device as recited in claim 32 wherein said subpixel repeating group defines an output display format; said directional display device further comprising: an input image receiving component for receiving input image data in a first format for rendering on said display panel in said output display format; and a subpixel rendering component configured to perform a subpixel rendering operation on said input image data to produce a luminance value for each subpixel on said display panel.

39. The display device as recited in claim 38 wherein said subpixel rendering operation produces said luminance value for each subpixel on said display panel by forming a resample area for each subpixel and computing said luminance value using input image data values from portions of said input image data that overlap with said resample area.

40. The directional display device as recited in claim 32 wherein said display panel is one of a group of panels, said group comprising a liquid crystal display panel, an emissive electroluminecent display panel, a plasma display panel, a field emitter display panel, an electrophoretic display panel, an iridescent display panel, an incandescent display panel, a light emitting diode display panel, and an organic light emitting diode display panel.

41. The display device as recited in claim 33 wherein said fourth primary color is one of a group of primary colors, said group comprising white, yellow, magenta, grey-blue, cyan and emerald.

42. A display device comprising: a display panel substantially comprising a plurality of subpixel repeating groups, each subpixel repeating group having subpixels in first, second and third primary colors; said subpixel repeating group comprising twenty-four subpixels disposed in at least two rows and in at least two columns; said subpixel repeating group further comprising eight subpixels of a first primary color disposed in one of a row and column direction on said display panel and subpixels of the second and third primary color alternating in at least one of a row and a column direction; and driver circuitry configured to send a signal to each subpixel on said display panel, the signal for each subpixel in a single subpixel repeating group based on a same input image data for a single pixel.

43. The display device as recited in claim 42 further comprising an optical directing component configured to direct light emissions from a first group of subpixels on said display panel to a first viewing window, and configured to direct light emissions from a second group of subpixels on said display panel to a second viewing window.

44. The display device as recited in claim 43 wherein said display device is an autostereoscopic display device such that when an observer positions left and right eyes in said respective first and second viewing windows, the observer perceives a three-dimensional image.

45. The display device as recited in claim 43 wherein said display device is a multi-view device such that an observer sees a first image from said first viewing window, and sees a second image from said second viewing window.

46. The display device as recited in claim 43 further comprising a light direction switching apparatus configured to control operation of said optical directing component in at least two modes; said light direction switching apparatus causing said optical directing component to direct light emissions to said first and second viewing windows in said first mode, and said light direction switching apparatus causing said display panel to display a two-dimensional image in said second mode.

47. The display device as recited in claim 42 wherein said display panel is one of a group of panels, said group comprising a liquid crystal display panel, an emissive electroluminecent display panel, a plasma display panel, a field emitter display panel, an electrophoretic display panel, an iridescent display panel, an incandescent display panel, a light emitting diode display panel, and an organic light emitting diode display panel.

48. The display device as recited in claim 42 wherein said subpixel repeating group defines an output display format; said display device further comprising: an input image receiving component for receiving input image data in a first format for rendering on said display panel in said output display format; and a subpixel rendering component configured to perform a subpixel rendering operation on said input image data to produce a luminance value for each subpixel on said display panel.

49. The display device as recited in claim 48 wherein said subpixel rendering operation produces said luminance value for each subpixel on said display panel by forming a resample area for each subpixel and computing said luminance value using input image data values from portions of said input image data that overlap with said resample area.

* * * * *